(12) United States Patent
Chien

(10) Patent No.: US 11,181,249 B2
(45) Date of Patent: Nov. 23, 2021

(54) OUTDOOR LED PROJECTION LIGHT

(71) Applicant: Tseng-Lu Chien, Walnut, CA (US)

(72) Inventor: Tseng-Lu Chien, Walnut, CA (US)

(*) Notice: Subject to any disclaimer, the term of this patent is extended or adjusted under 35 U.S.C. 154(b) by 293 days.

(21) Appl. No.: 15/494,777

(22) Filed: Apr. 24, 2017

(65) Prior Publication Data
US 2018/0013986 A1 Jan. 11, 2018

Related U.S. Application Data

(60) Continuation-in-part of application No. 15/355,515, filed on Nov. 18, 2016, which is a
(Continued)

(51) Int. Cl.
F21V 5/04 (2006.01)
F21S 4/28 (2016.01)
(Continued)

(52) U.S. Cl.
CPC .............. F21V 5/04 (2013.01); F21K 9/232 (2016.08); F21K 9/60 (2016.08); F21K 9/65 (2016.08);
(Continued)

(58) Field of Classification Search
CPC .... F21S 4/28; F21S 8/035; F21S 8/038; F21S 10/002; F21K 9/32; F21K 9/65;
(Continued)

(56) References Cited

U.S. PATENT DOCUMENTS 4,285,028 A * 8/1981 Sundin .................... F21S 6/002
362/234
4,779,176 A * 10/1988 Bornhorst .............. G03B 15/02
353/42
(Continued)

Primary Examiner — Anabel Ton
(74) Attorney, Agent, or Firm — Bacon & Thomas, PLLC

(57) ABSTRACT

The (LED or-and Laser) light source for bulb or light device such as garden light that has at least one of or more than one optics-lens, and light device has one top cover having shape of flat or ½ ball, ⅔ ball, sphere, dome shape for top cover. Foe laser light source incorporate with flat top protective lens and laser film or grating film to enlarge or created plurality of image, lighted patterns. For LED light source can has project assembly which is a built-in or add-on or assembled inside of said light device. Further can incorporated flexible bendable arms to change position, direction, orientation of (LED or-and Laser) light beam. The said Light device also can offer near-by and far-away illumination, or-and lighted image, pattern projection with desired light effects by rotating optic-lens or LED(s). It also can get desired effects while LED(s) controlled by IC or circuitry making LED(s) for color changing or on-off on desired time, duration, cycles. The light device further can have more than one function selected from USB charger, power failure, RF remote control, Infra-red controller, blue-tooth, wifi, internet, App software, motion sensor and wireless with multiple-way communication. Also, light device may have rechargeable circuit, batteries or rechargeable battery, USB ports for the (LED or-and Laser)-bulb be charged or supply other device current.

11 Claims, 42 Drawing Sheets

Related U.S. Application Data continuation-in-part of application No. 15/296,599, filed on Oct. 18, 2016, now Pat. No. 10,228,112, and a continuation-in-part of application No. 15/170,071, filed on Jun. 1, 2016, now abandoned, and a continuation-in-part of application No. 14/983,993, filed on Dec. 30, 2015, now Pat. No. 9,909,739, and a continuation-in-part of application No. 14/968,153, filed on Dec. 14, 2015, now Pat. No. 10,323,808, and a continuation-in-part of application No. 14/944,953, filed on Nov. 18, 2015, now Pat. No. 10,509,304, and a continuation-in-part of application No. 14/943,645, filed on Nov. 17, 2015, now Pat. No. 10,677,432, said application No. 15/170,071 is a continuation-in-part of application No. 14/844,314, filed on Sep. 3, 2015, now abandoned, said application No. 15/355,515 is a continuation-in-part of application No. 14/737,434, filed on Jun. 11, 2015, now abandoned, and a continuation-in-part of application No. 14/622,628, filed on Feb. 13, 2015, now Pat. No. 9,097,413, and a continuation-in-part of application No. 14/606,242, filed on Jan. 27, 2015, now Pat. No. 9,541,260, said application No. 15/296,599 is a continuation of application No. 14/503,647, filed on Oct. 1, 2014, now Pat. No. 9,719,654, said application No. 15/355,515 is a continuation-in-part of application No. 14/503,647, filed on Oct. 1, 2014, now Pat. No. 9,719,654, which is a division of application No. 14/451,822, filed on Aug. 5, 2014, now Pat. No. 10,047,922, which is a continuation-in-part of application No. 14/323,318, filed on Jul. 3, 2014, now Pat. No. 10,222,015, said application No. 14/503,647 is a continuation-in-part of application No. 14/323,318, filed on Jul. 3, 2014, now Pat. No. 10,222,015, said application No. 15/355,515 is a continuation-in-part of application No. 14/289,968, filed on May 29, 2014, now Pat. No. 9,551,477, which is a continuation-in-part of application No. 14/280,865, filed on May 19, 2014, now Pat. No. 9,581,299, said application No. 14/323,318 is a continuation-in-part of application No. 14/023,889, filed on Sep. 11, 2013, now Pat. No. 10,323,811, said application No. 14/280,865 is a division of application No. 13/540,728, filed on Jul. 3, 2012, now Pat. No. 8,834,009, said application No. 14/606,242 is a continuation-in-part of application No. 13/367,758, filed on Feb. 7, 2012, now Pat. No. 8,967,831, said application No. 14/844,314 is a continuation of application No. 12/938,564, filed on Nov. 3, 2010, now Pat. No. 9,239,513, said application No. 15/355,512 is a continuation-in-part of application No. 12/886,832, filed on Sep. 21, 2010, and a continuation-in-part of application No. 12/834,435, filed on Jul. 12, 2010, said application No. 14/968,153 is a continuation-in-part of application No. 12/292,153, filed on Nov. 12, 2008, now Pat. No. 7,871,192, said application No. 12/834,432 is a continuation of application No. 12/292,153, filed on Nov. 12, 2008, now Pat. No. 7,871,192.

(51) Int. Cl.

| | |
|---|---|
| *F21V 29/00* | (2015.01) |
| *F21V 23/04* | (2006.01) |
| *F21V 21/14* | (2006.01) |
| *F21S 10/00* | (2006.01) |
| *F21S 9/02* | (2006.01) |
| *F21K 9/60* | (2016.01) |
| *F21K 9/232* | (2016.01) |
| *H04N 5/235* | (2006.01) |
| *H04N 5/225* | (2006.01) |
| *H04N 5/76* | (2006.01) |
| *H04N 5/247* | (2006.01) |
| *H04N 7/18* | (2006.01) |
| *F21V 33/00* | (2006.01) |
| *H04N 5/232* | (2006.01) |
| *G01S 3/786* | (2006.01) |
| *F21V 21/08* | (2006.01) |
| *F21V 14/02* | (2006.01) |
| *F21S 8/00* | (2006.01) |
| *F21K 9/65* | (2016.01) |
| *F21S 2/00* | (2016.01) |
| *F21Y 115/10* | (2016.01) |
| *F21K 9/235* | (2016.01) |
| *F21V 19/00* | (2006.01) |
| *F21W 121/00* | (2006.01) |
| *F21V 21/30* | (2006.01) |
| *F21V 21/29* | (2006.01) |
| *F21V 21/22* | (2006.01) |
| *F21V 9/08* | (2018.01) |
| *F21Y 101/00* | (2016.01) |
| *F21W 131/30* | (2006.01) |
| *F21Y 115/30* | (2016.01) |

(52) U.S. Cl.
CPC ............... *F21S 4/28* (2016.01); *F21S 8/035* (2013.01); *F21S 8/038* (2013.01); *F21S 9/022* (2013.01); *F21S 10/002* (2013.01); *F21V 14/02* (2013.01); *F21V 21/08* (2013.01); *F21V 21/14* (2013.01); *F21V 23/04* (2013.01); *F21V 23/0442* (2013.01); *F21V 29/00* (2013.01); *F21V 33/0052* (2013.01); *G01S 3/7864* (2013.01); *H04N 5/2252* (2013.01); *H04N 5/2256* (2013.01); *H04N 5/2257* (2013.01); *H04N 5/2354* (2013.01); *H04N 5/23241* (2013.01); *H04N 5/247* (2013.01); *H04N 5/76* (2013.01); *H04N 7/181* (2013.01); *F21K 9/235* (2016.08); *F21S 2/005* (2013.01); *F21V 9/08* (2013.01); *F21V 19/006* (2013.01); *F21V 21/22* (2013.01); *F21V 21/29* (2013.01); *F21V 21/30* (2013.01); *F21V 23/0492* (2013.01); *F21W 2121/00* (2013.01); *F21W 2131/30* (2013.01); *F21Y 2101/00* (2013.01); *F21Y 2115/10* (2016.08); *F21Y 2115/30* (2016.08); *Y02B 10/30* (2013.01); *Y10S 362/80* (2013.01)

(58) Field of Classification Search
CPC .......... F21K 9/60; F21K 9/022; F21V 414/02; F21V 21/08; F21V 21/14; F21V 23/04; F21V 23/0442; F21V 29/00
See application file for complete search history.

(56) References Cited

U.S. PATENT DOCUMENTS

| | | | | |
|---|---|---|---|---|
| 4,955,714 A * | 9/1990 | Stotler | ............... | G09B 27/00 |
| | | | | 353/122 |
| 5,408,389 A * | 4/1995 | Burlingame | ............ | F21S 10/06 |
| | | | | 362/284 |
| 5,555,658 A * | 9/1996 | Yu | ............... | F21S 10/007 |
| | | | | 362/811 |
| 6,292,901 B1 * | 9/2001 | Lys | ............... | A61N 5/0616 |
| | | | | 713/300 |
| 7,161,313 B2 * | 1/2007 | Piepgras | ............... | F21S 8/035 |
| | | | | 315/292 |

(56) References Cited

U.S. PATENT DOCUMENTS

| | | | | |
|---|---|---|---|---|
| 7,909,468 B2 * | 3/2011 | Lloyd | ............... | G03B 21/06 |
| | | | | 353/50 |
| 2002/0105828 A1 * | 8/2002 | Chen | ............... | G11C 11/5621 |
| | | | | 365/185.18 |
| 2003/0184831 A1 * | 10/2003 | Lieberman | ............... | G03H 1/22 |
| | | | | 359/32 |
| 2004/0108264 A1 * | 6/2004 | Hajek | ............... | B01D 29/33 |
| | | | | 210/488 |
| 2012/0188451 A1 * | 7/2012 | Schmidt | ............... | H04N 9/3141 |
| | | | | 348/553 |
| 2017/0175963 A1 * | 6/2017 | Lentine | ............... | F21S 10/007 |
| 2017/0191631 A1 * | 7/2017 | Lentine | ............... | F21S 10/007 |

* cited by examiner

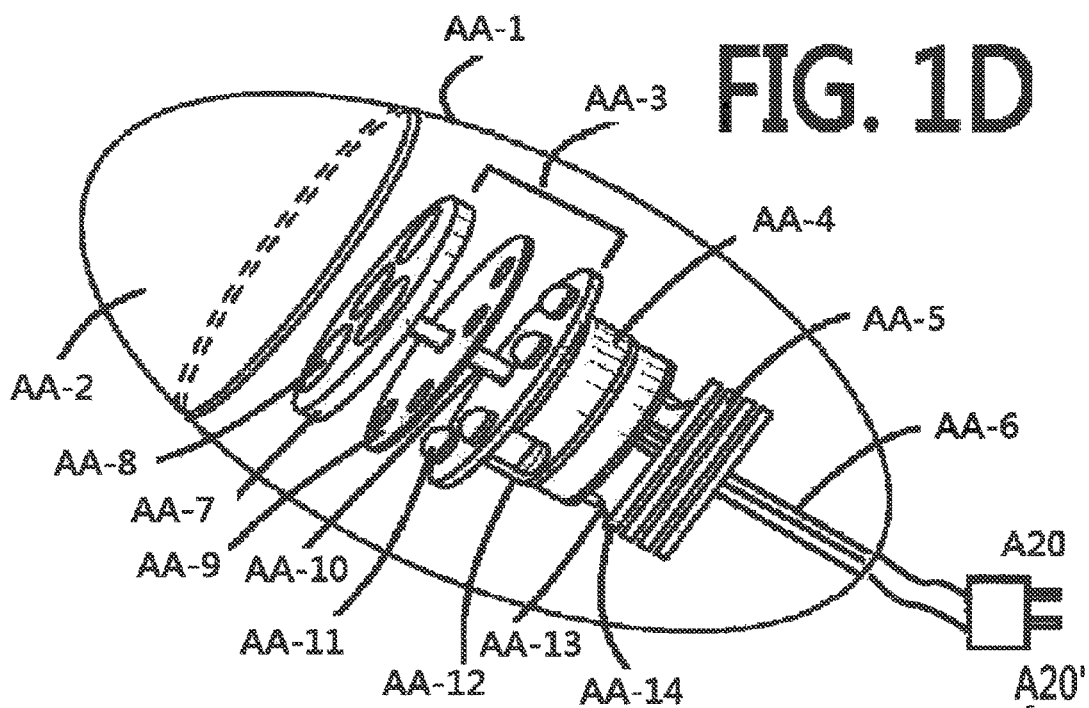
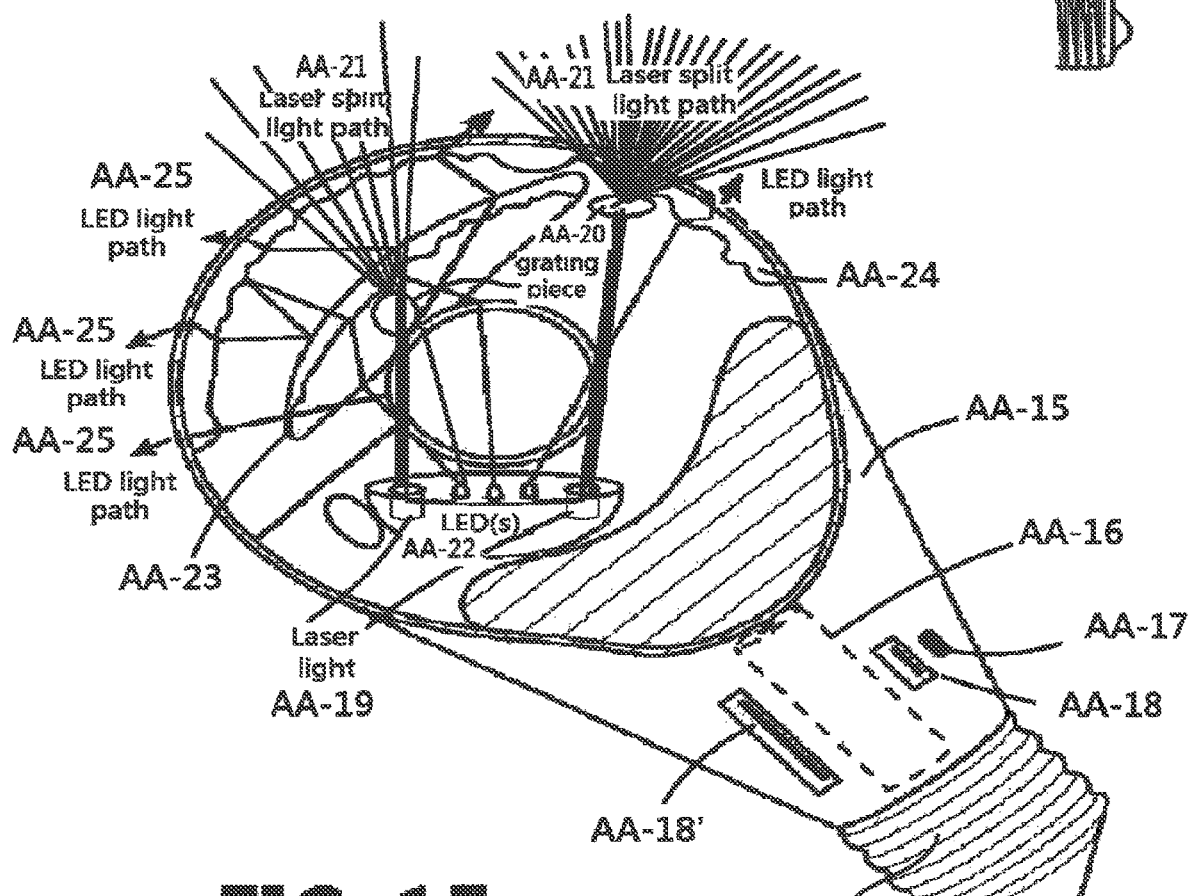

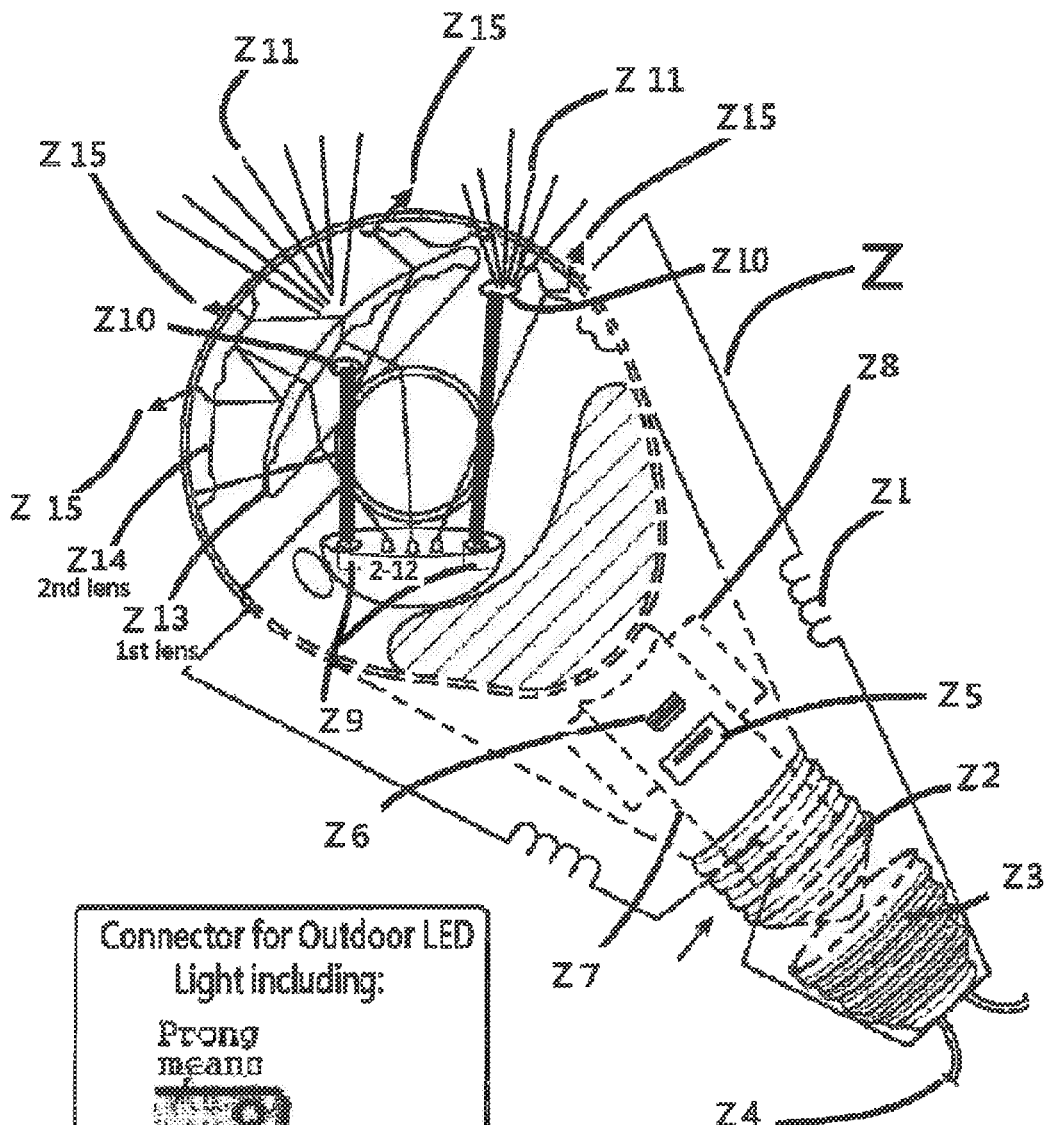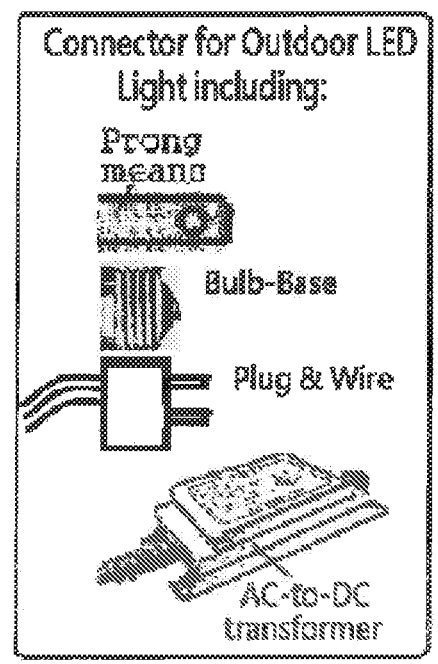
FIG. 2

FIG. 6A
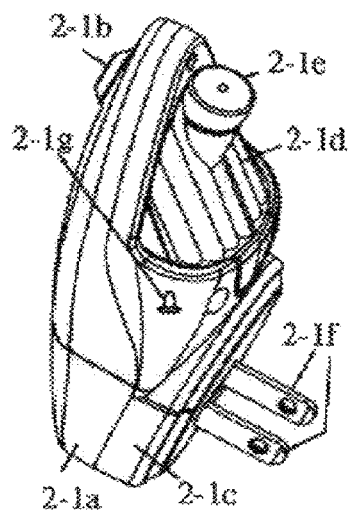
FIG. 6B
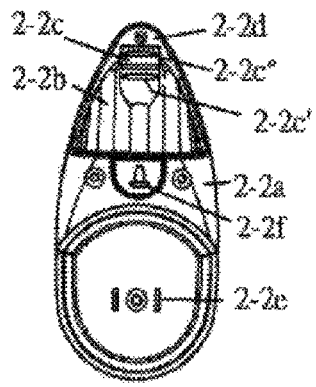
FIG. 6C
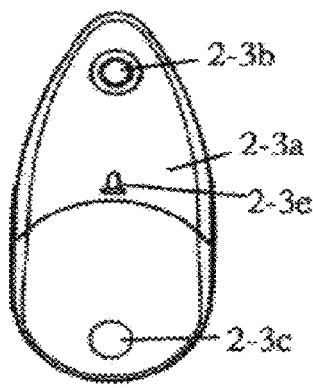
FIG. 6D
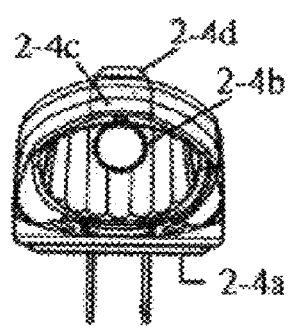
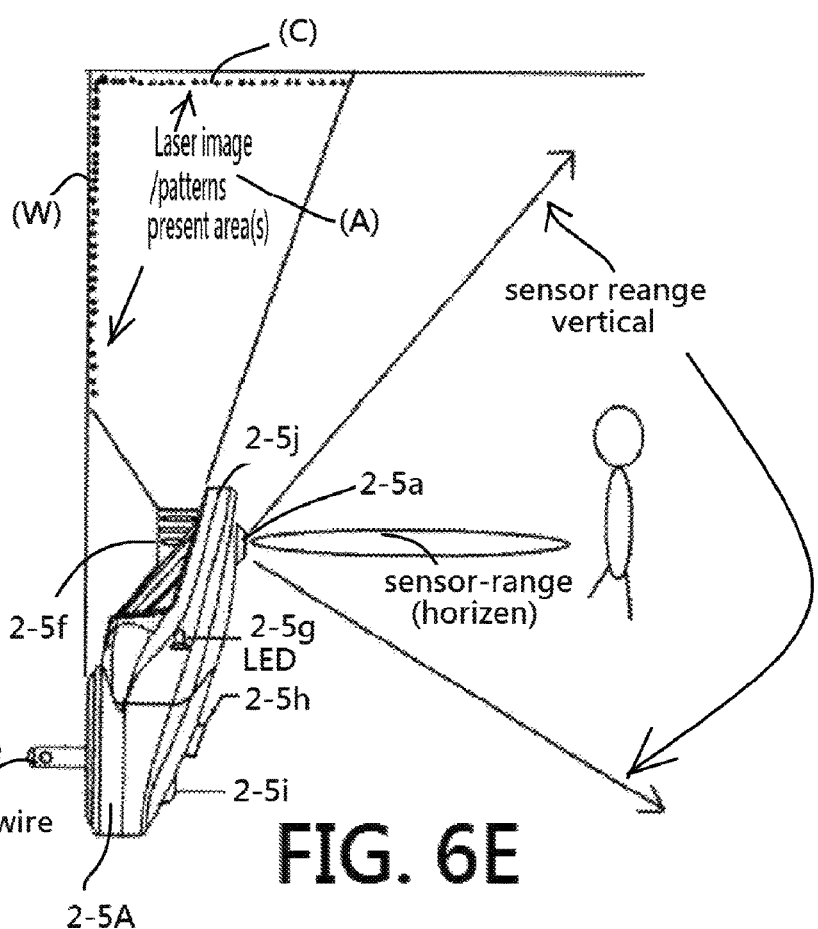
FIG. 6E

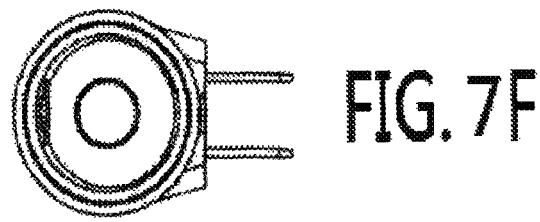
FIG. 7F
FIG. 7C    FIG. 7D    FIG. 7E
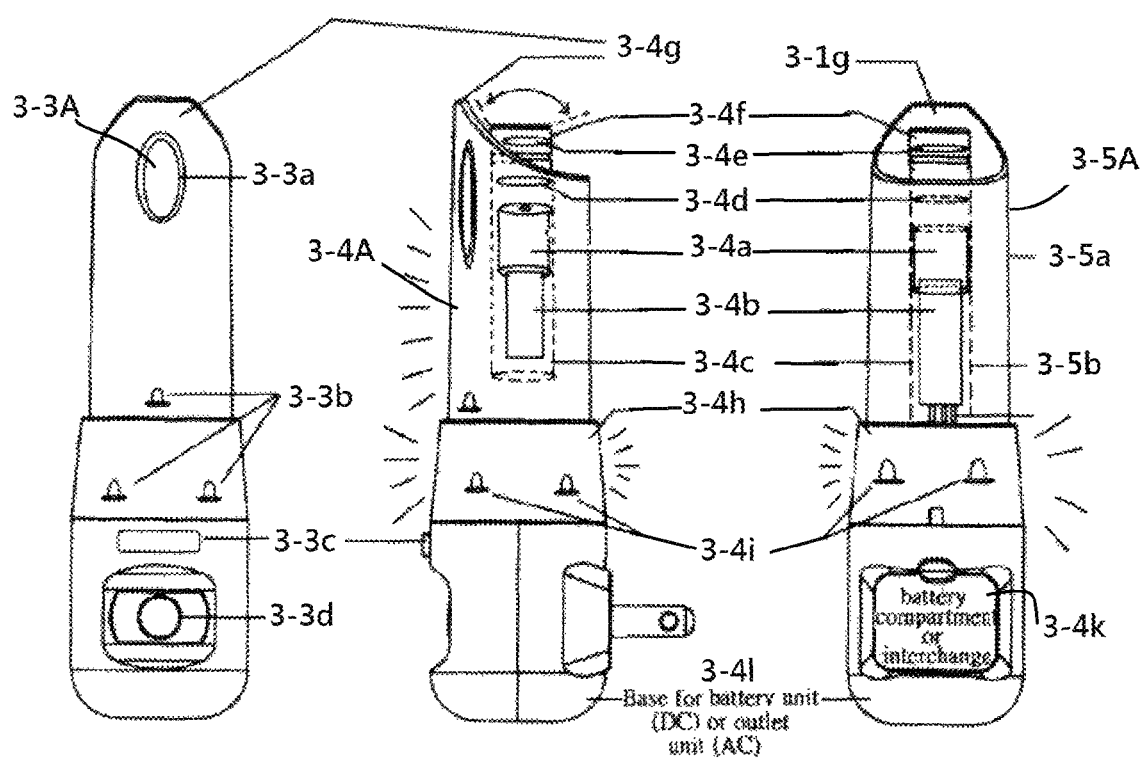

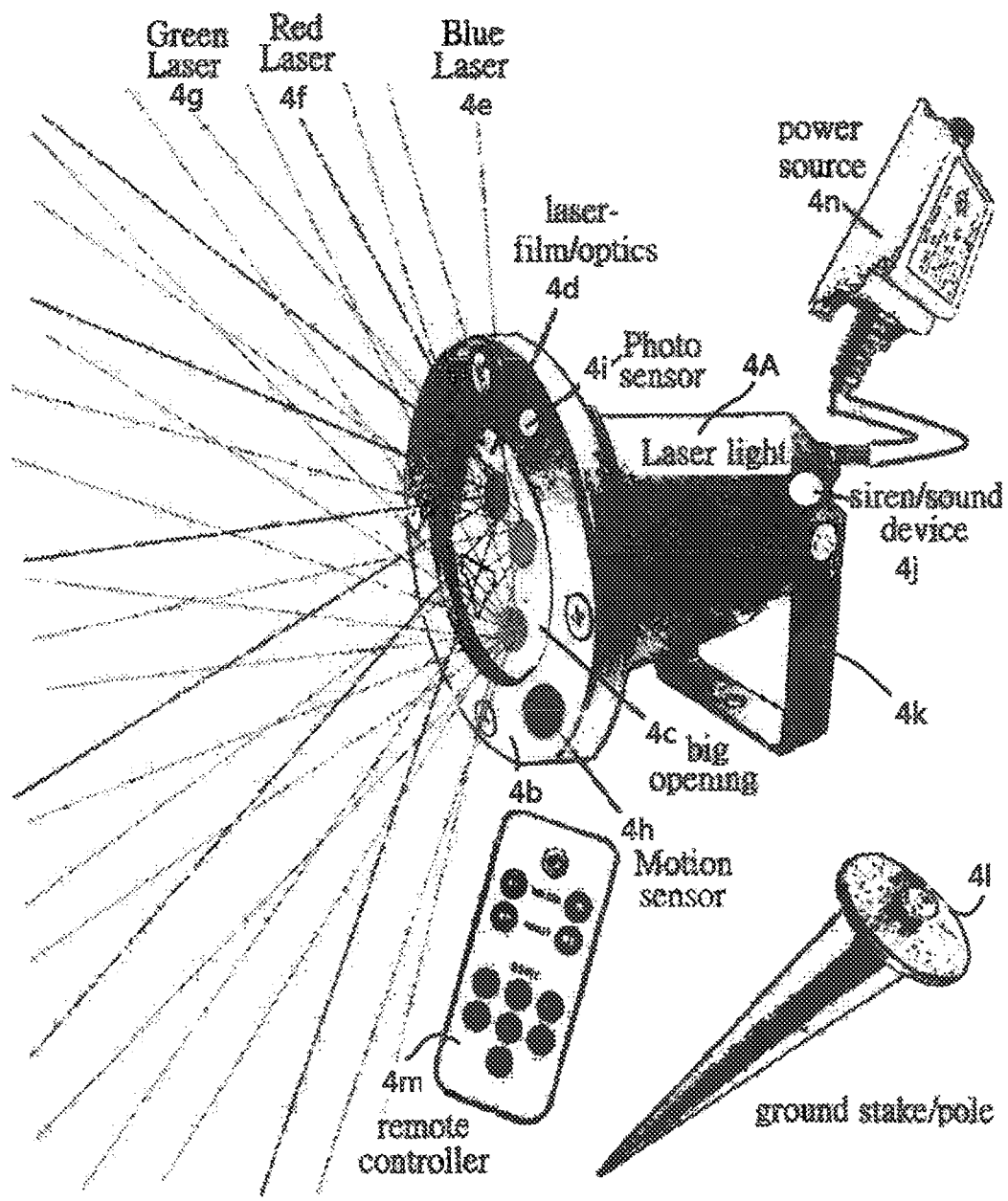

Light string: including Cafe-lite, patio light-string land-scape light-string, seasonal light-string,

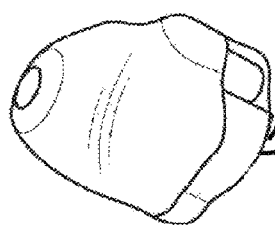
FIG. 10H
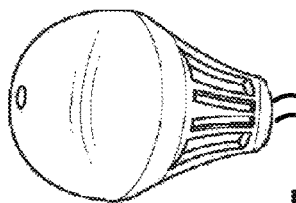
FIG. 10I
Plug & Wire
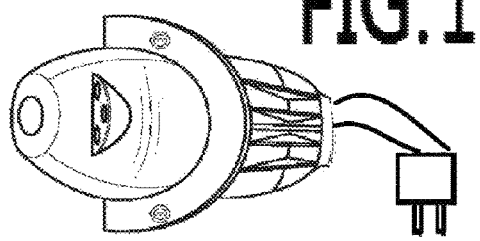
FIG. 10J
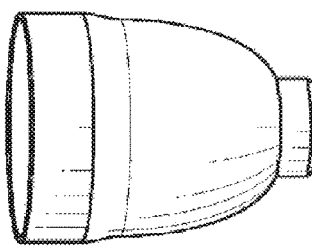
FIG. 10K
Plug & Wire
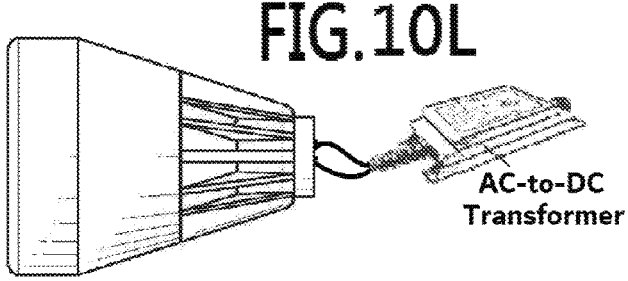
FIG. 10L
AC-to-DC Transformer
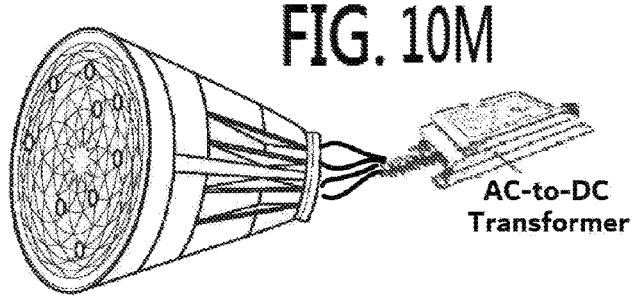
FIG. 10M
AC-to-DC Transformer
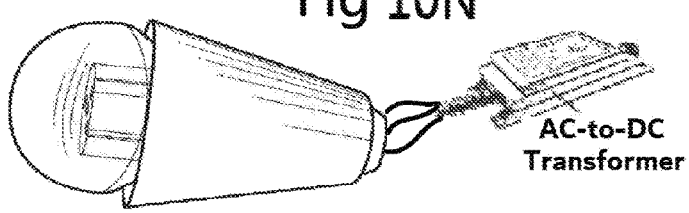
Fig 10N
AC-to-DC Transformer
FIG. 10O
Connector for outdoor LED light including:
10-aa Prong
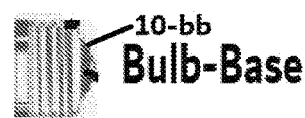
10-bb Bulb-Base
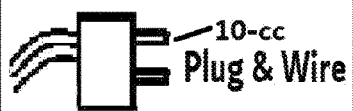
10-cc Plug & Wire
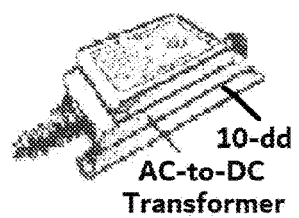
10-dd AC-to-DC Transformer

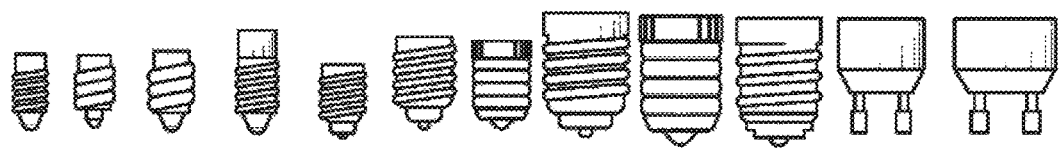
FIG. 11A
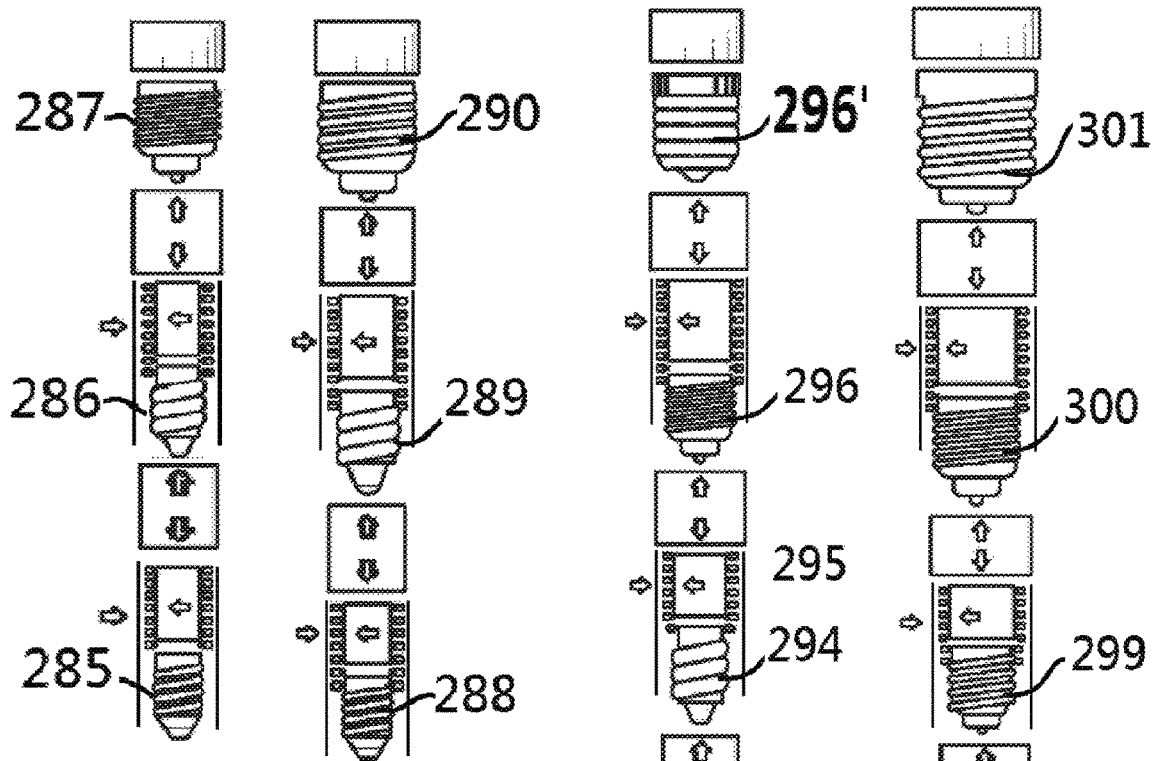
FIG. 11B  FIG. 11C  FIG. 11D  FIG. 11E
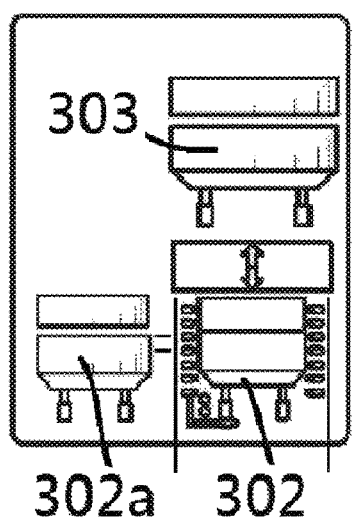

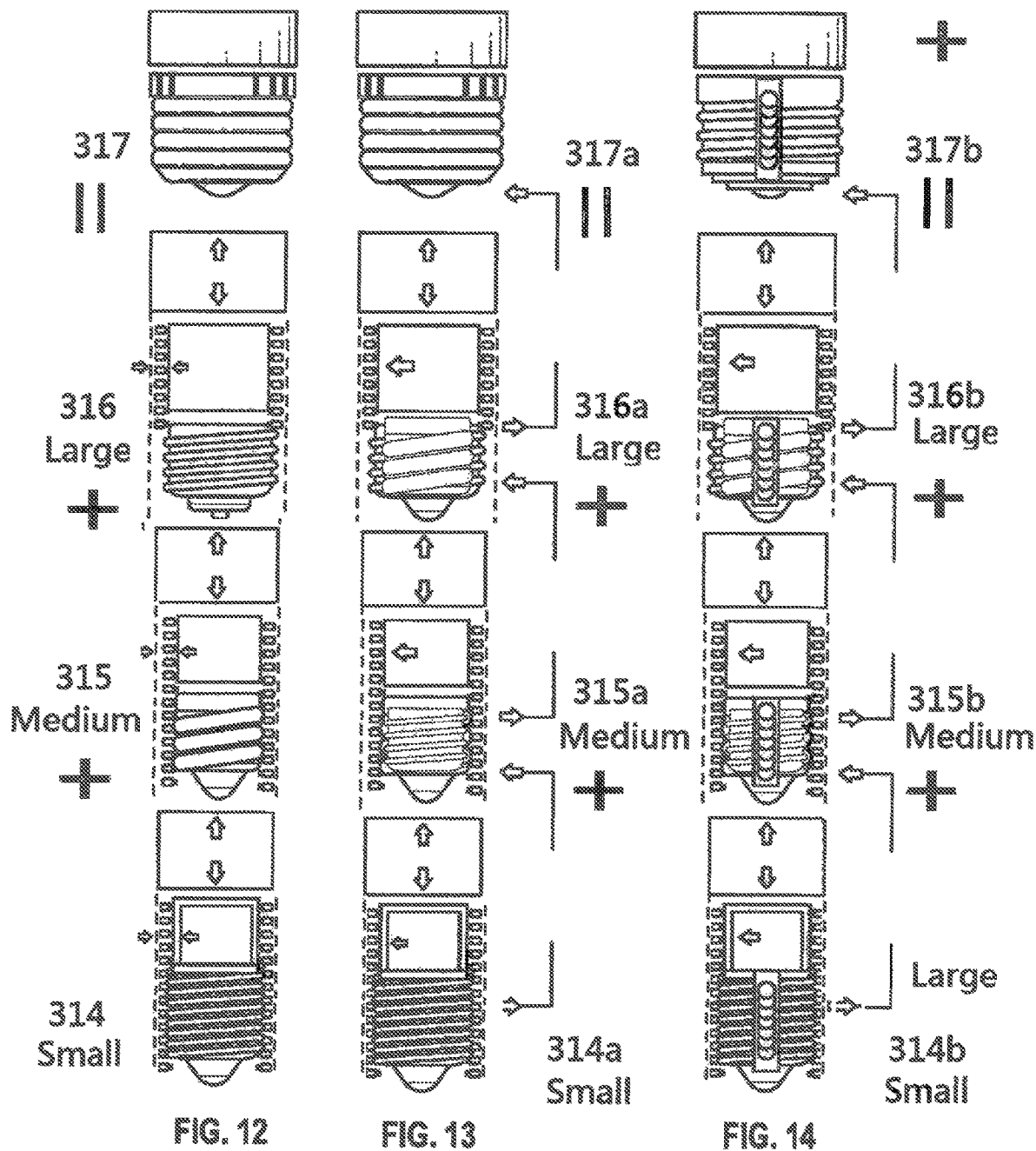

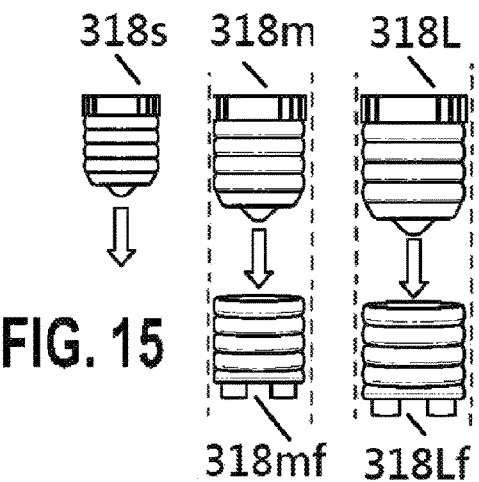
FIG. 15
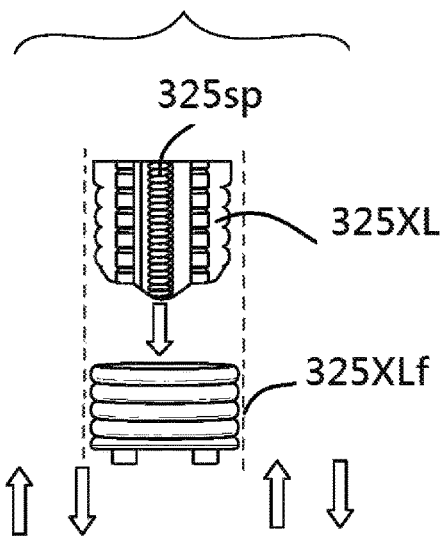
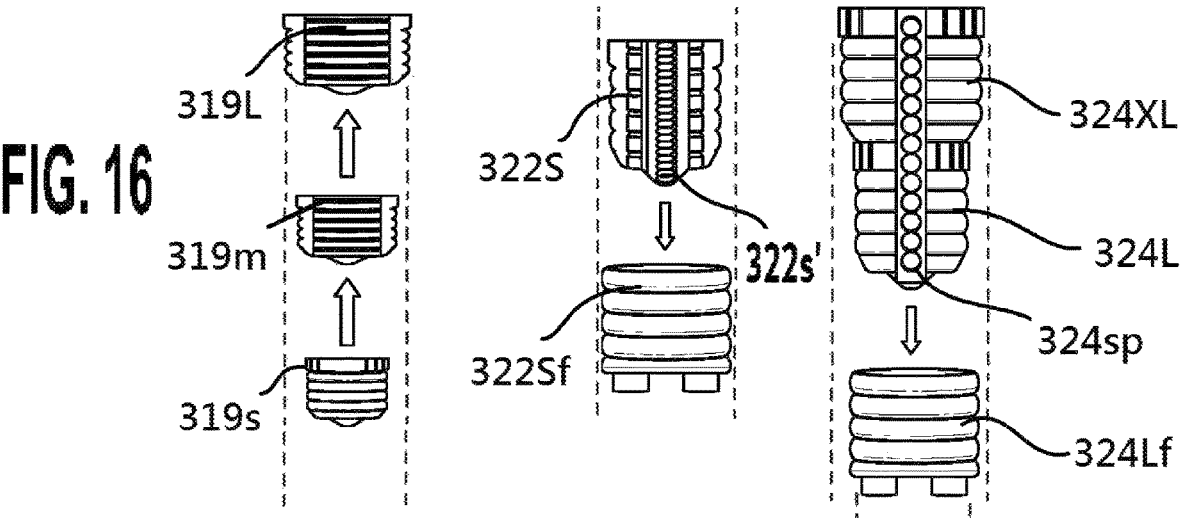
FIG. 17
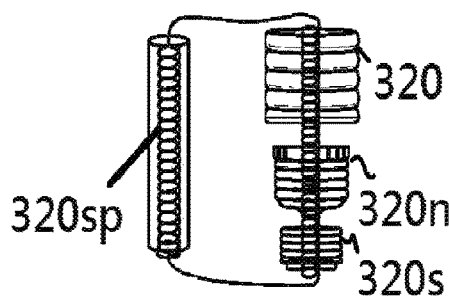
FIG. 16
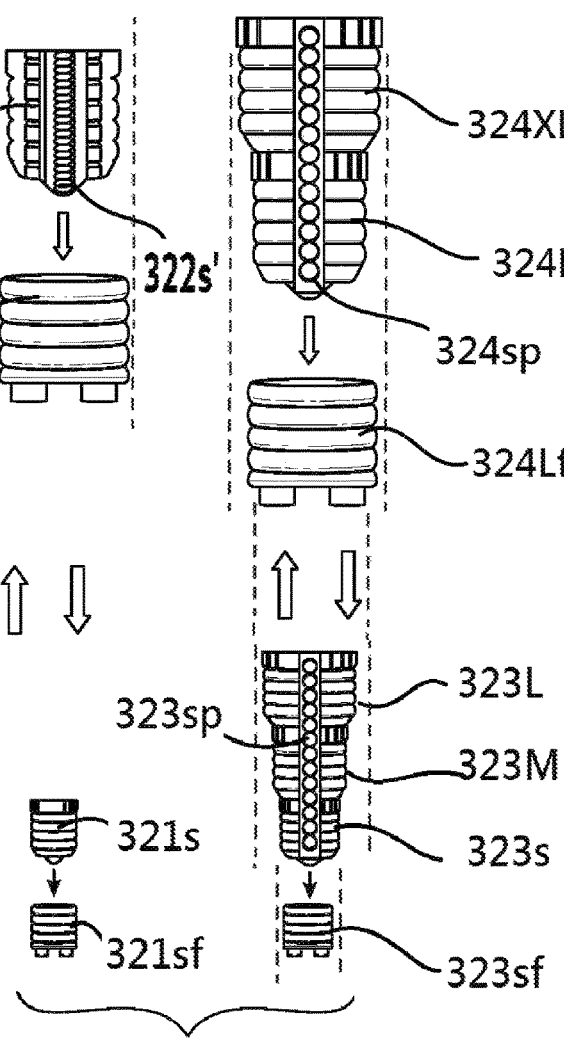
FIG. 18

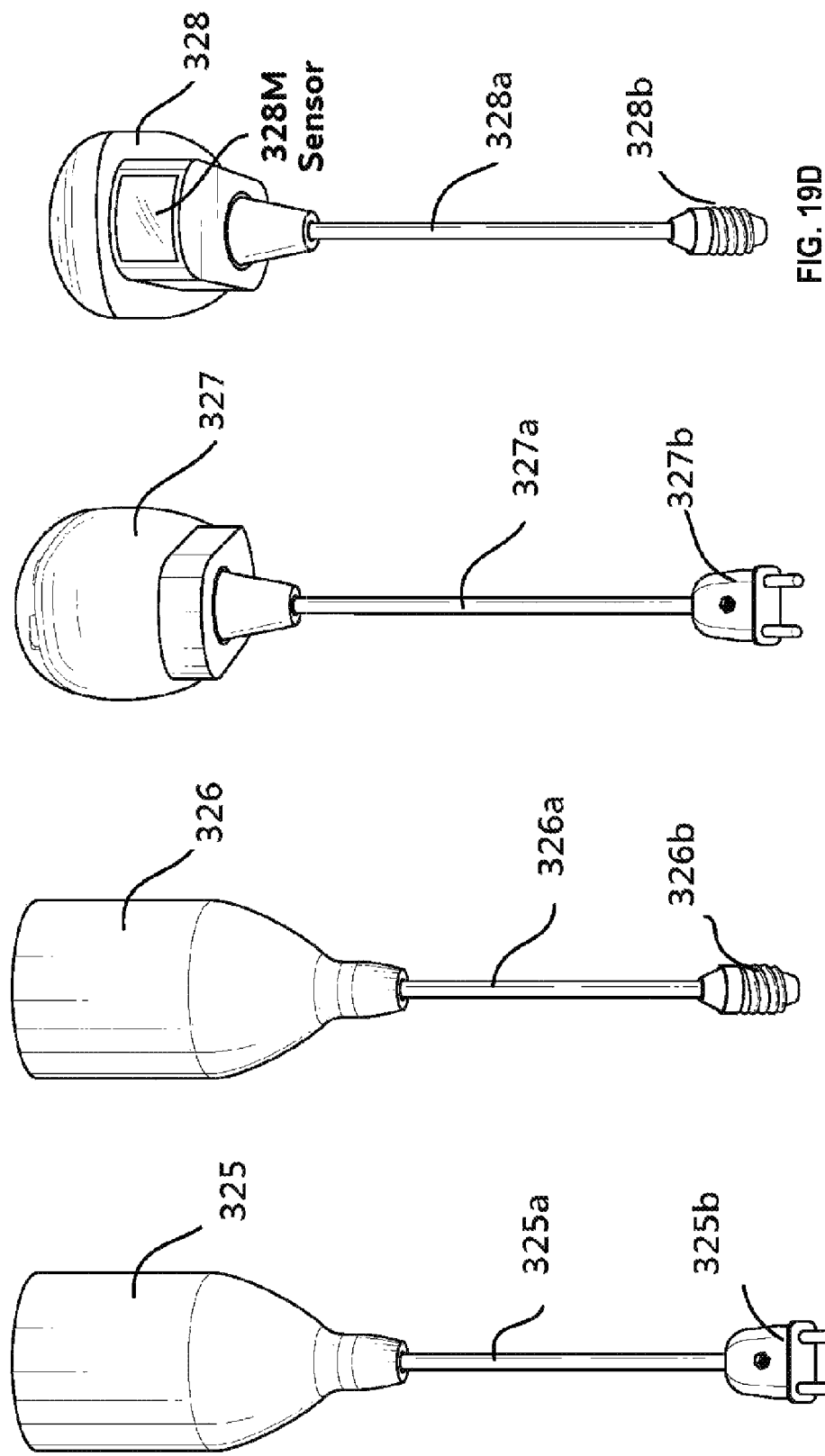

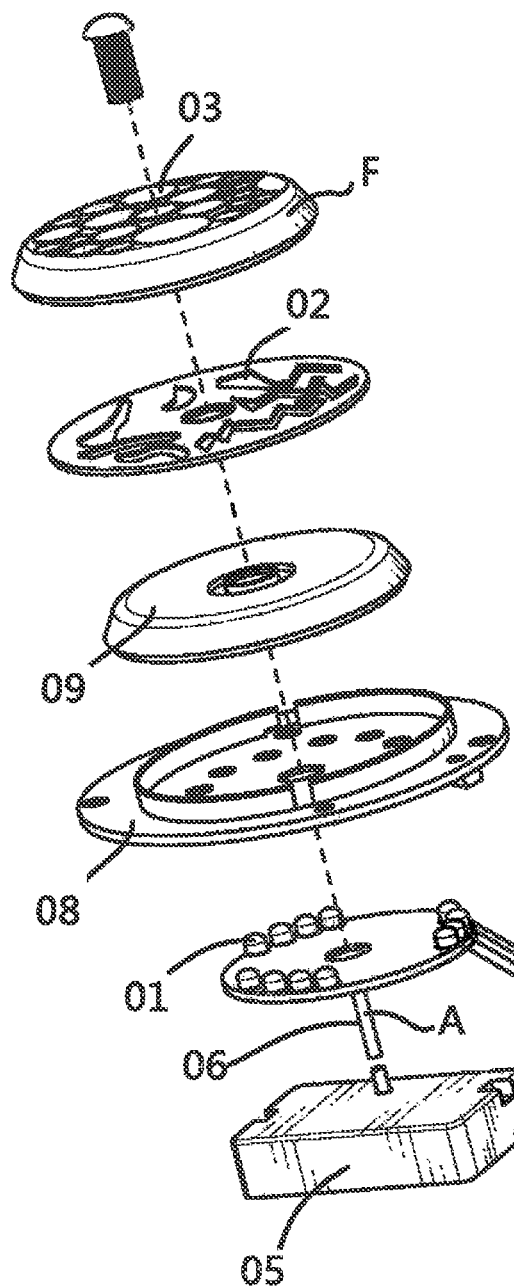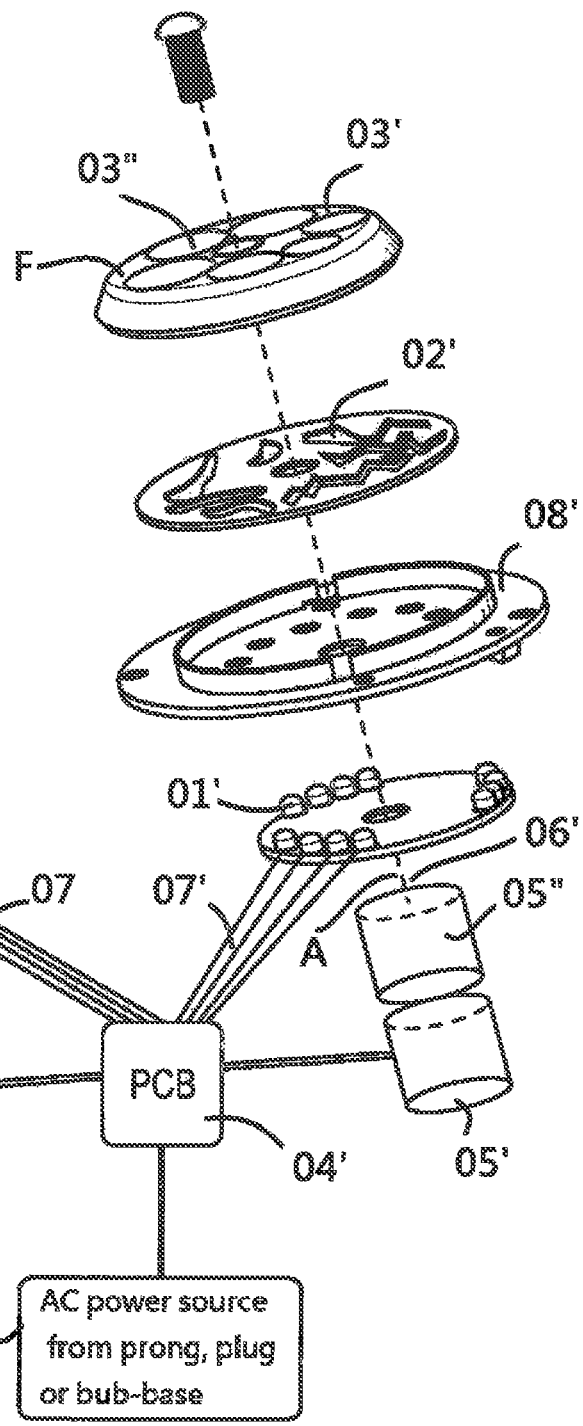

(# FF-2008) Parent Case

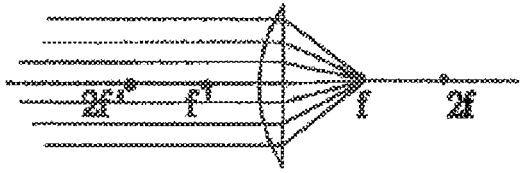

FIG. 23

Base Physic theory for Lens focus

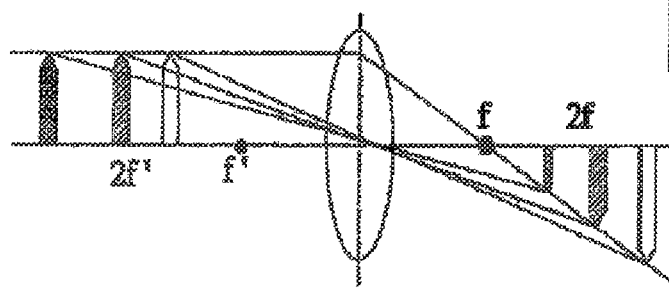

FIG. 24

Based Physic theory
Relation of object v.s. image v.s. focus of lens.
1. object on 2f' object has same size of image on 2f.
2. object between f' and 2f' -->
   image behind 2f with large reverse image.
3. object away from 2f' -->
   the image will fall within 1f and 2f
   with smaller and reverse image.

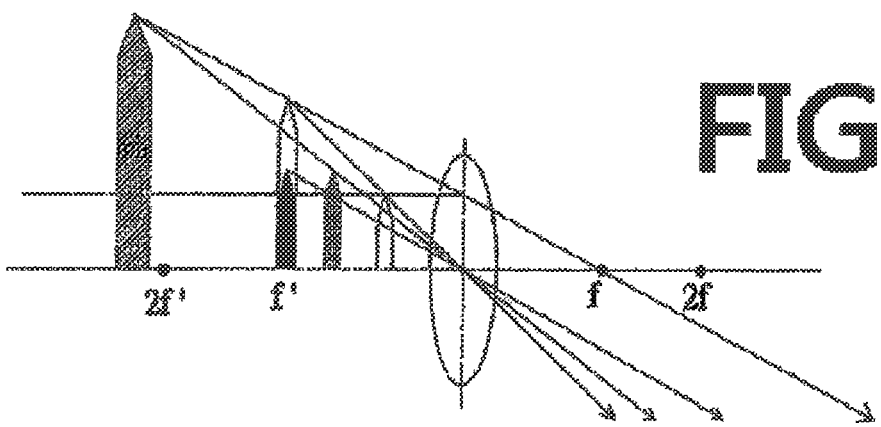

FIG. 25

Object location < f' -->
Image located on the same side of the f'. Image size
will become more smaller while the object more close
the lens.

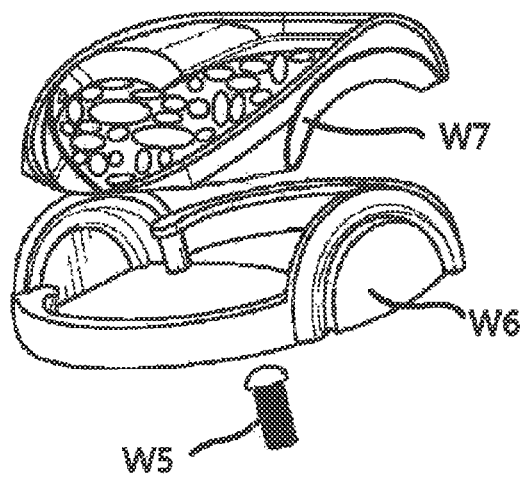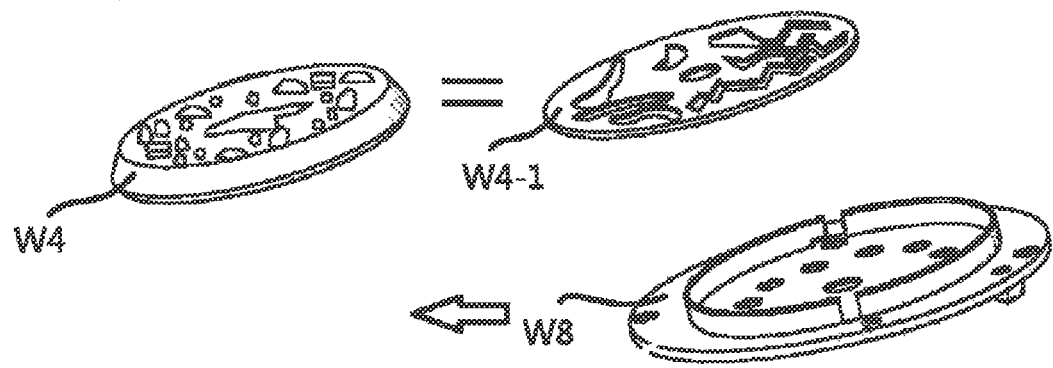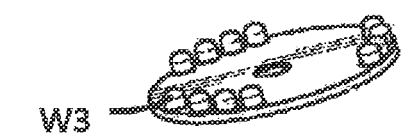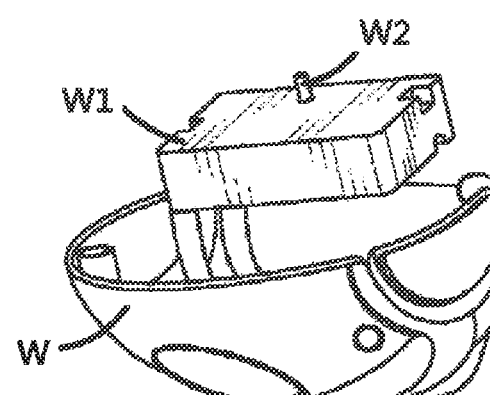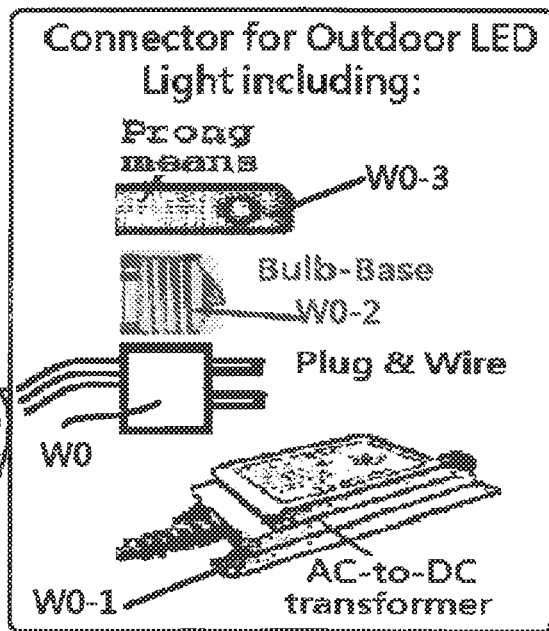
FIG. 27

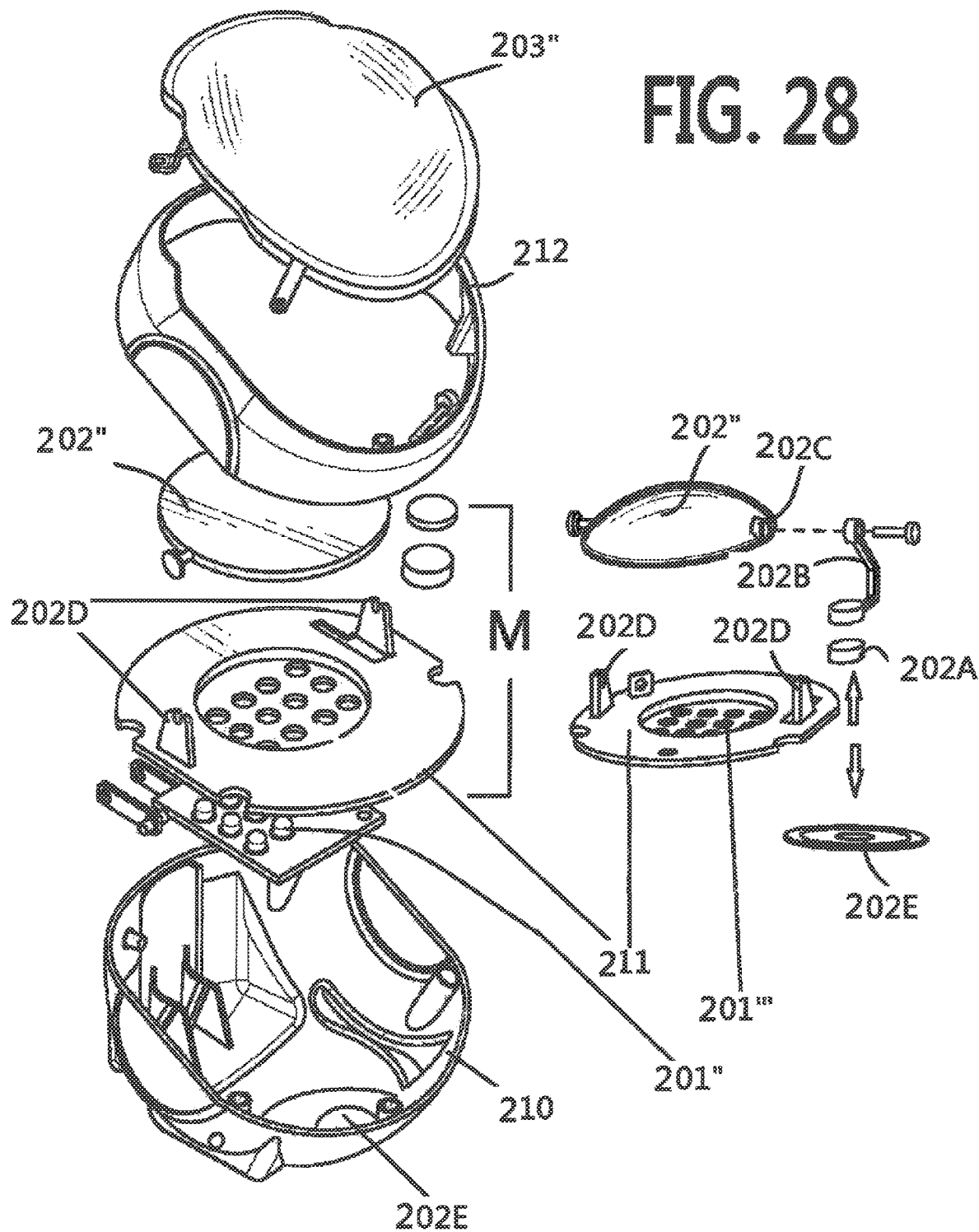

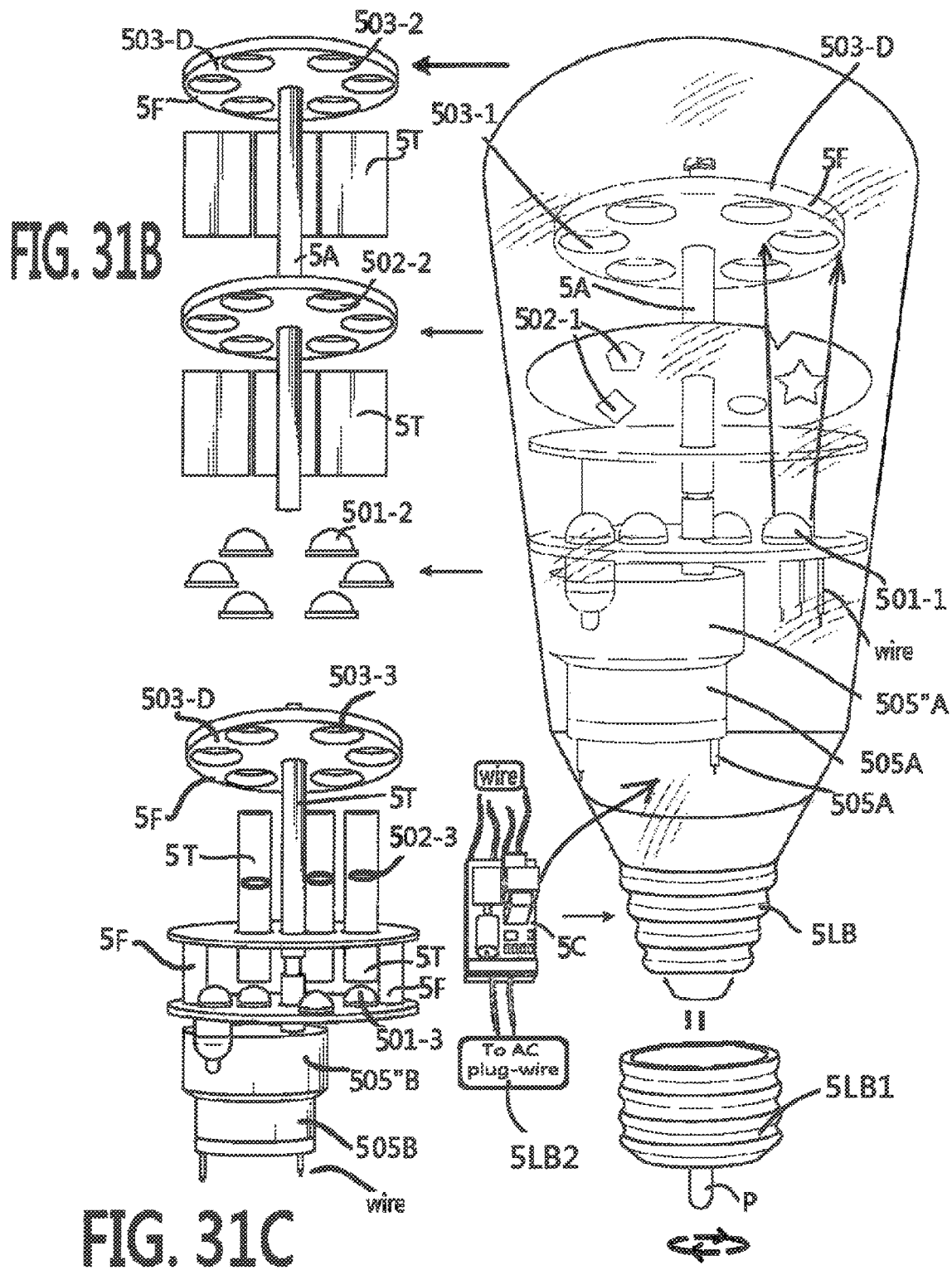

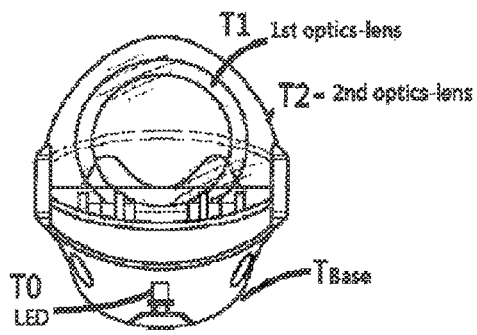
FIG. 34A
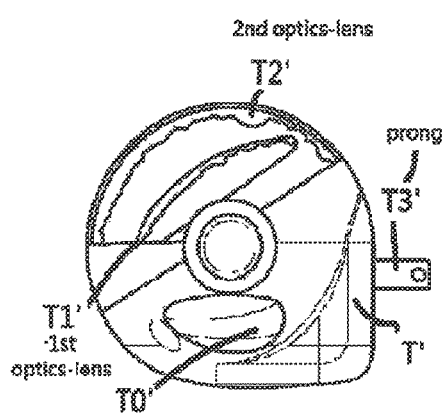
FIG. 34B
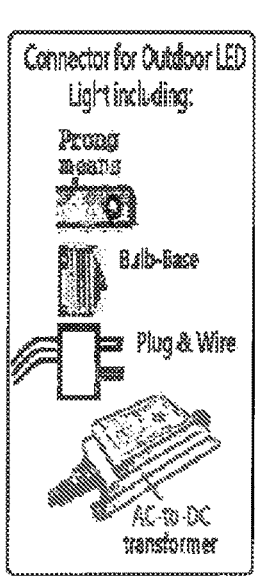
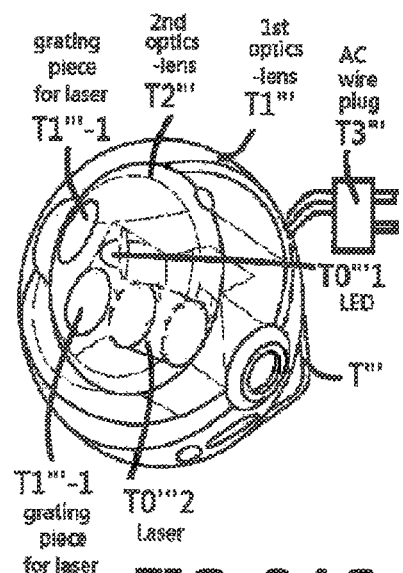
FIG. 34C
FIG. 34D
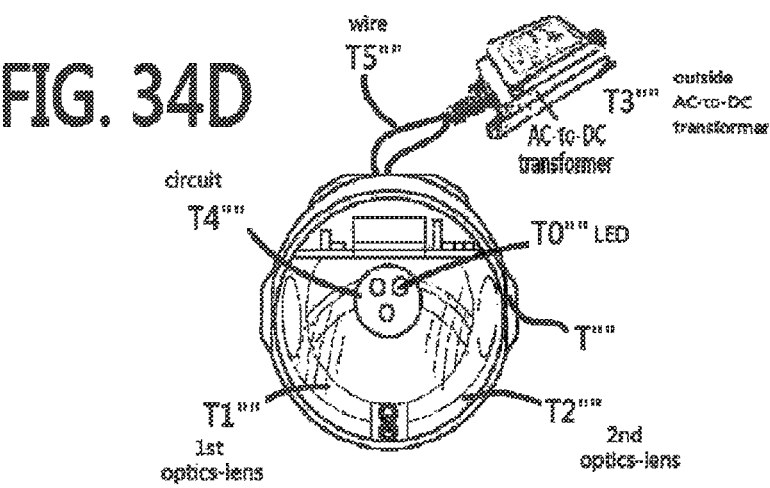

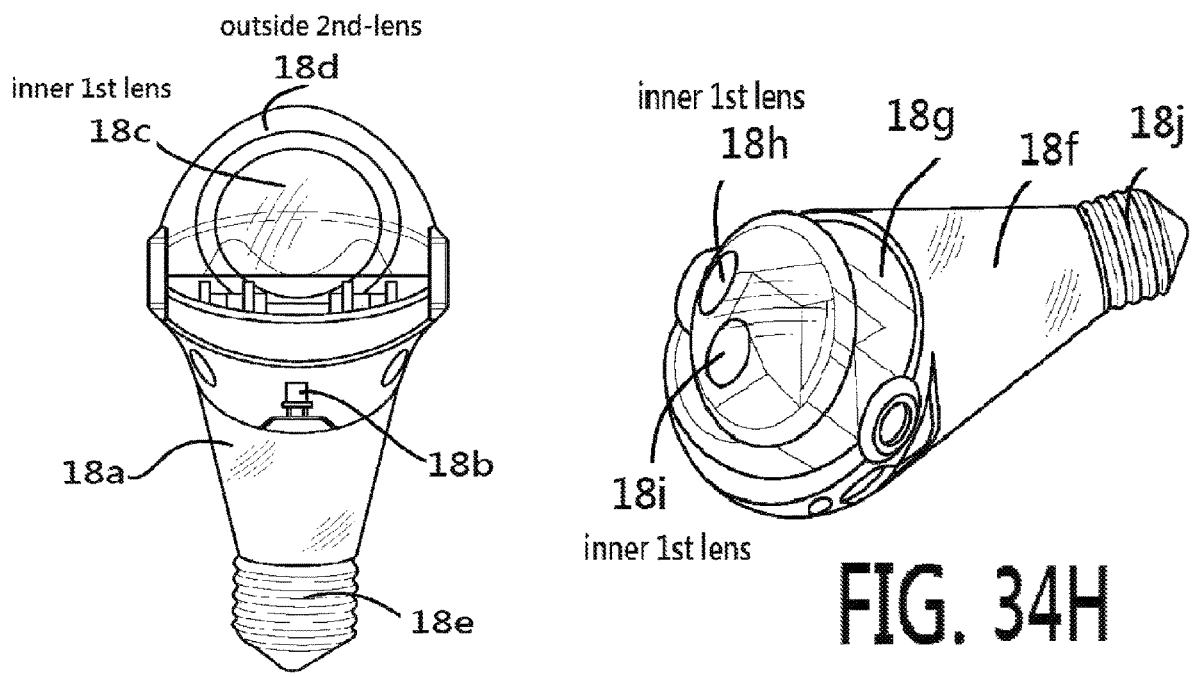
FIG. 34G
FIG. 34H
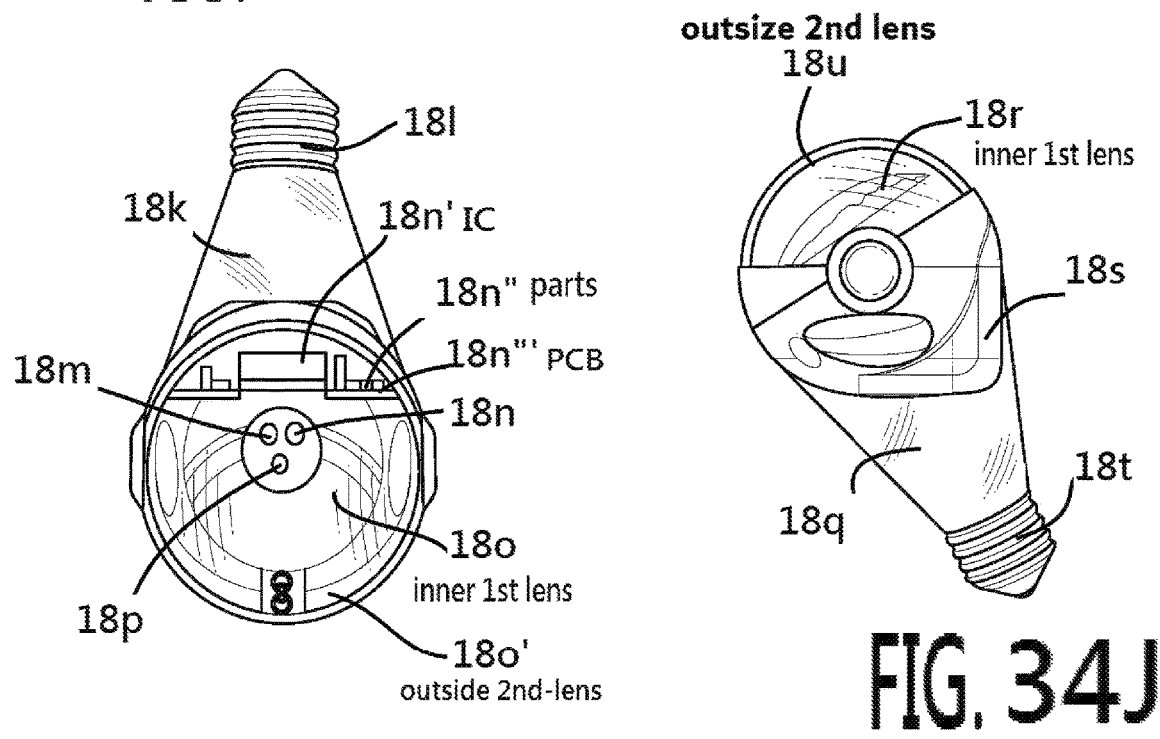
FIG. 34I
FIG. 34J

OUTDOOR LED PROJECTION LIGHT (1) This filing is continuously filing for (#DD-1) U.S. application Ser. No. 12/834,435 filed on Jul. 12 2010 which is continuously filing for (#DD-2008) U.S. application Ser. No. 12/292,153 filed on Nov. 12 2008 now is U.S. Pat. No. 7,871,192 which has Child continuity filed cases U.S. application Ser. No. 12/886,832 filed on Sep. 21 2010 and U.S. application Ser. No. 12/886,435 filed Jul. 12 2010 and U.S. application Ser. No. 14/622,628 filed on Feb. 13 2015 and U.S. application Ser. No. 14/737,434 filed on Jun. 11 2015 and U.S. application Ser. No. 14/943,645 filed on Nov. 18 2015 and U.S. application Ser. No. 14/944,953 filed on Dec. 14 2015 and U.S. application Ser. No. 14/968,153 filed on Dec. 14 2015 which is pending claims the benefit of Ser. No. 12/292,153 filed on Nov. 12 2008.

(2) The current invention is continuously filing (#XX-2) U.S. application Ser. No. 15/170,071 filed on Jun. 1 2016 which is Continuously filing of (#XX-1) U.S. application Ser. No. 14/844,314 filed on Sep. 2 2015 which is continue of (#XX-2010) U.S. application Ser. No. 12/938,564 filed on Nov. 3 2010 and now is U.S. Pat. No. 9,239,513.

(3) This filing is Division filing of (#ZZZ-4) for different LED or-and laser device under the U.S. application Ser. No. 15/296,599 filed date on Oct. 18 2016 LED or-and laser light device has more than one optics-element to create image or lighted patterns to the big range or wider areas US Application is PENDING filed on Oct. 15 2016 which is continue filing of LED or-and Laser Bulb (#ZZZ-3) U.S. application Ser. No. 14/503,647, now U.S. Pat. No. 9,719,654, filed on Oct. 1 2014 which is Division filing of (#ZZZ-2) U.S. application Ser. No. 14/451,822 filed on Aug. 5 2014, now allowed, which is Continue In Part filing of (#ZZZ-1) U.S. application Ser. No. 14/323,318 filed on Aug. 5 2014, now allowed, which is Continue In Pat filing of (#ZZZ-13) U.S. application Ser. No. 14/023,889 filed on Sep. 11 2013. Related to apply the reflective or refractive optics lens or optics element to create the wider area image or lighted patterns for (LED or-and Laser) light device powered by conductive parts including prong, USB-wires or for (LED or-and Laser) Bulb base for with or without motor/spin/rotating kits for moving image.

This filing is continuously fling for LED or-and Laser Bulb (#QQQ-4) U.S. application Ser. No. 15/355,515 filed on Nov. 18 2016. which is the Continue filing for (#QQQ-5) U.S. application Ser. No. 15/341,782 filed on Nov. 2 2016 which is the Continue filing for (#QQQ-3) U.S. application Ser. No. 14/983,993 filed on Dec. 30 2015 which is the Continue filing for (#QQQ-2) U.S. application Ser. No. 14/289,968 filed on May 29 2014 allowance on Oct. 5 2016, which is Division filing of (#QQQ-1) of U.S. application Ser. No. 14/280,865, filed on May 19 2014 and is Continuously of (#QQQ-12) U.S. Ser. No. 13/540,728 LED Bulb now is allowanced and issue fee paid before Mar. 19 2014 Now is U.S. Pat. No. 8,834,009. Related for LED bulb has project or-and night light.

(5) This filing is Division filing of (#MMM-2) U.S. application Ser. No. filed on U.S. Pat. No. 402,965 filed on Jan. 10 2017. which is the Continue filing for (#MMM-1) U.S. application Ser. No. 14/606,242 filed on Jan. 27 2015 now is U.S. Pat. No. 9,541,260. which is Continue in Part of (#MMM-11) U.S. application Ser. No. 13/367,758 filed on Feb. 7 2012, Now is U.S. Pat. No. 8,967,831 related for the LED Bulb has extendable/retractable design to overcome block-items that may interfering the camera, electric signal delivery; and also (LED or-and laser) bulb has the USB ports and Rechargeable batteries and rechargeable circuit to be charged or supply current to other device so including USB Charger, Power bank, (LED or-and Laser) light device's functions has at least 3 functions in one unit.

(4) This filing is Division filing of (#JJJ-1) U.S. application Ser. No. 14/049,427 now is U.S. Pat. No. 9,010,986 Apr. 21 2015 issued, which is continue filing of (#JJJ-11) U.S. application Ser. No. 13/296,508 Filed on Nov. 15 2011. Now is U.S. Pat. No. 8,562,158 issued on Oct. 22 2013. Related the LED bulb has built-in Camera and storage-kits with multiple functions to replay, see by wired or wireless.

BACKGROUND OF THE INVENTION

All had the LED and Laser drawing and details.
This filing is Continue Filing or Division filing of the following parent filing case:

| Application Number | Filing Date | Pat. No. |
|---|---|---|
| 12-938564(XX-10) | Nov. 3, 2010 | 9,239,513 |
| 14-844314(XX-1) | Sep. 3, 2015 | |
| 14-023899(ZZ-13) | Sep. 11, 2013 | |
| 14-503647(ZZ-3) | Oct. 1ˢᵗ, 2014 | |
| 12-886832(TT-10) | Sep. 21, 2010 | |
| 14-280865(QQQ-1) | May 19, 2014 | |
| 12-624,621(II-09) | Nov. 24, 2009 | 8,303,150 |
| 13-534611(II-1) | Jan. 27, 2012 | 8,717,799 |
| 13-540689 (II-2) | Jul. 3, 2012 | 8,511,877 |

(1) This filing is continuously filing for (#DD-1) U.S. application Ser. No. 12/834,435 filed on Jul. 12 2010 which is continuously filing for (#DD-2008) U.S. application Ser. No. 12/292,153 filed on Nov. 12 2008 now is U.S. Pat. No. 7,871,192 which has Child continuity filed cases U.S. application Ser. No. 12/886,832 filed on Sep. 21 2010 and U.S. application Ser. No. 12/886,435 filed Jul. 12 2010 and U.S. application Ser. No. 14/622,628 filed on Feb. 13 2015 Now is U.S. Pat. No. 9,097,413.
and U.S. application Ser. No. 14/737,434 filed on Jun. 11 2015 and U.S. application Ser. No. 14/943,645 filed on Nov. 18 2015 and U.S. application Ser. No. 14/944,953 filed on Dec. 14 2015 and U.S. application Ser. No. 14/968,153 filed on Dec. 14 2015 which is pending claims the benefit of Ser. No. 12/292,153 filed on Nov. 12 2008.

(2) The current invention is continuously filing (#XX-2) U.S. application Ser. No. 15/170,071 filed on Jun. 1 2016 which is Continuously filing of (#XX-1) U.S. application Ser. No. 14/844,314 filed on Sep. 2 2015 which is continue of (#XX-2010) U.S. application Ser. No. 12/938, 564 filed on Nov. 3 2010 and now is U.S. Pat. No. 9,239,513.

(3) This filing is Division filing of (#ZZZ-4) for different LED or-and laser device under the U.S. application Ser. No. 15/296,599 filed date on Oct. 18 2016 LED or-and laser light device has more than one optics-element to create image or lighted patterns to the big range or wider areas US Application is filed on Oct. 15 2016 which is continue filing of LED or-and Laser Bulb (#ZZZ-3) U.S. application Ser. No. 14/503,647 filed on Oct. 1 2014 which is Division filing of (#ZZZ-2) U.S. application Ser. No. 14/451,822 filed on Aug. 5 2014, which is Continue In Part filing of (#ZZZ-1) U.S. application Ser. No. 14/323,318 filed on Aug. 5 2014 which is Continue In Pat filing of (#ZZZ-13) U.S. application Ser. No. 14/023,889 filed on Sep. 11 2013. Related to apply the reflective or refractive optics lens or optics element to create the wider area image or lighted patterns for (LED or-and Laser)

light device powered by conductive parts including prong, USB-wires or for (LED or-and Laser) Bulb base for with or without motor/spin/rotating kits for moving image.

This filing is continuously fling for LED or-and Laser Bulb (#QQQ-4) U.S. application Ser. No. 15/348,218 filed on Nov. 10 2016 which is the Continue filing for (#QQQ-5) U.S. application Ser. No. 15/341,782 filed on Nov. 2 2016 which is the Continue filing for (#QQQ-3) U.S. application Ser. No. 14/983,993 filed on Dec. 30 2015, now U.S. Pat. No. 9,090,739, which is the Continue filing for (#QQQ-2) U.S. application Ser. No. 14/289,968 filed on May 29 2014 now is U.S. Pat. No. 9,551,477. Which is Division filing of (#QQQ-1) of U.S. application Ser. No. 14/280,865, filed on May 19 2014 now is U.S. Pat. No. 9,581,229, and is Continuously of (#QQQ-12) U.S. Ser. No. 13/540,728 LED Bulb now is U.S. Pat. No. 8,834,009. Related for LED bulb has project or-and night light.

This filing is Division filing of (#MMM-2) U.S. application Ser. No. filed on Ser. No. 15/402,965 filed on Jan. 10 2017. which is the Continue filing for (#MMM-1) U.S. application Ser. No. 14/606,242 filed on Jan. 27 2015 now is U.S. Pat. No. 9,541,260. which is Continue in Part of (#MMM-11) U.S. application Ser. No. 13/367,758 filed on Feb. 7 2012, Now is U.S. Pat. No. 8,967,831 related for the LED Bulb has extendable/retractable design to overcome block-items that may interfering the camera, electric signal delivery; and also (LED or-and laser) bulb has the USB ports and Rechargeable batteries and rechargeable circuit to be charged or supply current to other device so including USB Charger, Power bank, (LED or-and Laser) light device's functions has at least 3 functions in one unit.

(4) This filing is Division filing of (#JJJ-1) U.S. application Ser. No. 14/049,427 now is U.S. Pat. No. 9,010,986 Apr. 21 2015 issued, which is continue filing of (#JJJ-11) U.S. application Ser. No. 13/296,508 Filed on Nov. 15 2011. Now is U.S. Pat. No. 8,562,158 issued on Oct. 22 2013. Related the LED bulb has built-in Camera and storage-kits with multiple functions to replay, see by wired or wireless.

All had the LED and Laser drawing and details.

The current invention is Continuously or Division filing for co-pending filing case as below which NOT ONLY for parent filing for (LED or-and Laser) light source for Bulb, garden light applications but also has features to use (LED or-and Laser) Light source or bulb for all kind of lighting device which has more features for any desired combination selected from (1) Project light (2) More than one function (3) adjust focus (4) adjust angle (5) Elastic contact points or conductive spring (6) LED heat solution (7) Heat sensitive parts isolation or ventilation (8) extend or movable parts (9) has camera, storage device (10) USB ports, rechargeable batteries, rechargeable circuit for been charged or supply current to other device as all prior filed patents; and has more features including below:

Features (1) The (LED or-and laser) light source or bulb has all parent filing of (#MMM-2011) U.S. Pat. No. 8,967,831 columns (4) line 60 to column 6 line 8 for listed a to z total 26 parts & accessories to make any combination to make the (LED or-and laser) bulb has desired functions. The current invention emphasizes more details (LED or-and Laser) light source for bulb which has the co-pending filing case's features as (#MMM-2011) U.S. Pat. No. 8,967,831. The parts as listed including: (e) "energy storage means for DC energy such as rechargeable or regular batteries" plus (g) "circuit means for a variety of desired functions" and USB ports, so can make the current invention has built-in USB charger, USB power back function for said (LED or- and laser) bulb for desk top or any light device use.

(2) The current invention also introduced the said light device incorporated with co-pending (LED or-and laser) light source or bulb including the garden light. To use the co-inventor's all prior art or parent filed case's (LED or-and Laser) light source or bulb fit into all kind of lighting fixture housing to become a desired application at least including; the garden light, security light, motion sensor light, power fail light. This feature listed as the (#MMM-2011) U.S. Pat. No. 8,967,831 Claim 6 listed application but not limited because the above listed prior arts has much more applications as well. It is appreciated all above listed or discussed co-inventor co-pending or co-issued patent all the idea, concept, claims, specification, features, functions still fall within the current invention scope of claims for replaceable, equivalent, equal functions reason. These feature and application can apply to the all kind of light device including garden light as wish. It is appreciated all the above listed or co-pending or issued parent filed cases all detail description, drawing, figure, content, claims should be still fall within the current invention.

(2) the co-pending invention (#QQQ-5) U.S. application Ser. No. 15/341,782 filed on Nov. 2 2016 for (LED or-and Laser) Bulb has built-in more than one of the bulb-base(s) that can be desired combinations for market available bulb base(s) into one (LED or-and Laser) bulb. The one of (LED or-and Laser) more than one bulb male base(s) can fit into more than one of different size of female Bulb-socket. This will reduce the (LED or-and Laser bulb) products at factory or at the shelves of market. The current market existing bulb has only one size or one specification of bulb-base to fit into only one bulb socket. For Examples, the (LED or-and Laser) bulb has E26 bulb-base which only can fit into E-26 bulb socket is for current market all (LED or-and Laser) bulb specification. The Current invention (LED or-and Laser) Bulb may have E26 (bigger) and E-17 (medium) or further has E12 (Small) diameter of the Bulb-base so can fit into at least 3 different (LED or-and Laser) Bulb-Socket receiving end including E26+E17+E12 . . . or other desired combination E26+E12 or E-26+E17 or E26+E17+E12 . . . . The said (LED or-and Laser) bulb market available bulb base has different construction including but not limited for (1) Screw Bases (2) Twist & Lock Bases (3) Specialty Bases (4) Bi-Pin Bases, and current invention d not discuss the (5) Fluorescent Pin Base (6) Compact Fluorescent plug in Lamp Base.

For examples, the current invention discussed the most common (LED or-and Laser) bulb base is the screw bases has different diameter from E10 (mini screw), E11 (mini candelabra), E12(candelabra), E14(European), E17(intermediate), E26(Medium-standard), E27(Medium), E39(Mogul), E40(Mogul), EX39 (Extended Mogul).

Feature (3) the co-pending invention (#QQQ-5) U.S. application Ser. No. 15/341,782 filed on Nov. 2 2016 and (#ZZZ-4) U.S. application Ser. No. 15/296,599 filed date on Oct. 18 2016 both disclosure the (LED or-and laser) light device has more than one optics-element to create image or lighted patterns to the big range or wider areas. Both co-pending filing case disclosure more than one optics-elements and at least one is optics-lens which in the form of (1) 180 degrees flat or (2) ½ ball, (3) ⅔ ball, (4) sphere, (5) dome shape for top cover of the said (LED or-and Laser) Bulb, garden light or light device. The said top cover piece is optics-les that has refractive or simple protective-piece optics properties to enlarge the image or lighted patterns to wider range or big area to viewer. The (LED or-and Laser) bulb, garden light or other light applications has optic-lens property top-cover that need a wider opening lens. The top cover can be one of shape including; (1) around 180 of degree flat optics-lens or simple protective-piece, or (2) ½ ball, or (3) ⅔ ball, or (4) sphere, or (5) dome shapes lens. Those having refractive or laser-film; or grating-film optic-lens properties which let inner (LED or-and Laser) light source very narrow viewing angle Light beam to spread out through the Top Cover or laser-film or grating-film Optics-lens. For (LED or-and Laser) bulb or garden light or other lighting fixture the top cover can be a flat piece and has no extra optics or has laser treated lens/film/grating/hologram. If no treatment or optics properties, the top cover or flat piece will be only plain flat transparent piece for protection purpose only because all Laser treated piece or optics lens or other elements already put inside of unit.

Also, the co-pending filing (#ZZZ-4) to cover all (LED or-and laser) light device under the U.S. application Ser. No. 15/296,599 filed date on Oct. 18 2016 (LED or-and laser) light device has more than one optics-element to create image or lighted patterns to the big range or wider areas. The (#ZZZ-4) Series U.S. Pat. No. 15,296,599 is PENDING filed on Oct. 18 2016 which is continue filing of (LED or-and Laser) Bulb (#ZZZ-3) U.S. application Ser. No. 14/503,647 filed on Oct. 1 2014. Both has details construction and preferred design and drawing (1014-10-01 drawing) for same optics application on FIG. 1, FIG. 1A, FIG. 1-1, FIG. 1-2, FIG. 1-3, FIG. 1-4, FIG. 1-5, FIG. 2, FIG. 2A, FIG. 2-6, FIG. 3-2 shown for all details and features for more than one optics-elements can create more special and complicated lighted patterns or-and image.

Features (4) has built-in or add-on flexible bendable arms to change position, or direction or orientation of (LED or-and Laser) light beam by variety choice of moveable parts as co-pending filing (#QQQ-5) Series Ser. No. 15/341,782 Page 4/15 drawing FIG. 09-B1 to 09-B7 and page 12/15 drawing (#FIG. 3D, FIG. 3E, FIG. 3F). All these daring show the add-on snake hose which one end is bulb-socket and the other end is bulb-base. The male bulb-base insert into existing bulb-socket. From FIG. 3E disclosure the (LED or-and laser) bulb has a built-in bendable device and incorporated with the snake-house. The one end is part of bulb and other end has the mail bulb-base. The bendable arms can adjust the said bulb to any direction or-and orientation or-and height to overcome all block-object including glass shade, depth location of bulb-socket of market all recess lighting, block-object which interfere the electric signal such as Wi-Fi or remote control (IR) or wireless controller.

From co-pending drawing (#QQQ-5) U.S. application Ser. No. 15/341,782 filed on Nov. 2 2016 FIG. 3F for preferred the LED bulb has more than one levels and top level has $1^{st}$ function and lower level has $2^{nd}$ functions as just allowed (#QQQ-2) U.S. application Ser. No. 14/289,968 filed on May 29 2014 now is allowed on Oct. 5 2017 for 19 claims. It is appreciated all above listed or discussed co-inventor co-pending or co-issued patent all the idea, concept, claims, specification, features, functions still fall within the current invention scope of claims for replaceable, equivalent, equal functions reason. These feature and application also can apply to the garden light so can change position as wish and no need to dig out the garden light to move to other locations.

Feature (5) The (LED or-and laser) bulb for all kind of lighting fixture offer near-by and far-away areas illumination, image, lighted patterns, or any combination with all market available light effects or digital data display images. The current invention for (LED or-and Laser) bulb is a Child filing and is Continuously filing of (#QQQ-5) U.S. application Ser. No. 15/341,782 filed on Nov. 2 2016. The (#QQQ-5) which is the Continue filing for (#QQQ-3) U.S. application Ser. No. 14/983,993 filed on Dec. 30 2015. The (#QQQ-3) is the Continue filing for (#QQQ-2) U.S. application Ser. No. 14/289,968 filed on May 29 2014 now allowed on Oct. 5 2017. (#QQQ-2) is Division filing of (#QQQ-1) of U.S. application Ser. No. 14/280,865, filed on May 19 2014 and is Continue of (#QQQ-12) U.S. Ser. No. 13/540,728 LED Bulb now is allowanced and issue fee paid before May 19, 2014 Now is U.S. Pat. No. 8,834,009. Related for LED or-and Laser Bulb has project or-and night light. While the same construction of (#QQQ-3) put into the garden light housing become the LED or-and laser garden light with the moving effects project or-and illumination light. It is simple to just make one of the top plurality of convex-lens has no image forming kits, it will just change from projection image light become offer illumination with pre-determined light brightness and kelvin temperature (LED color).

The (LED or-and Laser) light source or bulb for all Light device including Bulb, garden light or other lights applications which has more than one optics-elements and at least one is optic-lens. The said optic-lens is one of choice including; (1) around 180 big opening for Flat optic-lens which has multiple or plurality of tiny piece of optics-lens and each of tiny piece has different thickness and size to form a single piece of around 180 of degree flat lens and with different [IC1]optics properties. The said 180-degree flat lens may have refractive or just a protected plastic piece to protect inside laser film or grating film which has desired optics-properties so can let all inner (LED or-and laser) light beam to spread out to wider areas or big size on desired surface. The said (LED or-and Laser) light source may incorporate with following preferred parts and accessories to get more splendid light effects, including but not limited;

(AA) multiple or plurality of tiny reflective piece arranged on the one disc or dish-like inner surface to spread out single (LED or-and laser) light beam to plurality of light beam (BB) has added more or No. 3 or more optics-element including transparent solid-plastic unit has shape like nuts or core or geometric shape unit with desired surface treated or optics-design to become has multiple small piece has refractive properties so can spread narrow light beam to many light beam (CC) has motor or movement device to make the optic-lens or image/pattern forming-unit to rotating. This will create moving image or lighted patterns. It also has plurality of light beam for splendid moving, colorful, color changing or other market light effects. The effects including moving Water wave, moving Aurora effects all be some samples but not limited such as the Disco ball has multiple lighted patterns shown surface also use more than one reflective or-and refractive tiny lens in one main top cover so need 2 pcs separated 2-piece optics-lens.

These features shown on the co-pending filing (#ZZZ-3) U.S. application Ser. No. 14/503,647 filed on Oct. 1 2014 has details construction and preferred design. It also has the co-pending drawing (1014-10-01 drawing) for same optics application on FIG. 1, FIG. 1A, FIG. 1-1, FIG. 1-2, FIG. 1-3, FIG. 1-4, FIG. 1-5, FIG. 2, FIG. 2A, FIG. 2-6, FIG. 3-2 shown for all details and features for more than one optics-elements can create more special and complicated lighted patterns or-and image.

Feature (6) has more than one light beam emit out from (LED or-and Laser) light source for bulb, garden light which under control by the pre-determined controller or IC or circuitry. To incorporate with IC and more than one color LEDs or plurality of different color (LED or-and laser) light source under IC and circuit arrangement can get the more than one light beam emit out from the said (LED or-and Laser) light source for bulb, garden light. The more than one light beam emit out from (LED or-and laser) light source for bulb, garden light is same as Co-pending or co-issued filing case and current invention FIG. 3F which has 2 level or more for Bulb and top has at least one function for project image or lighted pattern or illumination functions. The lower portion can offer color changing light beam or multiple different kelvin temperature white light for illumination. It is appreciated to refer to Co-pending or issued (#QQQ-2) and (#QQQ-1) to get most detail construction, details. From U.S. application Ser. No. 14/983,993 filed on Dec. 30 2015 which is continue filing for (#QQQ-2) U.S. application Ser. No. 14/289,968 filed on May 29 2014 now is allowed on Oct. 5 2017. That is Division filing of (#QQQ-1) of U.S. application Ser. No. 14/280,865, filed on May 19 2014, and is Continue of (#QQQ-12) U.S. Ser. No. 13/540,728 LED Bulb now is allowanced and issue fee paid before May 19 2014 Now is U.S. Pat. No. 8,834,009. These co-inventor co-pending filing related for (LED or-and Laser) light source for Bulb has project or-and illumination light or night light. Furthermore, the current invention disclosure changes the more than one of light performance can use (1) IR or RF remote controller to make change, or (2) use the pre-program IC circuitry to change the function 1 to function (N) by shut-down the power source and turn-on the power source. By control the power source on or off to make the said (LED or-and laser) light source to change function of (LED or-and Laser) product is very simple and cost saving while the said (LED or-and Laser) products has more than one color, function, light source. This use power on-off design will become much cheaper than use IR/RF remote controller which had transmitter and receiver(s) extra cost.

Feature (7) The current invention has more than one function to emit light beam. The said functions may in any combination selected from USB Charger; USB Power bank; USB powered products; color/brightness/functions/light source(es) changing light products; flashlight; touch light; or power failure products. The said light has controller selected from remote control; Infra-red controller; blue-tooth; wifi; internet; App software; motion sensor; inductive switch; switch; and wireless with multiple-way communication to trigger at least one of the light beam to offer illumination for variety market available function or-and image or-and lighted patterns effects.

Features (8) The current invention has movable or extendable or retractable-parts to allow at least one level of (LED or-and Laser) light source for bulb, garden light or all light device can move the desire level(s) away from original position, location, orientation to overcome all the interfere block-objects. The movable device can overcome following trouble;
(a) heat issue from (LEDs) or-and Laser) light source(s) or circuit or electric components
(b) lamp shade metal frame's block out the (LED or-and Laser) bulb light beam traveling
(c) glass or metal or cement block means to block out the electric signals transmit or wireless electric signals delivery including but not limited including Bluetooth, wifi, internet, App software or any other electric wave or signals transmitting to control the said (LED or-and Laser) light source for bub, garden light, light device and its related electric parts or accessories.

The current invention incorporated with above listed co-pending or patented cases' features, construction still fall within the current inventions scope and all related equivalent function or replace parts also should fall within the current invention. So the same construction of the co-inventor's prior arts, parent filing case, issued patents for the project assembly including all same concept, equal function, alternative skill, replacement method should be considering still fall within the current invention claims scope and range and coverage. Including, (#QQQ-3) U.S. application Ser. No. 14/983,993 filed on Dec. 30 2015 now is U.S. Pat. No. 9,090,739 issued date on Mar. 6 2018 and (#ZZZ-3) U.S. application Ser. No. 14/503,647 filed on Oct. 1 2014 Now is U.S. Pat. No. 9,719,654 issued date Aug. 1 2017 both drawing is identical with current filed invention.

From co-pending (#ZZZ-4) U.S. application Ser. No. 15/296,599 filed date on Oct. 18 2016 (LED or-and laser) light device which is continuously filing of (#ZZZ-3) U.S. application Ser. No. 14/503,647 filed on Oct. 1 2014 now is U.S. Pat. No. 9,719,654 issued date Aug. 1 2017 have drawing is identical with current filed invention. The co-pending filing (#QQQ-3) U.S. application Ser. No. 14/983, 993 filed on Dec. 30 2015 now is U.S. Pat. No. 9,090,739 issued date on Mar. 6 2018, both show the identically drawing and brief drawing and details description only different at current invention emphasize for
(1) Moveable, Changeable, Rotating, Replaceable optics-element or inner optics-lens or disk has installed plurality of optics-lens or image-forming-units, and
(2) The project-assembly is fit into not only LED bulb but also all LED project LED and/or laser or both project light device for indoor and/or outdoor applications.

Both show the (LED or-and laser) light source for bulb or light is fit within the housing with at least one of the optics elements (non-optics lens) or-and optics lens. This arrangement can get desired (1) reflective or refraction by optics lens(es), or (2) shaped the light beam by stencil/opening/window/printed film, or (3) presentation the full color images, moving image, color changing light by slide/film/photos/LCD displayer/image forming kits/internet/APP/Wi-Fi/Wireless network/Wireless incorporated with image medium or interface kits. So the current invention continuously to develop the big improvement to make the co-pending filing and current filing of (LED or-and Laser) Bulb has more universal features to created desired functions as below:

The current invention is continuously filing (#XX-2) is related to (LED or-and Laser) bulb, garden light, light string, night light under U.S. application Ser. No. 15/170,071 filed on Jun. 1 2016 which is continuously filing of (#XX-1) U.S. application Ser. No. 14/844,314 filed on Sep. 2 2015 which is continue of (#XX-2010) U.S. application Ser. No. 12/938, 564 filed on Nov. 3 2010 and now is U.S. Pat. No. 9,239,513

The current invention has fatal big improvement from marketing all (LED or-and Laser) Bulb to make them for Universal type to fit into more than one of bulb-socket female receiving end. From above discussed Features (A) the current invention main purpose to has built-in more than one of the bulb-base(s) for desired combinations for market available bulb base(s) into one (LED or-and Laser) bulb so the one (LED or-and Laser) bulb can fit into more than one of different size of Bulb-socket. This will reduce the (LED or-and Laser) bulb which only has one size or one specification of bulb-base to fit into only one bulb socket. For Examples, the (LED or-and Laser) bulb has E26 bulb-base which only can fit into E-26 bulb socket is for current market all LED bulb specification. The Current invention (LED or-and Laser) Bulb may have E26 (bigger) and E-17 (medium) or further has E12 (Small) diameter of the Bulb-base so can fit into at least 3 different (LED or-and Laser)

Bulb-Socket receiving end including E26+E17+E12 . . . or other desired combination E26+E12 or E-26+E17 or E26+E17+E12 . . . . The said (LED or-and Laser) bulb market available bulb base has different construction including but not limited for (1) Screw Bases (2) Twist & Lock Bases (3) Specialty Bases (4) Bi-Pin Bases, and current invention d not discuss the (5) Fluorescent Pin Base (6) Compact Fluorescent plug in Lamp Base.

For examples, the current invention discussed the most common (LED or-and Laser) bulb base is the screw bases has different diameter from E10 (mini screw), E11 (mini candelabra), E12 (candelabra), E14 (European), E17 (intermediate), E26 (Medium-standard), E27 (Medium), E39 (Mogul), E40 (Mogul), EX39 (Extended Module).

The current invention not only had the above listed features but also has co-pending filing case for (LED or-and Laser) light source for bulb, garden light, light device. The bulb has at least one level and its movable design can make (1) at least one level of the said (LED or-and Laser) Bulb to move; or-and (2) whole (LED or-and Laser) bulb adjust by the build-in or add-on bendable arms; or-and (3) the bendable device has one male base, or has bulb base male base & female socket. Incorporating with flexible bendable device to change the position, location, orientation away from original position while need to make desire locations has the pre-determined light functions, performance, effect.

The light device has at least one of the level or parts or accessories incorporate with movable-device. The movable device overcome block object by one of arrangement including;

(1) moving the at least one of level (including parts or accessories); or-and (2) moving the whole (LED or-and Laser) bulb by the build-in or add-on bendable flexible device away from original position, location, orientation, so can overcome some block-object(s) which affect or interfere the LED or-and Laser blub desire functions.

Such as the current invention's more than one level(s) (LED or-and Laser) light source for bulb, garden light, light device. The top part is a project light functions but while it installs on all desk lamp, floor lamp, down light, indoor lighting or outdoor lighting will have lamp shade problem because some of lamp shade has metal frame and ring on the center line of the LED or-and Laser bulb's and lamp socket. So if the LED or-and Laser bulb has no movable design to move the level(s) or-and flexible snake-house, the top part project light's image or lighted patterns will be block out by the lamp shade's metal frame and metal rings to destroy the project image or any lighted patterns performance. The current invention solved this issue and let the top part of the (LED or-and Laser) parts can move or extend or retracted so make project light or-and lighted patterns can move away from the said lamp shade's metal frame and metal ring. This arrangement can let the (LED or-and Laser) light beam pass though no block-objects area and create the image/message/time/lighted patterns/digital data/digital image/LCD display image/arts on the desired ceiling or-and walls or-and floor surface. If use traditional (LED or-and Laser) Bulb, the lamp shade block-objects will totally destroy the (LED or-and Laser) project light performance including not limited full color image or color changing lighted patterns or light beam.

The current invention also can solve the heat issues of all market available (LED or-and Laser) Bulb. The simple solution is put some heat-created electric parts, accessories, components all located on the base of (LED or-and Laser) bulb. It also can simple to select movable device from (1) spin, rotate, hinge, arms, joint piece, join pieces, extendable, extractable; or (2) including one of built-in or added-on flexible bendable device has at least one of male bulb-base or both male bulb-base & female bulb receiving socket, or the other market available adjustable kits, parts, set to make the heat source away from the other part.

One of preferred embodiment the said more than one level(s) (LED or-and Laser) Bulb solve the block-object by following arrangement;

(1) Same as parent filing→all electric parts may put on Top part, so all heat will flow to the base areas when installation as down light; or (2) Same as current invention some preferred embodiment drawings to show→all the electric parts put on the base part and move the top parts away from heat upper area so the heat will not affect to the other parts. The both solution has use the movable-design from extractable, extend, movable parts or accessories, rotate, pole, hinge, arm, bar, snake-house or whatever the movable or adjustable design can move the parts or-and whole LED or-and Laser Bulb to other location so can easily to overcome the heat issues.

The current invention LED or-and Laser light-device also good for LED or-and Laser Bulb for upper or down installation. because, LED or-and Laser light-device has the movable-design including extractable, extendable which can overcome the down light application. Because some down light (LED or-and Laser Bulb install on ceiling and base face sky) or LED or-and Laser light-device has lamp shade like entrance door lighting which made of glass, metal, cement, concrete. Those are surrounding the said Down light or recess light installation so these electric-signal block-objects will affect, interfere the electric signal transmitting so let Bluetooth control, Wi-Fi, remote control, infra-red control, internet control, App software control loose or reduce or limited the signal transmitting to let these functions become a problem. So the current invention has all proper movable-design help to overcome these electric signal block objects and make the LED or-and Laser bulb has its designed and pre-determined functions without any affect or interfere or limited by the said electric-signal block-means.

The current invention has more than one level(s) (including parts and accessories) LED or-and Laser bulb which each level can has its own functions or multiple functions control by market available skill or method may selected from Blue-tooth, Wi-Fi, internet, App software, IC, Remote signal, infra-red signal, motion sensor, heat sensor though computer, communication, consumer device by people.

Such as the more than one levels LED or-and Laser Bulb has (1) Multiple colors with changeable colors and moving effects
(2) Multiple functions select from market available any LED or-and Laser light effects for indoor and outdoor lighting
(3) Multiple control which select from market available control, sensor, switch, blue-tooth, wife, internet, app software, remote, infra-red or other electric or electronic related circuit or device(s)
(4) More than one movable designs
(5) Changeable geometric shape
(6) Changeable construction
(7) moveable designs select from any group combination from bar, pole, spin, rotate, hinge, arms, joints, join, frame, connector, sections or-and move the whole LED or-and Laser bulb by the build-in or add-on bendable flexible snake-house to make the levels, whole LED or-and Laser Bulb, parts, accessories to be move away to desire location, positions. These are the $2^{nd}$ of main features of the current invention.

The current invention mainly for LED or-and Laser bulb, garden light which has following other features as parent filing case stated as below:

1. The current invention which the said LED or-and Laser Bulb, garden light has property that the LED or-and Laser bulb can have more twist degree or twist angle after LED or-and Laser Bulb's contact-Point touched electrodes, This features can get horizon more than 360 of degree to let the light beam to position the certain area(s) to get more wider of adjust angle. And more wider of adjust directions and it also can incorporated with adjustable Focus means to make the same of LED or-and Laser light beams or image to shown different light performance on the desired locations or area(s).

The Rotatable LED or-and Laser light-device or Bulb with two arms to offer the said LED or-and Laser Bulb of preferable Geometric shape and construction. Those construction can adjust angle in vertical axis up to more than 360 of degree angle so can get the LED or-and Laser light-device or Bulb plurality of light beams can cover all x-y-z axis areas by at least one of light beam or plurality of the light beam. To illuminate the near-by or far-away or remote-away or any combination of the said LED or-and Laser light-device or Bulb.2. One of alternative arrangement of the current invention which the said LED or-and Laser Bulb, garden light has One or more than one of the light beams arrange in LED or-and Laser bulb, garden light for desire light performance. As co-pending filing content which has more than one LED or-and Laser light source(s) are for Night light, or more than on project assembly for project LED or-and Laser lighting. The current invention can create same light performance as the co-pending or patented applications as attached drawings for LED or-and Laser bulb, garden light just change the power source input current from 2 prongs to the bulb-base 2 pole so can simple to get same functions or equivalent or replaceable from prong to bulb-base, the difference than prior-arts with night light because Night light has prongs and for outlets installation and not have extend/retractable kits. The said LED or-and Laser bulb has bulb-base to get the power from outside power source.

3. The current invention which the said LED or-and Laser Bulb, garden light has Focus adjustable kits so can make same light beam emit out from same LED or-and Laser bulb, garden light to wherever surface(s) with desired light performance with brightness, size, light spots, color, lit-areas. The same light beam output from same LED or-and Laser Bulb, garden light with focus adjustable kits can create the different light pattern, light path, light brightness or color, light performance, light direction, light performance by viewer.

4. The current invention which the said LED or-and Laser Bulb, garden light has extendable kits such as extend tube, telescope tube, extended housing parts or move the multiple layers of bulb or equivalent extendable, receivable kits which can make the electric parts & accessories etc. of LED or-and Laser bulb, garden light keeps away from LED(s) or-and Laser's heat, block-means of lighting's curtain, lighting's shade, lighting's glass, cylinder tube of recess lighting, or other block-objects which block the motion-sensor Fresnel lens & detector, remote control signal, or light beam emit direction. To keep the said LED or-and Laser bulb, garden light's related circuit board/control kits/IC/switch/sensor/ electric parts or assembly away from the LED or-and Laser-units or block-objects to prevent from heat affect the desire functions, performance. Such as Motion sensor or PIR sensor head or Fresnel lens or LED or-and Laser-unit light beam emit direction.

The parts easily to be interfered such as Motion sensor or PIR sensor head or Fresnel lens or LED or-and Laser-unit light beam emit direction.

5. The current invention which the said LED or-and Laser Bulb, garden light has Extractable/extendable/movable kits to put heat sensitive or light sensitive parts or housing parts away from LED or-and Laser light device. The said heat, light's shade, light's curtain, light's glass, decorative material, ceiling block means, or any other block-objects which will interfere the LED or-and Laser bulb, garden light, or LED or-and Laser Bulb's related parts & accessories.

The said extendable or extractable kits preferred to design on front of the LED or-and Laser bulb, but it depend on the different requirement and different consideration of heat, block objects. The said extend and retract parts which offer the more space to install the preferred electric parts & accessories, offer the extra length to far-away from heat means or block-objects so the LED or-and Laser bulb, garden light can overcome heat and block objects for any applications, installation.

6. The current invention is different from all market available LED or-and Laser light-device or Bulb. The market items which offer The illumination only cover the adjacent area which are start from the LED or-and Laser Bulb to certain distance (illumination surrounding LED or-and Laser Bulb or start from LED or-and Laser bulb to certain distance with illumination). And, market items do not offer the desired areas or wider viewing angle or cover big areas away from the LED or-and Laser bulb, garden light illumination or-and image or-and lighted patterns to an area(s) which has certain direction(s), angle(s), distance(s) which far away or remote-away from the LED or-and Laser Bulb, garden light. The current invention can make any combination to offer the near-by areas illumination, far-away areas illumination or together for both illumination or-and image or-and lighted patterns effects.

The market Laser Bulb only can offer the said laser beam from laser light source but it too harmful for people eyes. so the co-pending filing is continuously filing (#XX-2) is related to LED or-and Laser bulb, garden light, light string, night light under the U.S. application Ser. No. 15/170,071 filed on Jun. 1 2016 which is continuously filing of (#XX-1) U.S. application Ser. No. 14/844,314 filed on Sep. 2 2015 which is continue of (#XX-2010) U.S. application Ser. No. 12/938,564 filed on Nov. 3 2010 and now is U.S. Pat. No. 9,239,513. Those co-pending case has the motion sensor protection device to shut-down the Laser light beams while people come close to the safety distance, Also, the laser light incorporated the grating film, piece, sheet to make the strong Laser beam been split into multiple light beams so become harmless to people eyes. For some cost concern, the bulb for some applications can save the safety device.

7. The current invention which the said LED or-and Laser Bulb, garden light has more than one light beams output to different area(s), direction(s), location(s) and make more than one years with illuminations which all these areas may not adjacent, link, sit together. The said LED or-and Laser bulb, garden light may offer more than one area(s) have illumination is other features of current other features which can allow people to make the energy saving and only offer illumination for where needed such as Stair lighting which only Up or Down two direction need illumination to see stairs. (Please refer to co-inventor's U.S. application Ser. No. 12/771,003, Filed on Apr. 30 2010, Now is U.S. Pat. No.

8,408,736 Apr. 2 2013 issued) Rest areas no need the light at all and the said stair-lighting has Built in Motion Sensor has sensitivity up to 10-30 feet is enough to cover one floor stairs (Normally is 18 steps). One light beam for LED or-and Laser bulb to emit up 9 steps and one light beam of same LED or-and Laser bulb to emit down 9 steps. This will be enough illumination because each UP or DOWN stair is illuminated by each Floor's one LED or-and Laser Bulb, so 2 different of light beam(s) to offer same one UP or One Down 9 steps. This is pretty good power saving device while motion sensor device build-in more than one of light beam as output from one LED or-and Laser bulb.

8. The current invention also teach the co-pending filing (#ZZZ-4) U.S. application Ser. No. 15/296,599 filed date on Oct. 18 2016 LED or-and laser light device and the said device including for bulb, or plug-in night light, or USB LED or-and laser light. These applications all use the same more than on of optics-elements and the top cover is a half-ball, ⅔ ball, sphere, dome or approximately 180 degree flat optics-lens which has at least one of refractive lens properties. All these application only need to connect the (+) (−) input current to connect to bulb-base or plug-in night light or USB light's relative electric poles with preferred working voltage. So can have same construction for the optics-elements and LED or-and laser light source change from Bulb to Plug-in or USB light, or change from Plug-in light to the bulb or USB light, or change from USB light to Bulb or plug-in light as (#ZZZ-4) U.S. application Ser. No. 15/296,599 filed date on Oct. 18 2016 details drawing and descriptions.

9. The current invention also teach the co-pending and (JJ-3) and (#JJJ-1) U.S. application Ser. No. 14/049,427 now is U.S. Pat. No. 9,010,986 Apr. 21 2015 issued, which is continue filing of (#JJJ-11) U.S. application Ser. No. 13/296, 508 Filed on Nov. 15 2011. Now is U.S. Pat. No. 8,562,158 issued on Oct. 22 2013. Related the LED bulb has built-in Camera and storage-kits with multiple functions to replay, see by wired or wireless.

Hence, the current invention can has at least one or plurality of light beam output from one LED or-and Laser bulb, garden light to near-by area(s), remote-away area(s), far-away area(s) or any combination of these area(s) with adjust angle, adjust focus, elastic contact-point, rotate/spin/tilt frame or support or base to get desire direction to emit light beam.

The said extend/retractable means to install all parts & accessories away from heat or block-means are all belong to current invention features so can let all light beam to emit to area(s) where need the illumination. Not like conventional LED or-and Laser bulb, garden light only can supply the near-by area(s) starting from the LED or-and Laser-bulb to certain limited distance areas because the said LED or-and Laser bulb has limited brightness. In order to emit to long distance except like current invention to apply optics lens or lens assembly to project light beams to remote-away or far-away distance which current market items cannot create.

So the same construction of the co-inventor's prior arts, parent filing case, issued patents for the project assembly including all same concept, equal function, alternative skill, replacement method should be still fall within the current invention claims scope and range and coverage.

BRIEF DESCRIPTION OF THE DRAWINGS

FIGS. 1A to 1E are preferred 1$^{st}$ embodiment which has (LED or-and Laser) light source or bulb for other lighting fixture to offer the projection or-and illumination or-and USB charger or-and USB power back functions.

FIG. 2 is the 2$^{nd}$ preferred (LED or-and Laser) garden light has bulb like project-assembly fit into any lighting fixture housing which has built-in female socket to receive the male base to get power from power source. The multiple functions projection light and functions including white color illumination, colorful image, colorful lighted patterns, USB charger, USB power back, power fail light function from said bulb.

Below drawing are co-pending filing case (#XXX-2) 8 page

Figure 5:
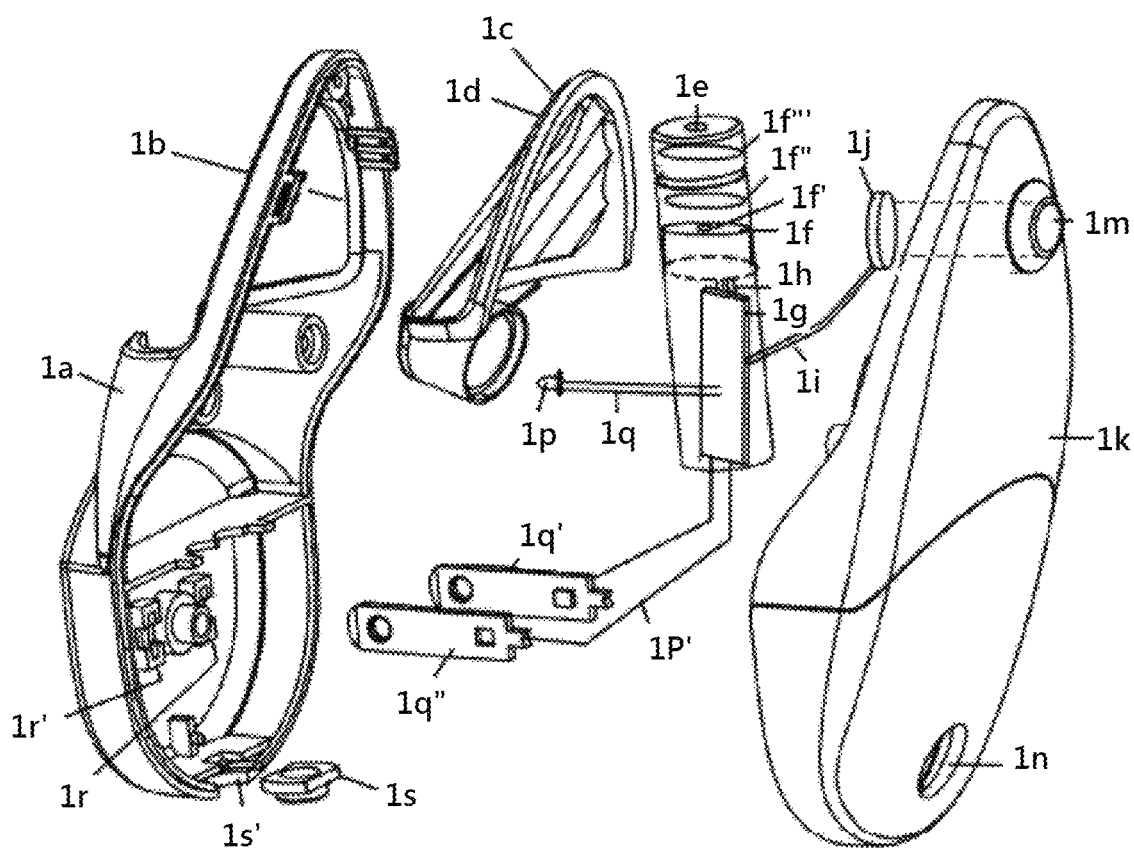

FIG. 5 is an isometric view of a first preferred embodiment of the invention. that provides additional protection.

FIGS. 6A to 6D show detail of the preferred embodiment of FIG. 5.

FIG. 6E shows laser light beam performance with respect to walls and ceiling, and protection range of the sensor means.

FIGS. 7A to 7F show a second preferred embodiment with different a shape of the laser projection light and both a laser and an LED light source in one unit.

FIG. 8 show 2$^{nd}$ embodiment to apply laser-light for the Garden light which has the laser light source and at least one of grating optics-piece to create a plurality of laser beam has lighted light beams, lighted shapes, lighted matrix, lighted array, lighted image shown on the wider area for preferred distance.

Figure 9A:
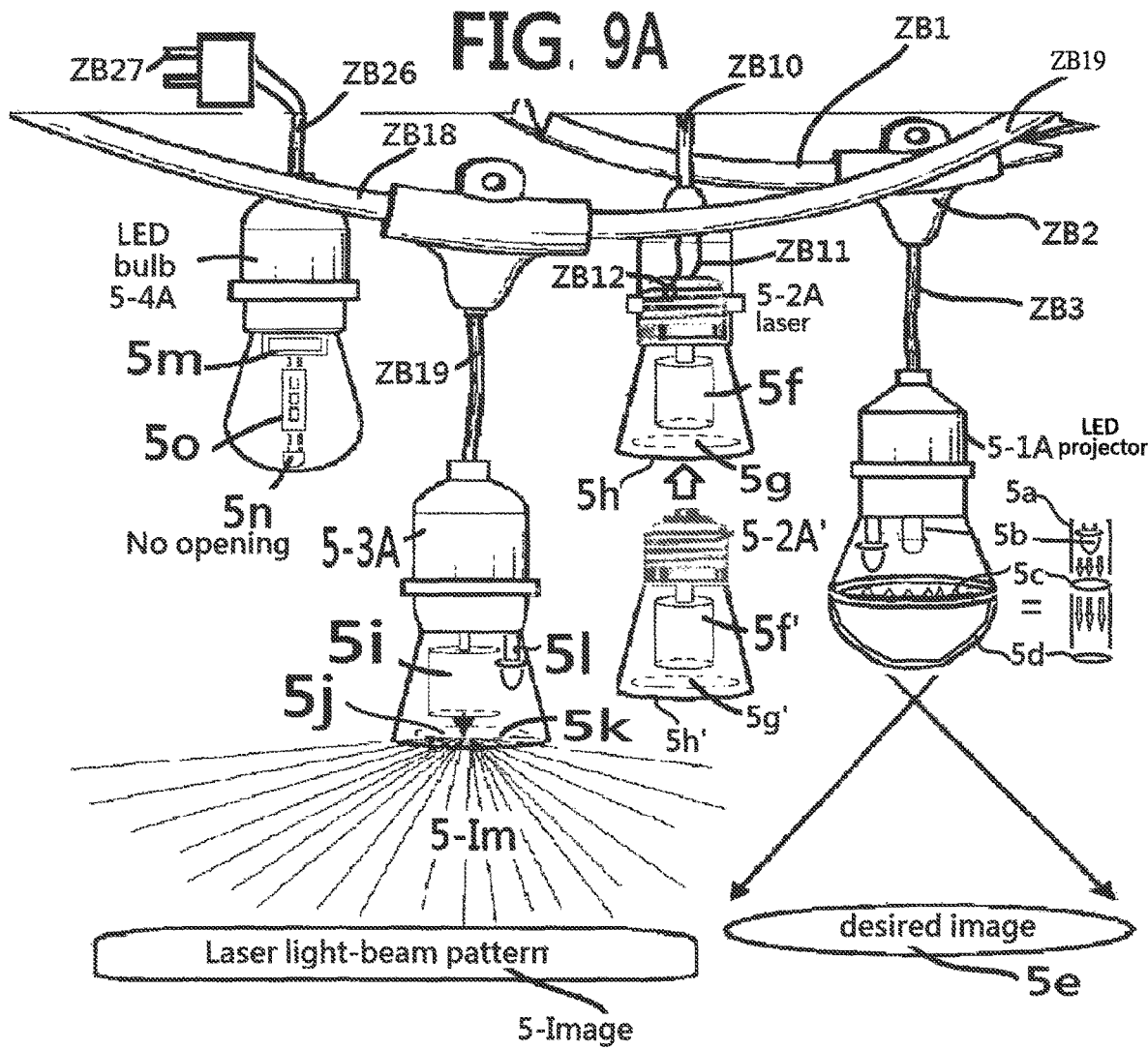
Figure 9B:
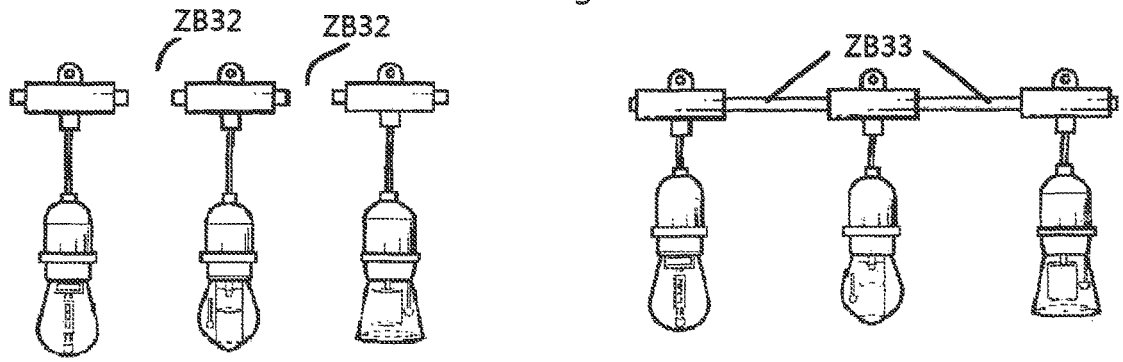

FIGS. 9A and 9B show the 3rd embodiment to apply laser light for the all kind of conventional light-string which has some other light source for illumination. Some are laser light source has at least one of grating optics-piece to create a plurality of laser beam, lighted shapes, lighted matrix, lighted array, lighted image shown on the wider area for preferred distance so the conventional all kind of light string become not only supply illumination but also has laser light effects or-and LED project light effects.

Figure 10A:
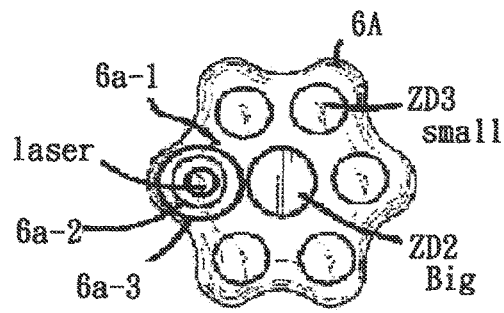

FIGS. 10A to 10G and FIGS. 10H to 10N shows the features and concept and how to get desired laser light effects and relation with the laser optic-piece or-and optic-piece so can created desired light effects not only for Laser project light but also discuss comparison and cooperation with LED project light. FIG. 10O shows various connectors for the outdoor LED lights of FIGS. 10A to 10N.

Below drawing are co-pending filing case (#QQQ-5) 14 page

Figure 11F:
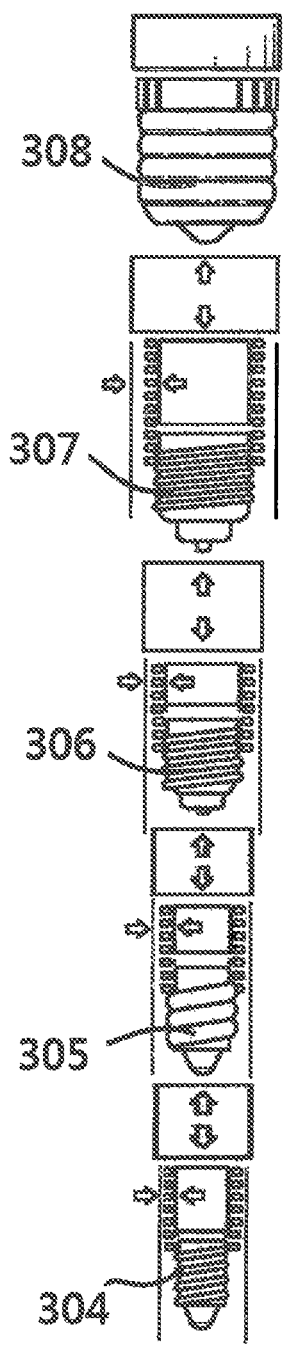
Figure 11G:
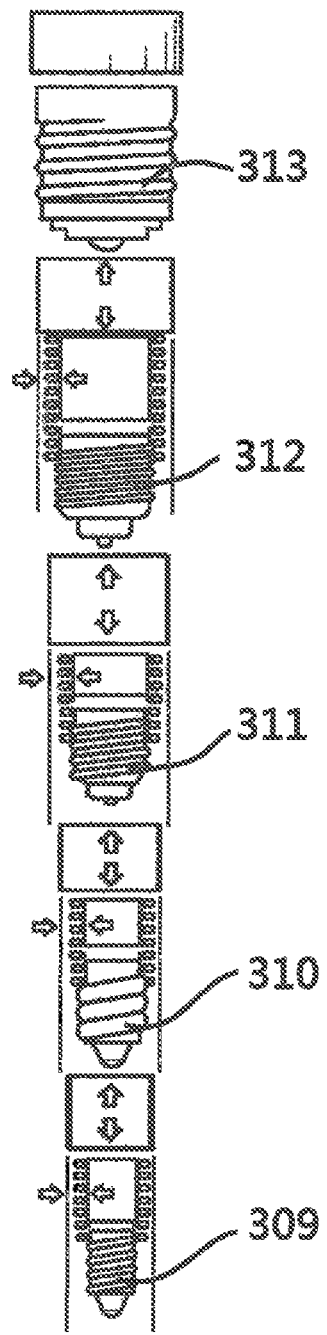
Figure 19G:
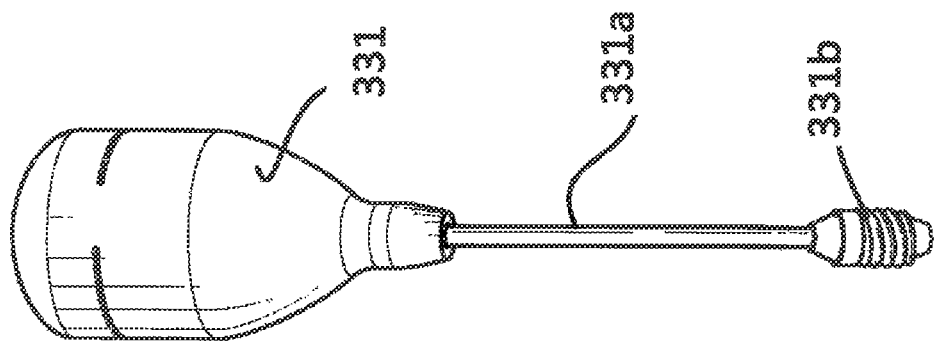
Figure 19F:
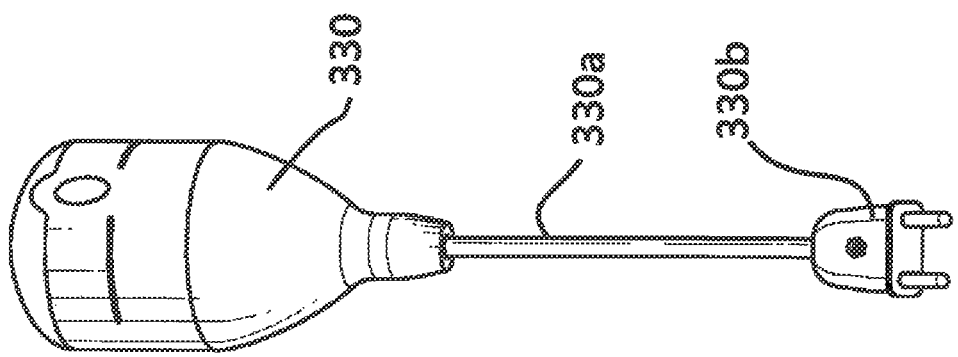
Figure 19E:
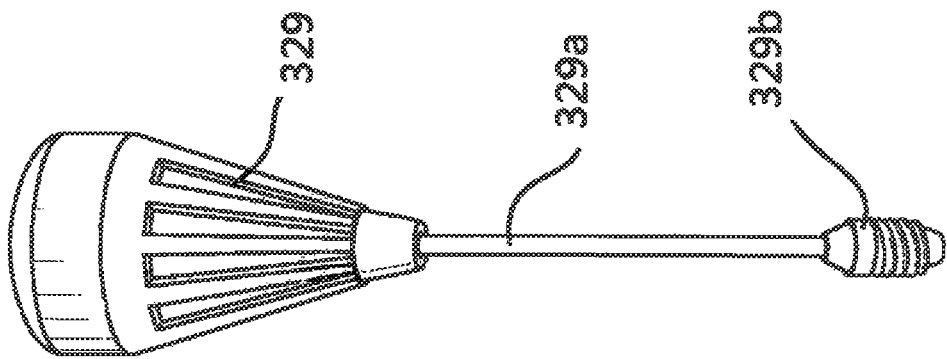

FIG. 11A shows the current commonly screw bases which used for bulb bases worldwide.

FIGS. 11B to 11G shows the exemplary of six different bulb bases connected to each of the multiple bulb bases (hereafter as combo bases) that are not of the same combination and each of the bulb base's size as the exemplary using this specific design of current invention. The figures show the details of measurements of each of these individual bulb bases and the gap existing while overlap each bigger one to small one, however, the measurements are not limited to this documents but the compatibility of the said combo-bases. The combo-bases are not limited to the combination shown in drawing this document but also the compatibility of the said adapter invention.

FIGS. 12-14 show a way of conducting electricity throughout the said combo-bases. The usage of proper diameter conductive or elastic springs fit within the gap between the bigger and small diameter bases to deliver the current from lower position small base to all top bigger bases. So the said combo-bases will carry electricity from the lower position's N-pole (the said of the "end" of a bulb base") towards to the top location other base's N-pole. These springs, connecting between the whole combination wall of each said bulb bases N-pole wall, will act as a conduit for electricity to pass while being able to be an assistant for the said stretch and shrink ability. The L-pole delivers current by center electric isolation channel with electric conductive springs fit within from the said biggest size, bulb base to the smallest size, bulb base. Noted that the combination of FIG. 12 and FIGS. 13 and 14 shown in these three figures will not limit the future said combo-bases to the number of total bulb bases, these figures are only for demonstration purposes of this said combo-bases.

FIG. 15 shows different bulb base (L-pole) insert into to connecting to the bulb female receiving socket of their size, connecting electricity to the said (L-pole) between lowest one towards to the highest one and current can go through the whole bulb.

FIG. 16 is an initiative imagery of the said combo-bases, showing the invention to be connected to three bulb bases, and while in the shrunk mode.

FIG. 18 shows the said combo-bases to have one spring in the middle of electric isolated tube to provide the ability to stretch/extend and shrink/retract and the power to connect electricity throughout the each of bulb bases along the whole combo-bases.

FIG. 17 shows the idea of the said combo-bases to be able to screw in more than one of the female receiving bulb socket while shrank/retract with two, exemplary. The Big bulb bases (Male E26) can fit into inside one big bulb-socket (Female E26) one; or one Medium bulb base (Male E17) can fit into inside one medium bulb-socket (Female E17) while combo-bases stretched half-way. This figure also shows the fully stretched exemplary combo-bases has the smallest base (Male E12) which can fit in the smallest size of bulb-socket (Female E12). From this FIG. 9 also show the reverse example.

FIGS. 19A to 19G show the said variety LED or-laser light device, garden light has the adjustable kits which in the form of flexible, bendable arm, tube, bar. Those are built-in (has one end install the light device and one end has prong or bulb base), or Add-on (the arm or tube or bar both ends has desired combination for female bulb receiving socket, male bulb base, male prong, female outlet to receiving male prong). So, these adjustable kits can allow the LED or-and Laser light kits light beams or sensor head to be position, orientation to desired location and overcome any block-object including depth recess hole, glass shade, heat so can get good lighting emitting, electric signal delivery, depth of hole for recess light bulb-socket location or other any other block-objects.

Figure 20A:
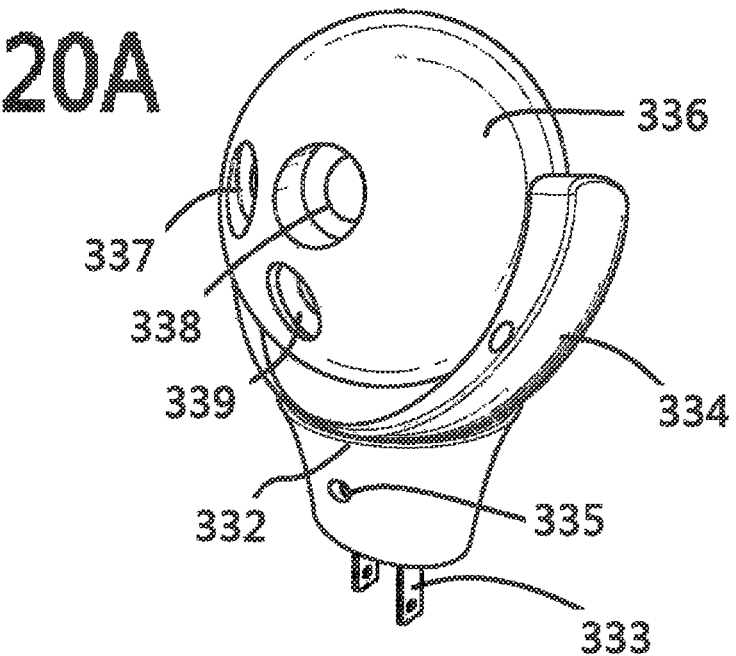
Figure 20B:
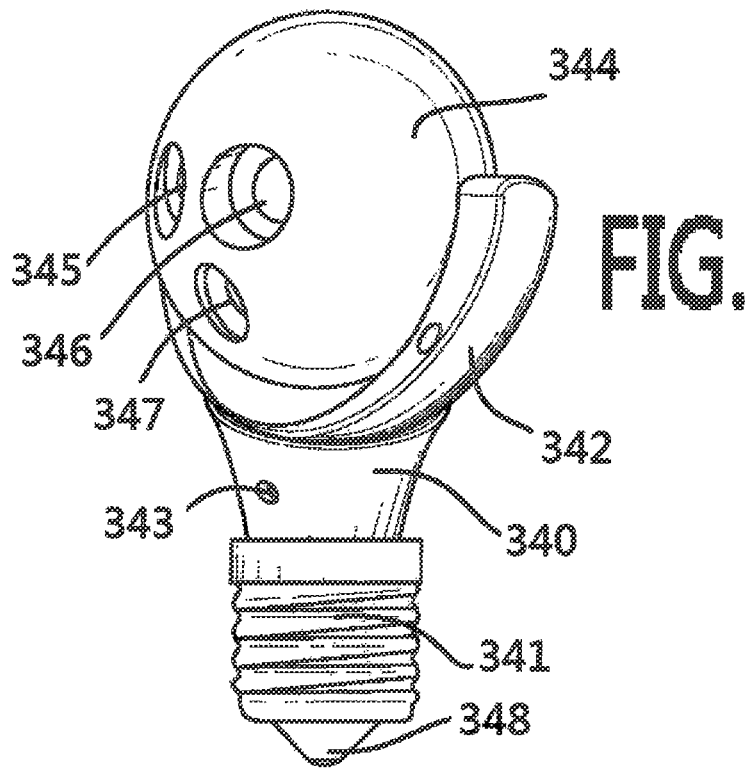

FIGS. 20A to 20B show the LED or-and laser light device, garden light which has more than one project assembly and each can project image or lighted patterns from individual project assembly as co-inventor's co-pending or issued variety US patents. In order to make moving or attractive light effects and save cost to incorporate with motor or movement or moving devices, the current invention apply IC to make each project assembly has different timing to turn-on and turn-off to get the $1^{st}$ project→$2^{nd}$ project→3 project by IC and control circuits. The body besides the more than one of project assembly can design as other LED or-and Laser light source for desired light show including color changing, illumination to present any light functions available from market place. It also shown the current invention show the same unit of LED or-and Laser light device can get power from Prong or Bulb base to get power.

FIGS. 21-22: Disclosure the $1^{st}$ embodiment of the said project image main construction for LED or-and laser night light or LED or-and laser Bulb or LED or-and laser garden light. Those has LED or-and Laser light source(s), image carrier(s), project-lens(s) to form the big project image on desired location and emit out from the said LED or-and laser night light or LED or-and laser bulb, garden light.

FIGS. 23-25 are schematic diagrams showing basic lens theory.

Figure 26A:
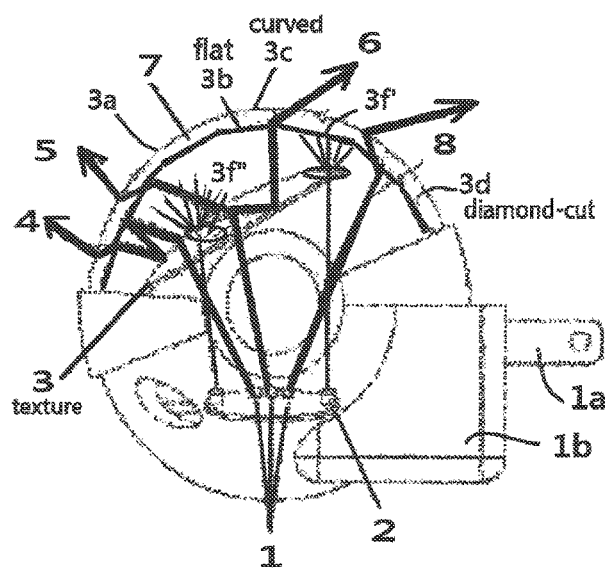
Figure 26B:
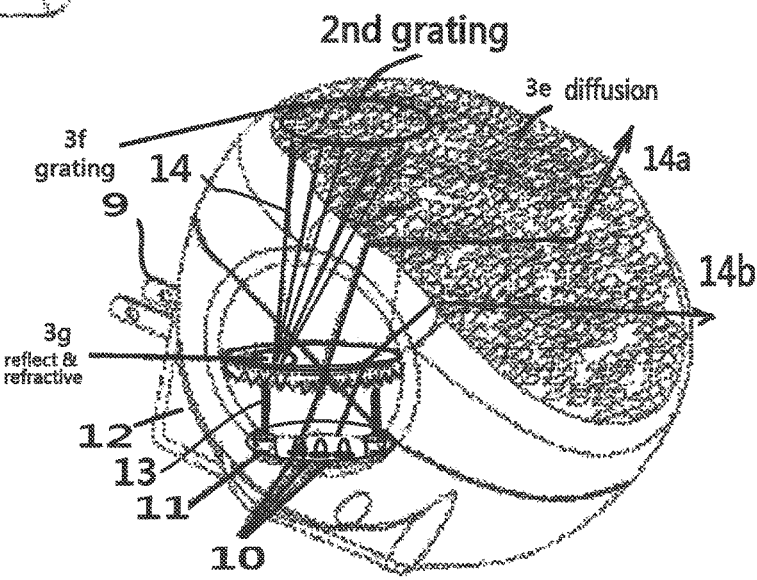
Figure 26C:
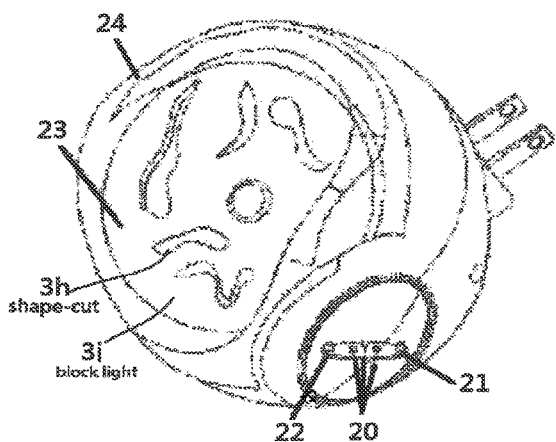

FIGS. 26A to 26C: Disclosure the 3 embodiment of the said project night light or bulb or garden light has the wider viewing angle moving project image from the said 3 different moving theory night light. FIG. 26A is use LEDs or-and laser light source(es) on time on different time period to change the Light source relative position, orientation to the said image carrier or-and project-lens(s). FIG. 26B is used motor or movement, spin, rotate, moving device to make the said image carrier(s) to moving to make the big project image or lighted patterns to moving. FIG. 26C use the magnetic & magnetic-coil with mechanical arms to make the image carrier to moving, shaking, swing to make the said big project image or-and lighted patterns moved.

FIG. 27: Disclosure the FIG. 26B for details construction which has movement or motor on bottom with axis long enough to hold and rotate the said image carrier. And, The arrangement allow the LEDs or-and laser and circuit board along the axis. So, can allow LED(s) or-and laser light beam passing through the top optic-lens (change narrow LED light beam to wider and parallel light beam or make the single laser beam to plurality of laser beams). Then, light-beam emit to hit the top image-carrier and light passing through the image-carrier's opening, cutout, windows, printed window, film, slide, or display or digital data display, laser film, grating film. And, lighted tiny image go through the top project-lens or protected piece which may in variety type including but not limited for one refraction-lens or multiple refraction-lens or refraction or simple protect inside parts or reflection lens or any combinations from market available type to create desired light effects. (This drawing same as co-pending filing (#ZZZ-3) U.S. application Ser. No. 14/503,647), From FIG. 28; Disclosure the FIG. 26C for detail construction have the magnetic & magnetic coil sets to make the magnetic reaction force to pull and push the swing-arm's built-in magnetic unit. So, The reaction force can move the swing-arms swinging to make the image-carrier to moving back-and-forth to simulate the sea wave moving effects. The LED light beam pass through the said sea-wave texture image-carrier and emit the tiny image to the top project-lens to magnify to project to wider viewing angle project image on the desire surfaces including wall, ceiling, floor. The moving device been moved magnetic reaction force not from the motor/movement/rotate or spin devices.

FIGS. 29A to 29G: Disclosure the other embodiment of the said LED project bulb or light-device for down light, entrance light, stair light, recess light as FIGS. 29B to 29C for normal down light installations. Some application may has the block-means from the ceiling, walls, lamp shade those made of cement, concrete, metal, porcelain, pottery or any material. Those will block out the electric wave, electric signal to transmit though to affect or interfere the LED Bulb operated by Wi-Fi, Blue-tooth, internet, App software electric signal delivery. So, the current invention has different design (FIGS. 29D to 29F) has moveable-means such as retractable, extendable, spin, rotate, moving arms, snake house, hinge to move the LED Bulb's at least one level(s) away from (a) Heat (b) light traveling (c) electric signal transmitting (d) all other block-means related to the said LED.

Figure 30A:
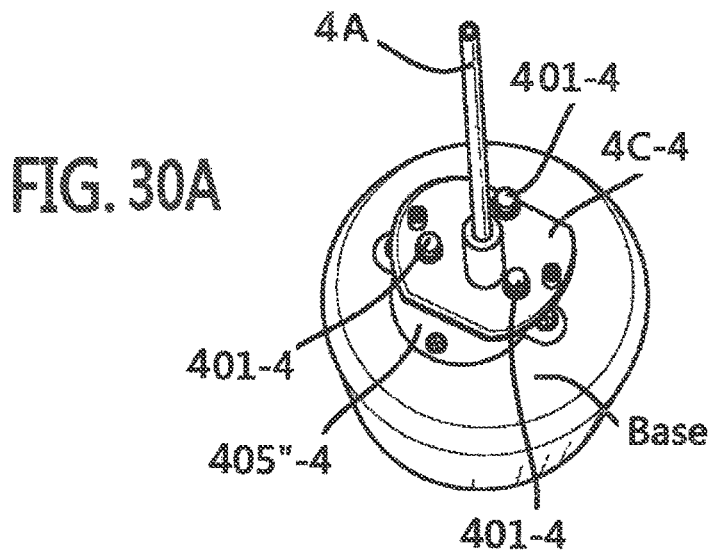
Figure 30B:
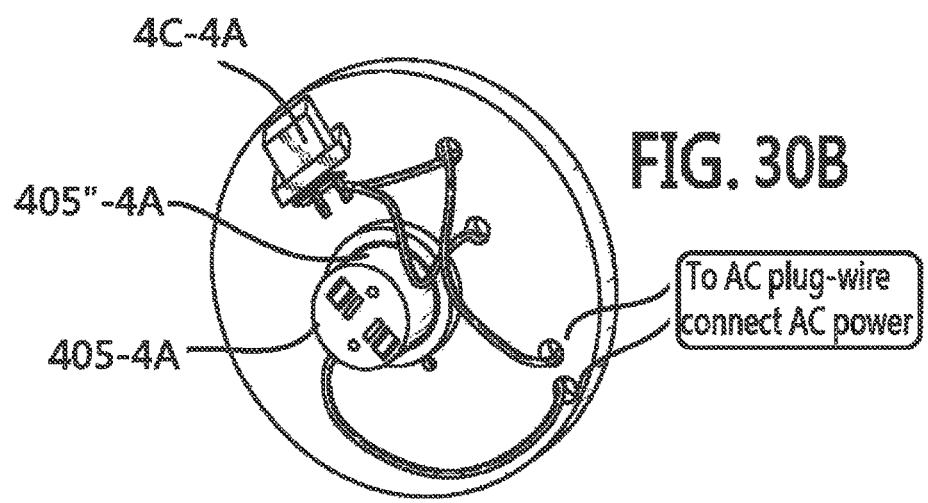
Figure 30C:
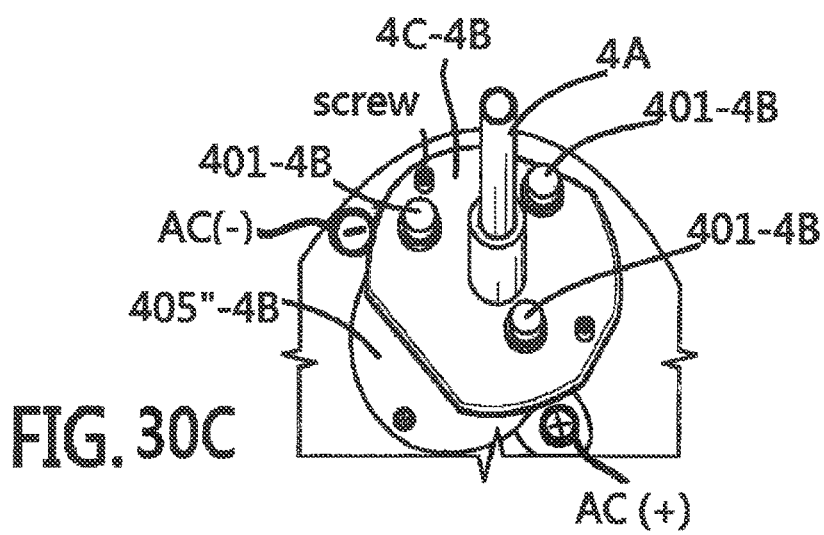

FIGS. 30A to 30C disclosure the co-pending filing (#ZZZ-1) U.S. application Ser. No. 14/323,318 which is Continue filing of (#ZZZ-13) U.S. application Ser. No. 14/023,889 both is related to the wider area image or project image night light with motor/spin/rotating kits to project moving big image.

FIGS. 31A to 31C disclosure the preferred $5^{th}$ embodiment which has the basic 3 main construction of the LED(s) or-and laser light source, image carrier(s) or-and laser film or-and grating film, project-lens assembly as all co-pending filing related to one or more than one project with or without the illumination functions inside all prior filing cases. The current invention had motor/movement means to drive axis to rotating. And, top of the motor has plurality of LED(s) or-and laser as light source, the LED or-and laser light beam go through the image-carriers' device or-and laser film or-and grating film those has one or more than one film/slide/openings/printed windows with or without the holder or disc which is not rotatable or moving. The lighted tiny image or lighted patterns from the said image carrier emit to the top project-lens assembly or refractive lens. The said project lens or assembly may be one or more than one which is moving, rotate, spin to allow the tiny-image light beam or-and lighted patterns to fall within each project-lens or-and refractive-lens from one edge to other edge to form the big project image moving on top ceiling or walls or floor from angle N to N−1.

The normally the angle depend on how many project-lens inside a round or a disc or dish-shape of carrier or holder. Such as 6 lens arranged on the disc as FIG. 31A, each project-lens around 60 degree, the moving big project image also will show on the surface will have around same 60 degree from appear to dis-appear. This embodiment all parts all fit within the said LED bulb or garden light housing parts not as the co-inventor's earlier filing cases the LED, film/slide/displayer/screen, project-lens incorporate with tube or tube-assembly piece or housing body. The current invention mainly to fit within the LED or-and laser bulb or garden light housing parts only.

From FIG. 31B disclosure the alternative arrangement for the rotating multiple project-lens assembly which has a round holder to hold or fix the 6 project-lens or convex-lens each from edge to edge of lens around 60 degree or less so the big project image will move from appear to dis-appear around 60 degree on surface. The difference than the FIG. 31C is the light beam from LED(s) or-and laser light-source and tiny-image light-beams has the relatively and separate tube(s). The each tube to position with each LED(s) or-and laser that Light output end of lighted tiny-image ends, so the light beams from these 2 sections will not leakage too much to inside of the said bulb or garden light or night light or light string's housing.

Figure 32:
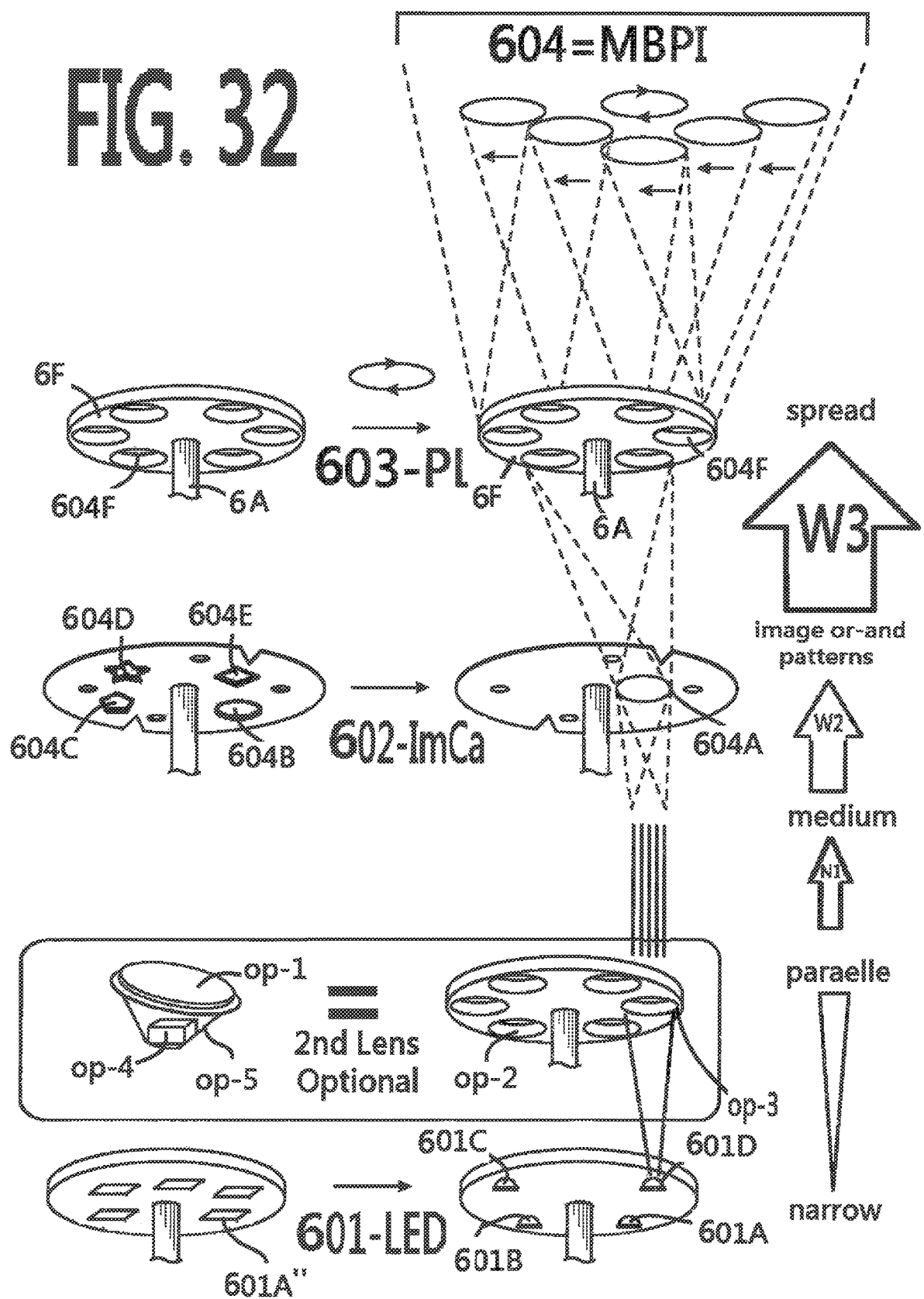

From FIG. 32: Disclosure the light theory for the more than one project head or project-lens or project-lens-assembly which have identical drawing same as the co-pending filed case (#QQQ-3) U.S. application Ser. No. 14/983,993 filed on Dec. 30 2015 now is U.S. Pat. No. 9,090,739 issued date on Mar. 6 2018 for project light device, It can be a night light or LED bulb or garden light as long as has built-in multiple project-assembly into different housing construction. Or, like the (#SS-2010) co-inventor's U.S. Pat. No. 8,083,377 issued date Dec. 27 2011 FIG. 15 and FIG. 16 and (#QQ-2010) U.S. Pat. No. 8,408,736 issued on Apr. 2 2013 all drawings has the multiple project head to create multiple big project images on areas or surface. The current invention has plurality of the LEDs and top has image-carrier in one piece or many different film/slide/openings/printed windows/stencils. To allow the LED light beam to pass through for form a lighted tiny-image to go through the top project-lens from number 1 to number N (N-can be same number of top project-lens of the disc or Holder)). And, and the projected-image appear from edge to other edge so can see the moving big project image from angle N-appear to Angle N-dis-appear. The construction is one of preferred one but not limited for these limited drawings. It is appreciated that all kind of alternative or replaceable or equal function or result or effects should be still fall within the current invention scope and claims.

The current inventions all drawing are same as above listed co-inventor co-pending or patent drawing (#QQQ-3) U.S. application Ser. No. 14/983,993 filed on Dec. 30 2015 now is U.S. Pat. No. 9,090,739 issued date on Mar. 6 2018 without any change on the LED night light or LED or-and laser bulb or LED or-and laser garden light. It appreciated that current invention should include and but not limited to has more than one level(s) and use more than one movable-device can make the at least one level's parts or accessories to any desire location, position and orientation. Also, each of level(s) can has one or more than one functions selected from market available LED or-and laser light effects, function, performance. It is easily to refer all these concepts are same but belong to brand new while become the LED or-and laser night light or LED or-and laser bulb or LED or-and laser garden light applications with all co-pending filing cases' features and concept. It is appreciated all listed co-pending or patented drawing, concept, feature or equivalent or same functions parts/accessories/electric circuit/concept still fall within the current invention for LED or-and laser night light, LED or-and laser BULB, LED or-and laser garden light application.

Below drawing are co-pending filing case (#ZZZ-4) 14 page

Figure 33A:
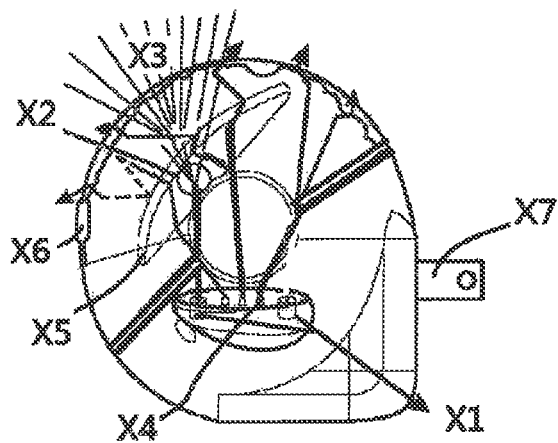

FIG. 33A is same as FIG. 26A for the $1^{st}$ preferred embodiment show the LED or-and laser light device has more than one optics-elements has the outer half ball, ⅔ ball, dome, or sphere $1^{st}$ optic-element which is optics-lens and has the inner geometric shape $2^{nd}$ optics-element which is other optics lens. Both has its pre-determined optics properties so can allow LED or-laser light beam emit out to big area or wider view angle to viewer.

Figure 33B:
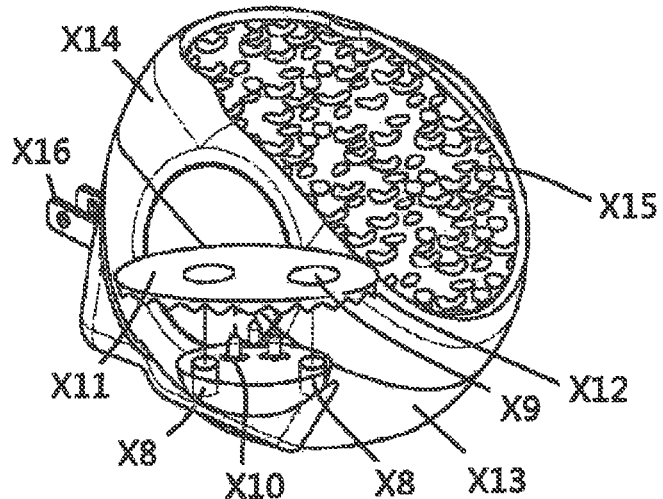

FIG. 33B is same as FIG. 26B for the 2nd preferred embodiment show the LED or-and laser light device has more than one optics-elements has the outer around 180 flat wider opening cover is the $1^{st}$ optic-element. The cover is optics-lens and has the inner geometric shape. And, the $2^{nd}$ optics-element which is not the optics lens but made by preferred material which may a plastic film, slide, film, printed sheet, image-forming carrier, shape-forming carrier, color film, piece has openings or cutouts or windows or shaped printed to make the LED or-and laser beam to pass though non-block areas to shape the light beam. The $2^{nd}$ inner optics-element can work with moving device to make the image or lighted patterns has moving, changeable effects. Both has its pre-determined optics properties so can allow LED or-laser light beam emit out to big area or wider view angle to viewer.

Figure 33C:
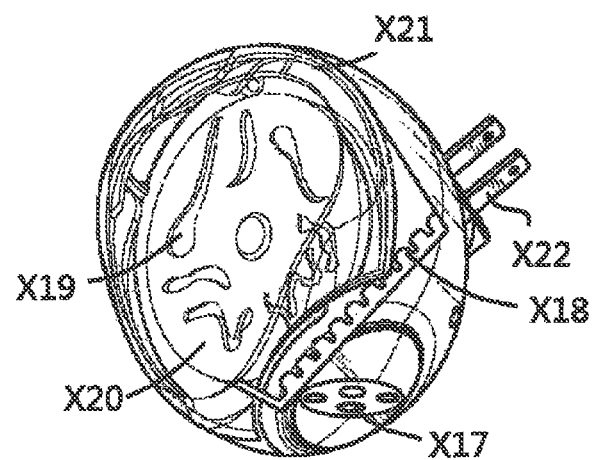

FIG. 33C is same as FIG. 26C for the 3rd preferred embodiment show the LED or-and laser light device has more than one optics-elements has the outer around 180 flat wider opening cover is the $1^{st}$ optic-element which is optics-lens. And, the LED light-device has the inner geometric shape $2^{nd}$ optics-element which is not the optics lens but made by preferred material. And, It is a plastic film, slide, film, printed sheet, image-forming carrier, shape-forming carrier, color film, piece has openings or cutouts or windows or shaped printed to make the LED or-and laser beam to pass though non-block areas to shape the light beam.

FIGS. 34A to 34D shown the $1^{st}$ preferable embodiment have major 2 or more optics-elements and parts details. It also shows $1^{st}$ embodiment incorporate the USB female port as FIG. 1-1 or incorporated with prong terminals such as FIG. 1-2, FIG. 1-3, FIG. 1-4.

Figure 34E:
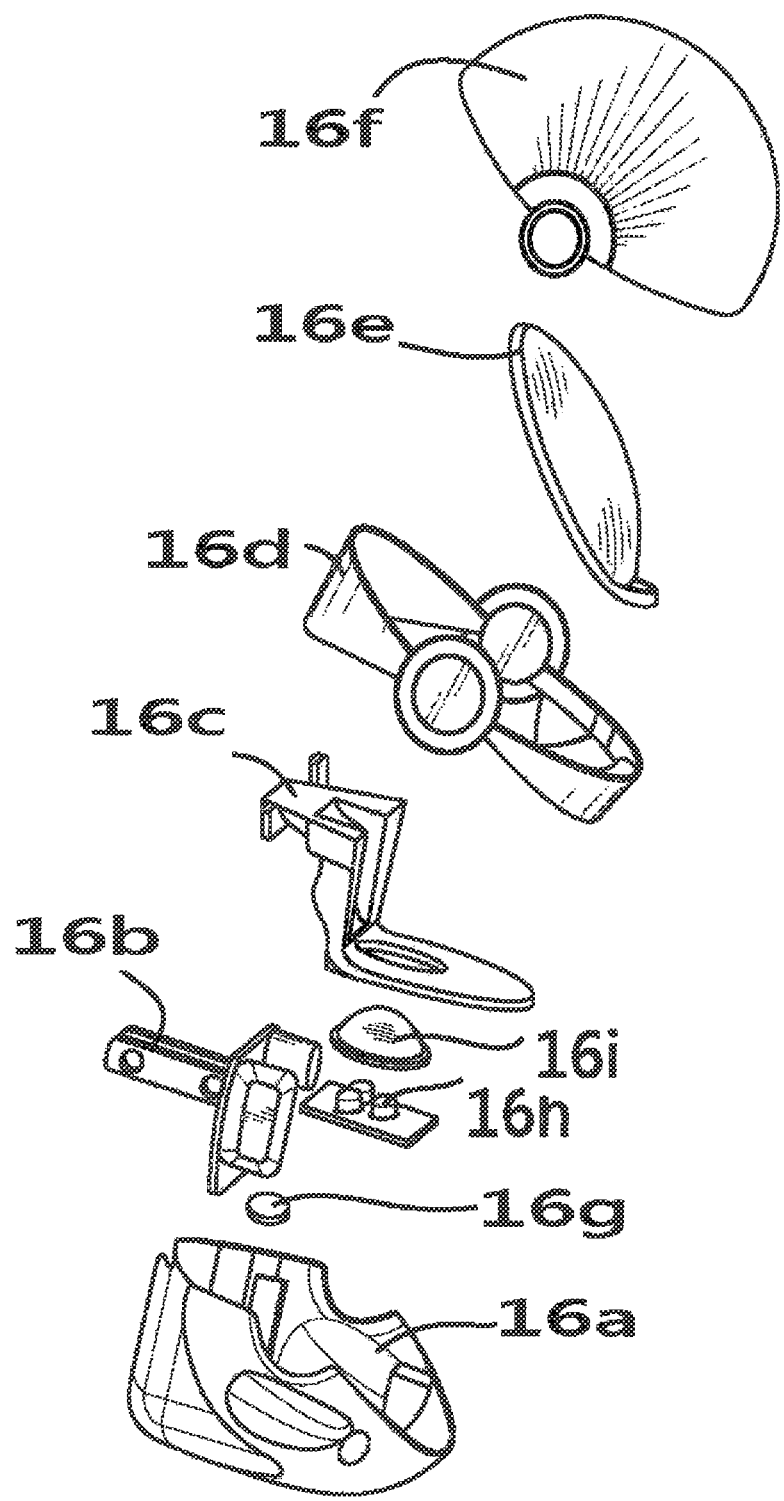

FIG. 34E show the $1^{st}$ preferable embodiment all major parts construction with details BOM FIGS. 34F to 34J shows the alternative embodiment which uses different terminals to get the different power source such as bulb bases terminals to deliver the AC power into the Bulb-base for bulb-like LED or-and laser light products. Also show the Prong terminal to get the AC power or-and, or-and AC-plug-wire to get AC power or-and USB female ports to get DC power for original $1^{st}$ embodiment shape product. So as long as change the product shape can even have had same optics parts & accessories to get AC power by Prong or AC-plug-wire or the Bulb-base or USB-port with separated USB-wire connection.

Figure 35A:
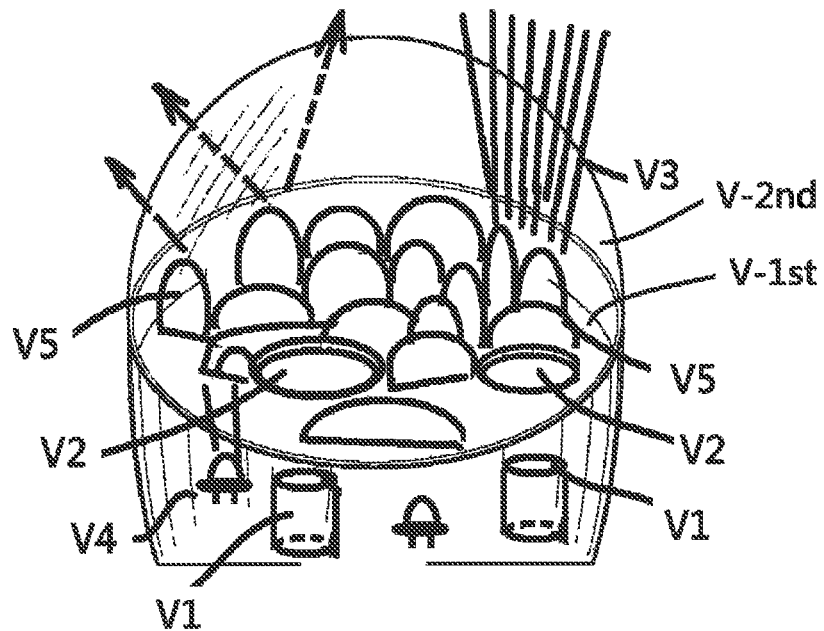
Figure 35B:
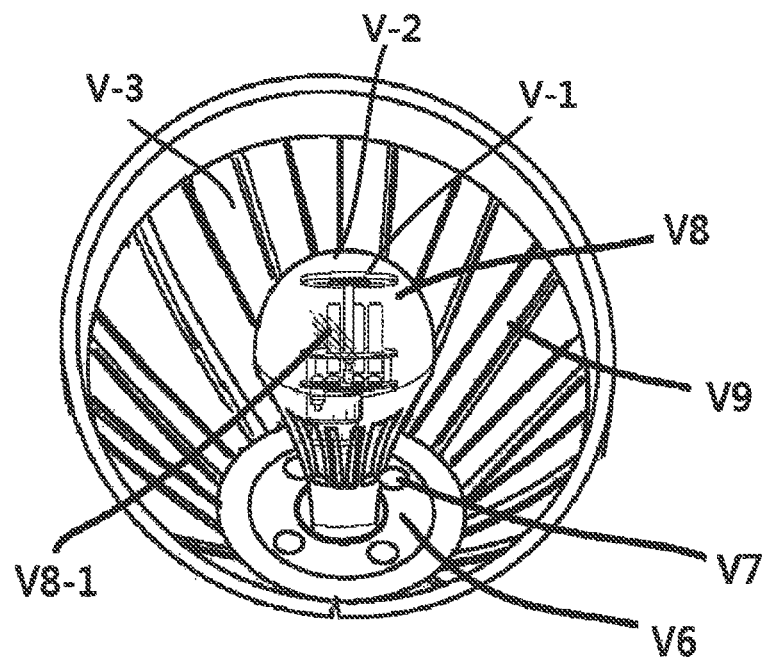

FIGS. 35A and 35B show the inner optics-element can be a dish like reflector has plurality small tiny reflector to build along the dish like surface. The $2^{nd}$ inner optics-element can work with moving device to make the image or lighted patterns has moving, changeable effects. (Details shown aside the Figure)

FIGS. 35A and 35B that disclosure the $3^{rd}$ optics-elements like those are dish like reflector has plurality small tiny reflector to build along the dish like surface. The $2^{nd}$ inner optics-element can work with moving device to make the image or lighted patterns has moving, changeable effects. It has the $3^{rd}$ optics-elements like nuts, core, ball with many cut surface surround the surface so can allow the bottom LED or-and LED light beam passing through to get plurality of light beams to hit the dish like reflectors to get splendid light effects with or without moving or motor device to rotating to create the moving effects. All those Three or two optics-elements has its pre-determined optics properties so can allow LED or-laser light beam emit out to big area or wider view angle to viewer.

From FIG. 35B, show LED project light-device may have $3^{rd}$ optics-elements like nuts, core, ball with many cut-surface(s) surround the surface of nuts, core, ball. So, can allow the bottom LED or-and LED light beam passing through to get plurality of light beams to hit the dish like reflectors to get splendid light effects with or without moving or motor device to rotating to create the moving effects. All those Three or two optics-elements has its pre-determined optics properties so can allow LED or-laser light beam emit out to big area or wider view angle to viewer. (Details shown aside the Figure)

FIGS. 36A to 36E shown the 2nd preferable embodiment major parts details. (Details shown aside the Figure)

Figure 36A:
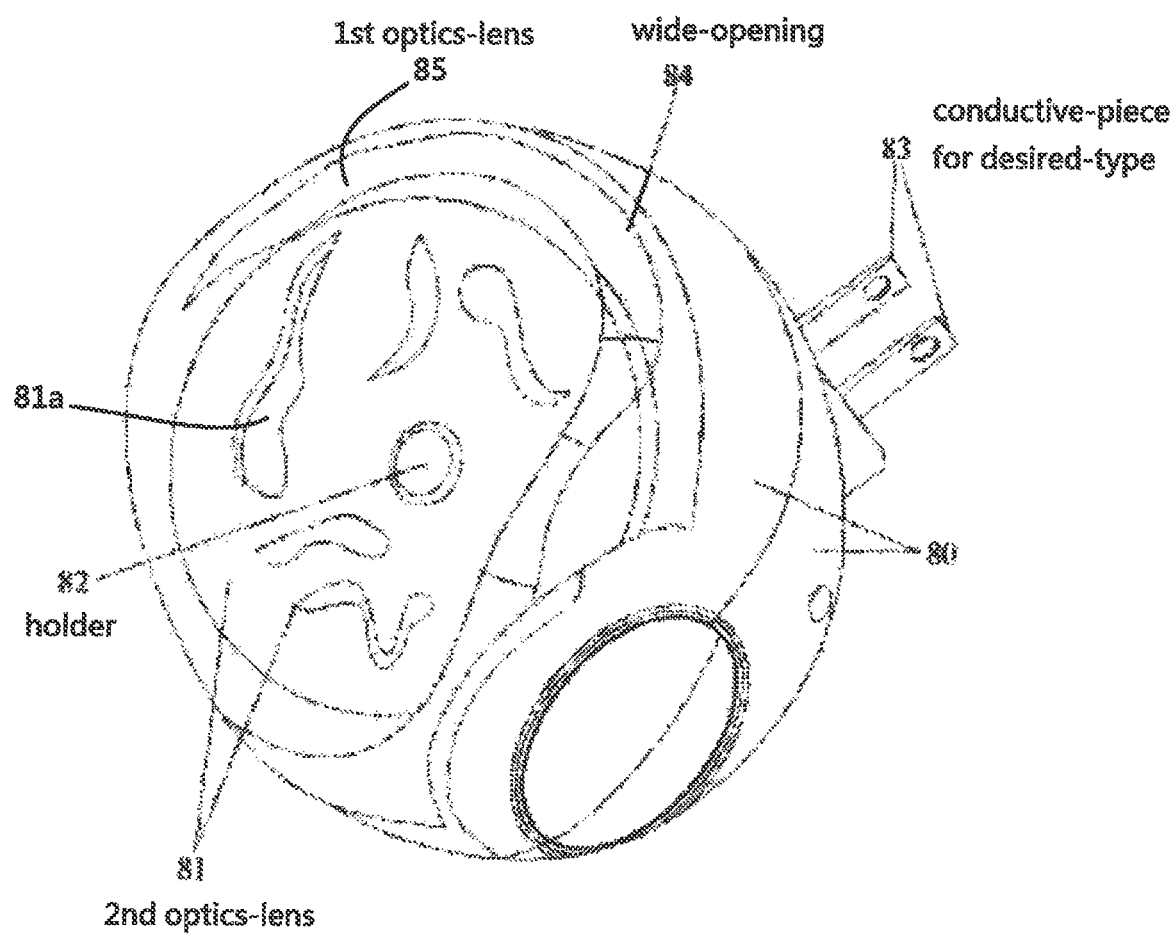
Figure 36B:
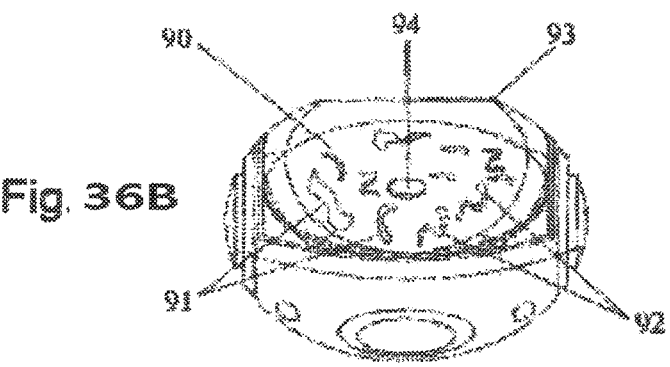
Figure 36C:
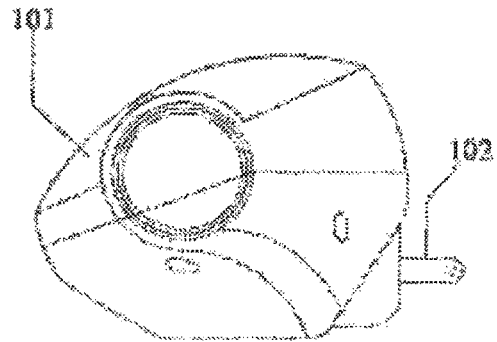
Figure 36D:
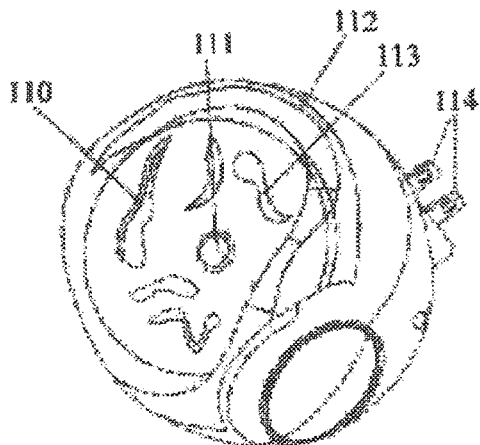
Figure 36E:
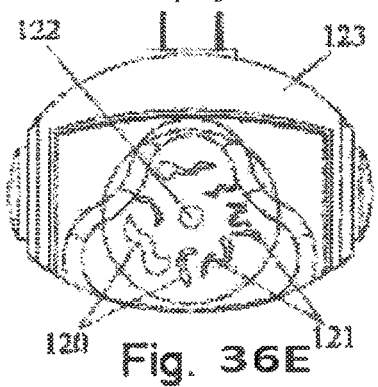
Figure 36F:
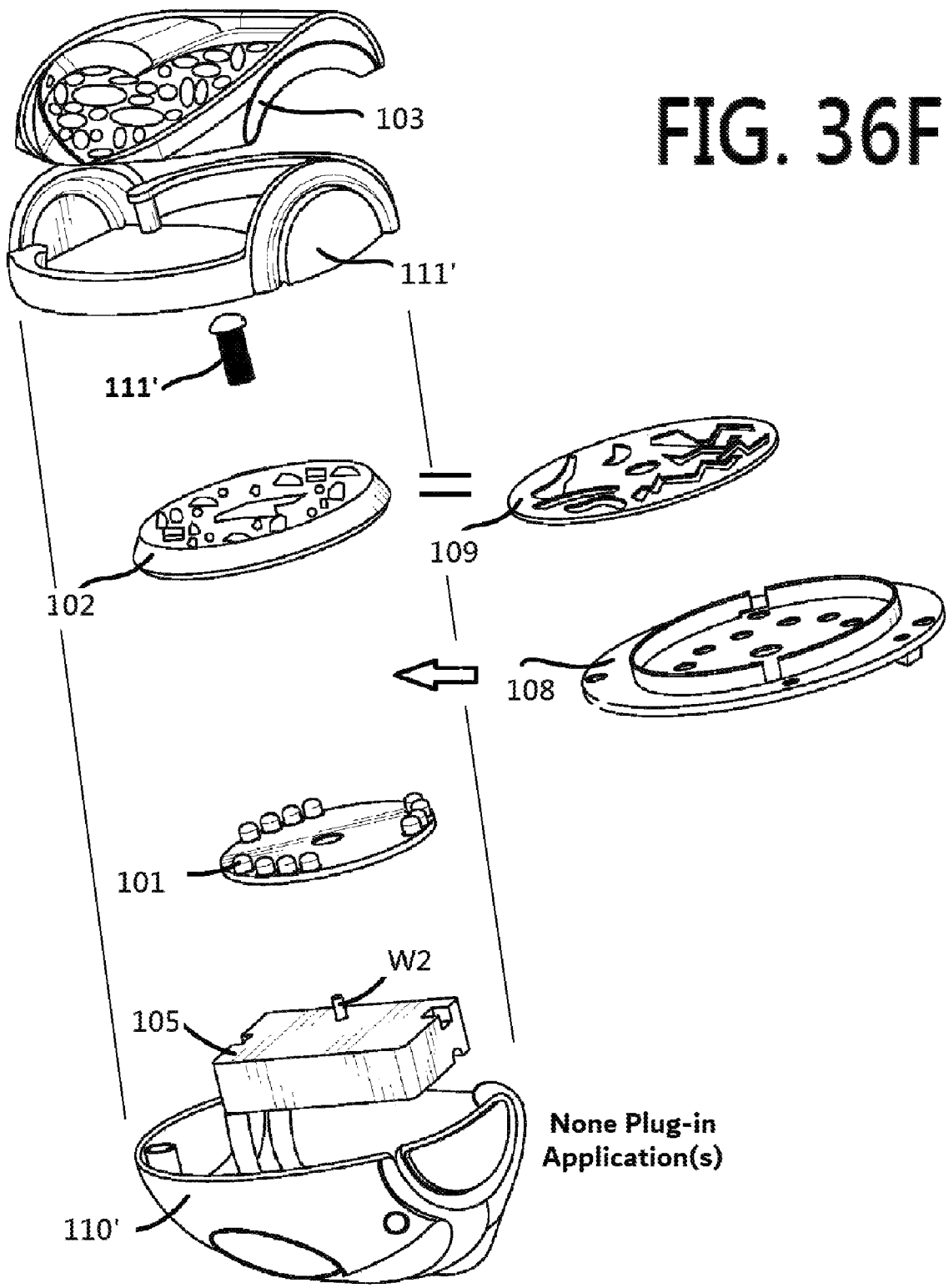

FIG. 36F show the 2nd preferable embodiment all major parts construction.

(Details shown aside the Figure)

Figure 37:
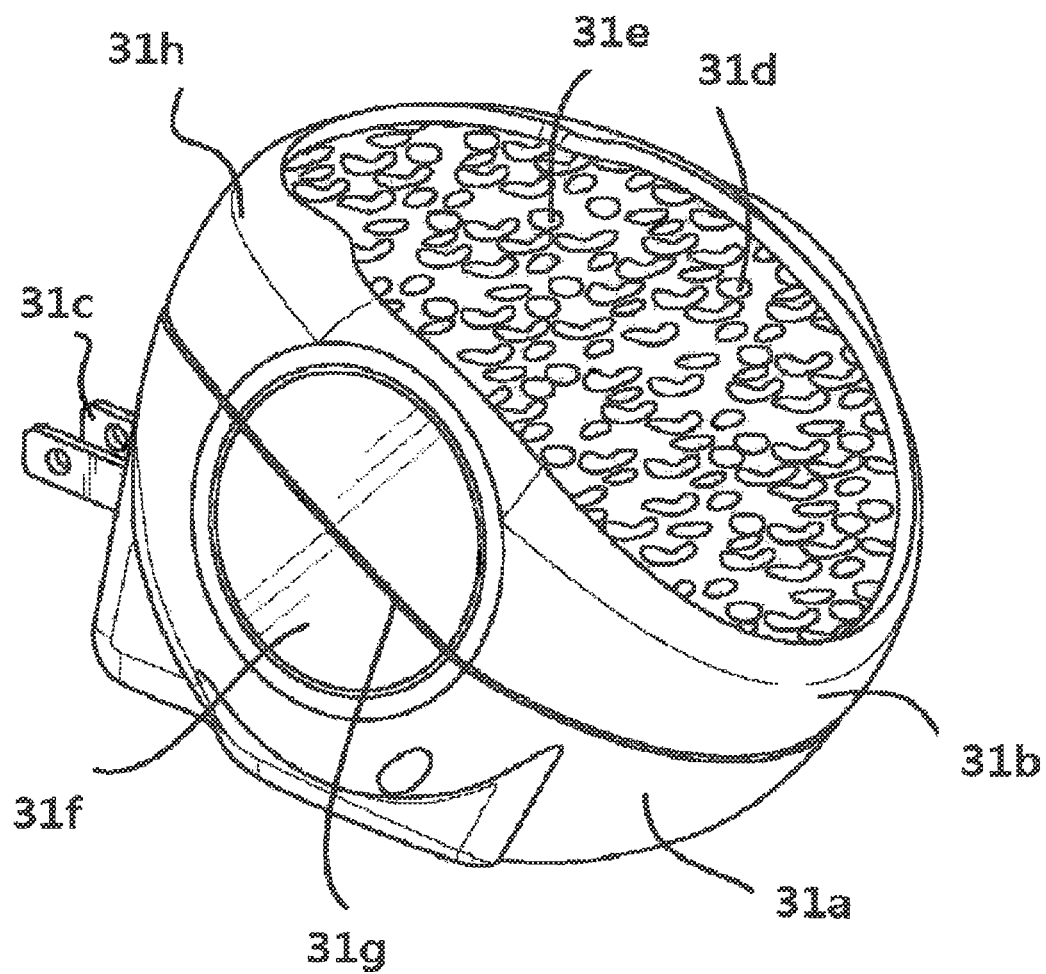

FIG. 37 shown the 3rd preferable embodiment major parts details.

(Details shown aside the Figure)

Figure 38:
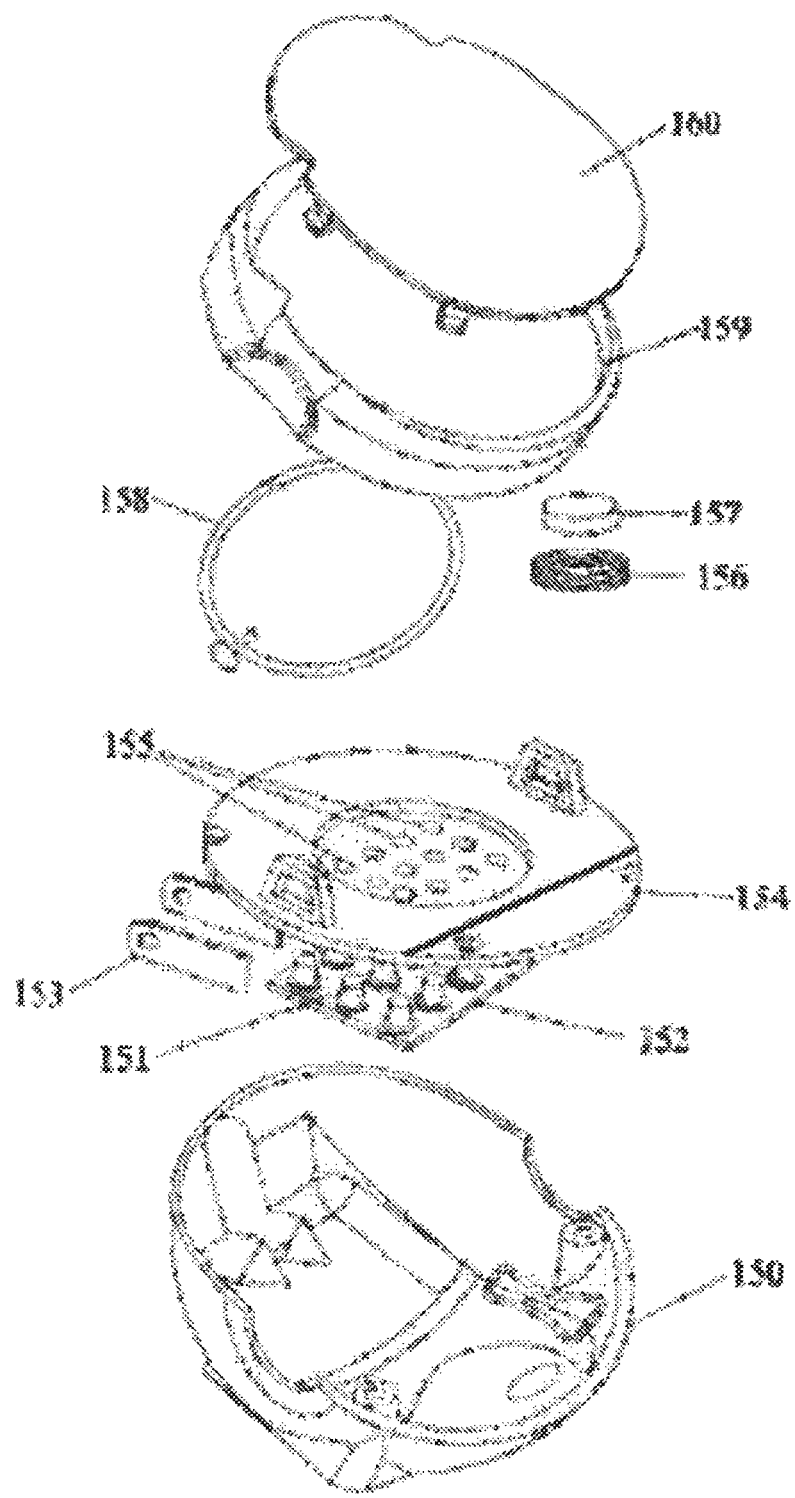

FIG. 38 show the 3rd preferable embodiment all major parts construction.

(Details shown aside the Figure)

Figure 39A:
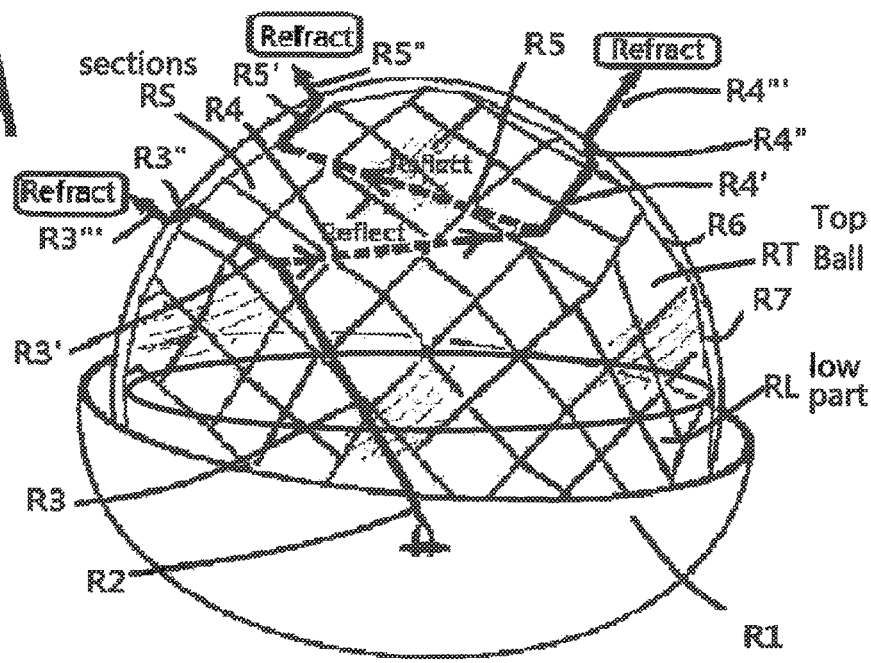
Figure 39B:
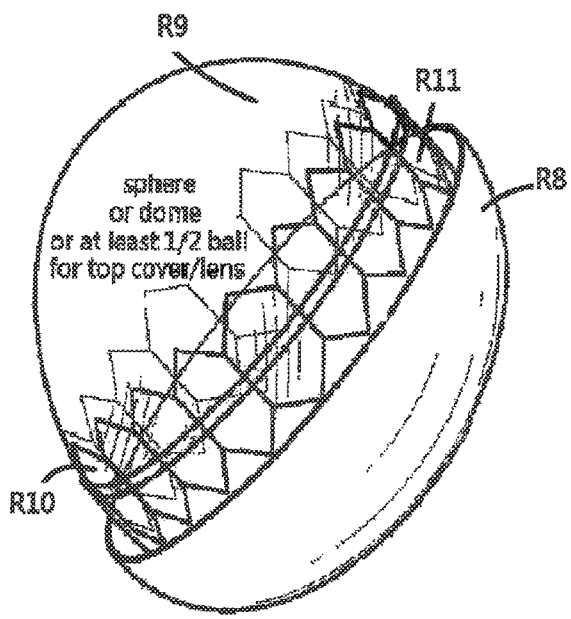
Figure 39C:
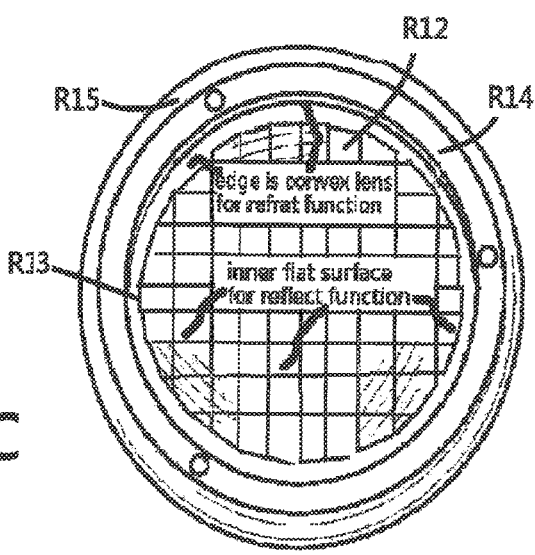

FIGS. 39A to 39C show the one ½ ball or ⅔ ball or sphere or dome top cover optic-lens has multiple small size of reflective-surface(s) inside the ball and has multiple small size refractive-surface(s) on the outside surface to form an optic-elements has more than one of optics-properties.

DETAILED DESCRIPTION OF THE PREFERRED EMBODIMENTS

The Current Invention teach the (1) tube(s) or tube-assembly to prevent from light leakage (2) image forming unit to create image or lighted pattern (3) optics-lens has refractive-properties to enlarge and protect the inner parts prevent people electric shock.

From these plurality of Co-inventor since 2008 November to disclosure most simple construction projection assembly using update super brightness LED on 2008 and keep the same main construction incorporated the following laser on 2010. It is appreciated that all the co-inventor's co-pending, issued filed cases all should be consider as same or equal function or replacement skill or alternative method should still fall within the current invention and claims coverage.

Figure 1A:
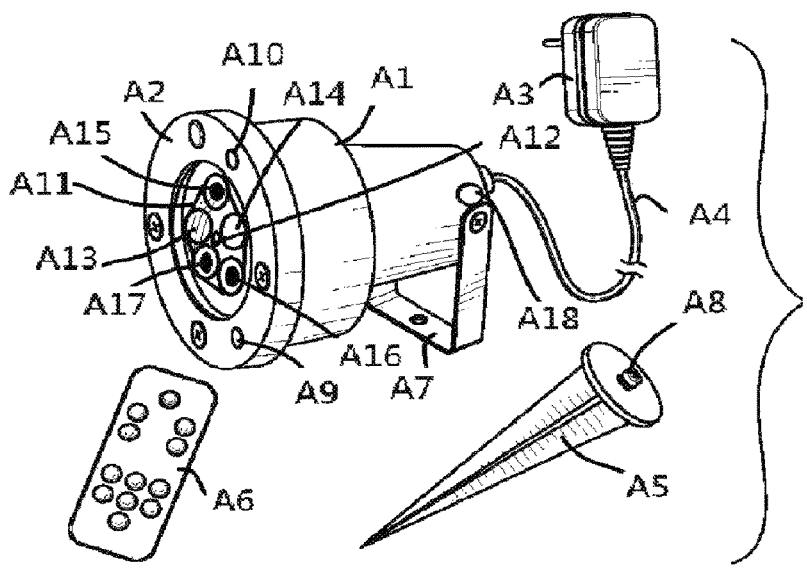

From FIG. 1A disclosure the (LED or-and laser) light source for light device where the light device is a (LED or-and Laser) bulb which has desired top-cover here is a flat piece with big opening on top of the bulb so can allow the inner (LED or-and Laser) light source light beam can widely emit out to outside. The Flat piece top cover can be many different design for different light source. It can be like FIG. 1A which has plurality of prism optic-piece inside the top lens to allow the inner multiple color LEDs light beam to emit out to wider areas to be seen.

From FIG. 1A disclosure the one of preferred embodiment of LED or-and laser outdoor or garden or outdoor seasonal light (A1) has the AC plug-wire or outside transformer (A3) with wire (A4) to connect with AC power source.

The outdoor light (A1) has ground stake or pole or bar (A5) with top connector or screw (A8) to fasten with the light bracket hole (A7) so can install on the flat surface by the bracket or install with the ground stake (A5) to insert into grass ground or mud of outdoor. The said bracket (A7) has fasten units to allow the project direction can be adjustable to desired location such as building, housing, walls, floor, garage door for outdoor areas surface to show the lighted image or-and patterns.

The outdoor garden or seasonal light (A1) has the front cover (A2) has the flat protective-lens (A12) which has no any optics refractive or-and reflective optics properties to protect the inner fixed or rotating one or plurality of the grating-piece (A13) (A14). The rotatable disc or holder or compartment (A11) can install plurality of the grating-piece or hologram-piece (A13) (A14) in front of the said lower laser light source (A15) (A16) (A17) which maybe red or-and green or-and blue or-and other combination colors. The laser light source (A15) (A16) (A17) emit the laser light beam to the front grating-piece (A13)(A14) to split the laser light beam into plurality of the lighted patterns in array/matrix/dot matrix/contour shape for desired colors and size as FIGS. 4, 8, 26B, 33A.

The light outdoor light (A1) is a laser project light device which can be control by the desired sensor (A9) which maybe the motion-sensor or photo-sensor or pair of moving detectors or other market available sensor type to turn on and turn off the said laser outdoor project light under pre-determined functions, light performance. It also can control by wireless controller (A6) which may selected from IR or RF or Wifi or internet system or Remote controller. To control at least one of the functions selected from (1) turn on and turn off, (2) colors selection, (3) brightness or-and dimmer, (4) mixed color or freeze color, (5) rotating or non-rotating, (6) image or-and patterns selection; so it become very good application while use wireless controller (A6).

The grating-piece (A13) or hologram piece (A14) can be a film or injected-piece and install on the disc or holder or carrier (A11) and rotated by the inner or lower motor, movement, rotating device to make the grating-piece change one by one as many as market required to get the desired lighted image or-and patterns. It is appreciated that the said Laser project light (A1) is incorporated with the one or plurality of LED light source as the (i) FIGS. 10A, 10B, 10C, 10D, 10E, 10F, 26A, 26B, 27, 28, 29A to 29D, 33A, 33B, 33C. This arrangement created more exciting and eye-catching LED or-and Laser Project lighted-image or-and lighted patterns which including the (1) colorful image or-and (2) contour of laser image or-and (3) laser array or matrix or dots matrix, or-and (4) other geometric shape or art lighted image or-and patterns.

Figure 1B:
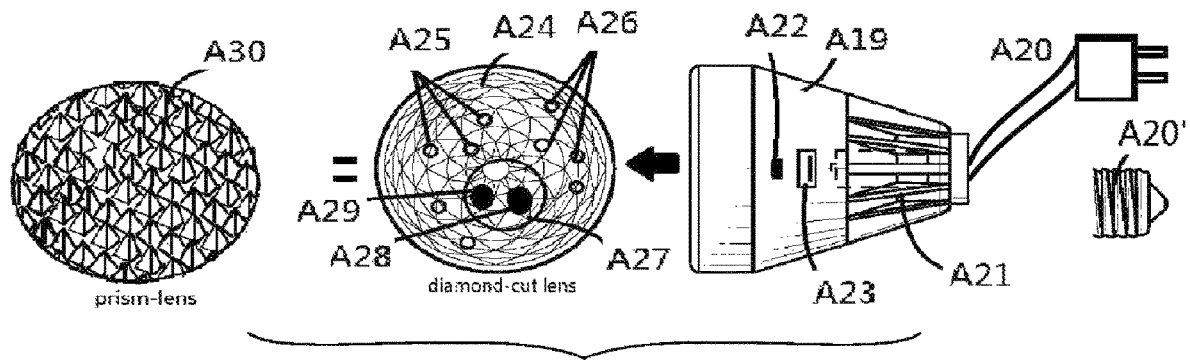

From FIG. 1B The top cover lens also had one area is non-treated window (Not opening but it is different with prism optic-piece area). These areas are design for inner Laser light source because the inner laser light source already had other Optics-lens forming-unit to put in-front of the output-end of laser beam, so the single laser beam passing through the one of optics-image forming-unit here is the grating film. The said grating-film which can make high power single Laser beam into plurality of lower power laser beam in many preferred lighted patterns including matrix, array with or without the motor/rotating/spin device to make it become moving. Furthely, the single laser beam also has contour, shaped image with desired Red or-and green or-and blue or even white color laser image or matrix.

From FIG. 1B show the side view of the one of embodiment of LED and laser outdoor project light device housing (A19) and inner construction to install the optics-lens (A24) (A30) which has refractive or-and reflective or-and diffusing optics properties or any combination for market available optics-properties lens. The said optics-lens to make the inner LED(s) (A25) (A26) to passing through so can get desired light effects. The said optics-lens (A24) (A30) has window (A27) and the window area (A27) has no any optics-properties. The window just for the inner Laser light-source (A28) (A29) laser light-beam pass through the front the fixed or rotating one or plurality of grating-piece (not shown) to form the desired laser image or-and lighted patterns to emit out through the protective-window (A27) to building or house or wall or outdoor surface.

From FIG. 1B the optics-lens (A30) has plurality of the prism-shape tiny optics-lens to form a round optics-lens (A30) which make the inner light-beam to be pass through and light-beam has many times reflection or-and refraction to create pre-determined lighted-patterns and wide spread out to outside of the said optics-lens (A30). If need to get more splendid light effects can add at least one $2^{nd}$ or more added optics-lens in-front of the said $1^{st}$ optics-lens with preferred distance arrangement to make the LED or-and laser light beam to get more splendid effects. To get more exciting LED or-and laser light effect can make the at least $1^{st}$ or $2^{nd}$ optics-lens to move or rotating or spin to make moving effects. It is appreciated this kind of arrangement for LED or-and laser light device has the $1^{st}$ and $2^{nd}$ or more than one of optics-lens is not only fall within the current invention claims and scope. This kind of arrangement is same as co-pending (#ZZZ-family) and identical with the (#ZZZ-3) U.S. application Ser. No. 14/503,647 filed on Sep. 11 2013 now is U.S. Pat. No. 9,719,654 which clear text and claims to cover all LED or-and laser light device so also 100% including the current invention for outdoor lighting. Same as the current invention scope and claims and same as the co-pending (#ZZZ-4,3,2,1,2013) and (#QQQ-5, 6, 7, 3-2, 3-1) (#FF-3,4,5) as above list of parent filed cases. The current invention just make more clear drawing and detail text to show out AC plug-wire and outdoor lighting housing designs and light traveling through the different and many choice of optics-lens.

From FIGS. 1A, 1B, 26A, 39A, show the other optics-lens (7) (RT) is different with flat-piece of (A24)(A30) (A25). The other optics-lens preferred is sphere or ½ ball or ⅔ ball or dome shape that has plurality of diamond-cut surface. The diamond-cut surface is made by plurality of the tiny convex-lens and every tiny convex-lens has outside arc-shape and inside surface is flat so allow the light beam to emit into has multiple times of reflection or-and refraction to spread out the LED light beams. This is same as co-pending (#ZZZ-2013) (#ZZZ-1) (#ZZZ-3) (#ZZZ-4) (#FF-2008 family) and can see details drawing for LED light pass through the said optics-lens (RT) and (RL) as FIG. 39A and FIG. 39B. This kind of diamond cut optic-lens can be one of outside cover or $2^{nd}$ or $3^{rd}$ optics-lens for LED light source which also same as the (#ZZZ-3) U.S. application Ser. No. 14/503,647 filed on Sep. 11 2013 now is U.S. Pat. No. 9,719,654 and can apply for the LED outdoor or LED garden or LED seasonal light application. The co-inventor apply this diamond-cut as rotating top cover in co-pending filed (#ZZZ-1) and (#ZZZ-2) (#ZZZ-2013) and apply this diamond-cut for $2^{nd}$ optics-lens or top cover which can be rotating or non-rotating to incorporate with $1^{st}$ optics-lens which preferred is prism design as optics-lens (A30) for (#ZZZ-3) application because the (A24) design is very good optics-lens.

Figure 1C:
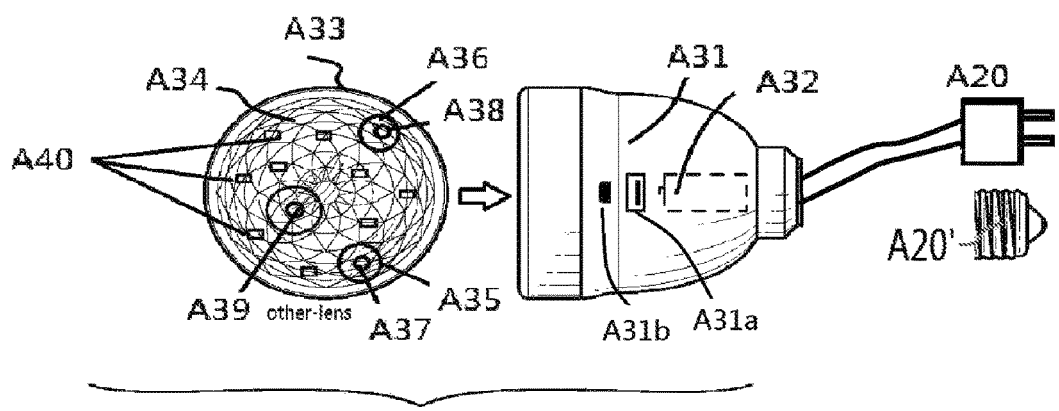

From FIG. 1B and FIG. 1C both show the LED and/or laser outdoor project light-device (A21) (A31) inside had rechargeable battery and AC-to-DC circuitry or DC current circuit. It has USB port (A23) or adaptor to receiving USB-plug for receiving power from power source, or to supply power to other electric device, so can make the LED or laser light device (A21) (A31) has projection functions. The current LED light device (A21) (A31) has projection functions may incorporate other parts to become multiple functions selected from (1) project $2^{nd}$ or more lighted image or patterns (2) illumination light (3) Power fail light (4) USB Charger device (5) USB power bank. Which combination is more popular depend on market requirement.

From FIG. 1C (A40) show the LED or-and laser light device has similar concept and construction with FIG. 1B (A25), the difference at the LED on this preferred embodiment is Chip LED (A40) or Dice-LED in single piece(s) or combined into chip-on-board (COB) types and each of the LED on this embodiment is rectangular shape unit. Not round DIP LEDs (A25).

From FIG. 1A both show the inside had rechargeable battery and circuitry and one receiving end is USB be charged receiving port. And, the other receiving port is USB supply power to other electric device receiving port, so can make the LED has optional functions from these (1) project light (2) illumination light (3) Power fail light (4) USB Charger device (5) USB power bank. Which combination is more popular depend on market requirement.

From FIG. 1C the optic-lens top cover is variety of tiny convex lens and each has different thickness, radius, focus so this is totally different with FIG. 1B which is prism (A30) optic-units inside lens. So the optics-properties will be different even the inside still have LED (A40) and Laser (A39) light source and even has same non-treated window of top-cover to allow inside grating-film and laser light beam to create the laser light show. From the FIGS. 1B, 1C can see the grating-film is one round piece and center had center-hole to install the rotating axis. And, the axis allow the grating-film to rotating and laser beam is aim at one position so the rotating grating-film will rotate from 0 to 360 degree and pass the fixed location laser beam.

The grating-film (A36) (A35) or hologram-film or other optics-film(s) can has as many as different image, contour, shape, geometric art in one round piece for examples 4, 8, 12, 16, 24, 36 so while the optic-film (A36) (A35) is rotating, each certain arc will show out the different arts. How long time to show each arts depend on the rotating device speed and gear set design. It can be very long or short depend on market requirement.

From FIG. 1A show the said (LED or-and laser) light source apply for the garden light. The said garden light which has big opening front or top lens, LED light source and transformer power source, photo sensor, motion sensor, siren/sound device, remote controller, ground stake/pole. it also can have laser light source inside and put a tiny or round disc laser-treated film (hologram or grating film) in front of laser beam emit-out end so can created a plurality of laser light beam. The said (LED or-and Laser) light source can be one or more than one depend on how splendid light performance market wanted.

From FIG. 1D) and FIG. 2 to show the LED light device has project function other embodiment is a LED bulb, from FIG. 2 disclosure the function or-and extra and optional features:

From FIG. 1D show the other embodiment for LED or-and Laser outdoor project light device (AA-1) which has the football shape and has one end (AA-2) is detachable or movable cover-parts for value appearance purpose only. The said 3 basic parts of project-assembly (AA-3) is built-in or fitted into the light (AA-1), and the light has the motor or movement (AA-4). The light device has optional heat-sink (AA-5) to make heat ventilation out while the LED(s) use a high-power or high-wattage type which will created and accumulate very high temperature so need some ventilation holes or gate or door (not shown) and heat-sink, or even need fan (not shown) to make cool down the temperatures created by high-power or high-wattage LED(s).

From FIG. 1D the Football shape LED or-and Laser outdoor project light with the project assembly (AA-3) has 3 basic parts including LED(s) (AA-11) and Image-forming unit or texture-lens (AA-9) and top refractive-lens (AA-8.) The LED light-beam travel through the image-forming unit or-and texture-lens (AA-9) and emit into the top reflective-or-and-reflective lens (AA-8) to make wider spread out and enlarge lighted image or-and patterns out of the light (AA-1). The said LED(s) (AA-11) is install on the base or holder, and light device has center axis (AA-10) extend from the lower motor (AA-4). The Axis (AA-10) can make the desired at least one of combinations of the LED(s), or-and Image-forming unit (AA-9), or-and top refractive or-and reflective lens (AA-8) to rotating so this will come out many combination to make one or two or three of project-assembly's basic-parts to rotating so can come out many different light effects. The calculation will be same as the FIG. 32 show <N type of the top cover or $2^{nd}$ optics-lens (OP-2)> (multiply/Times) x<(5 type of image-forming units or-and texture-lens (604A, 604B, 604C, 604D, 604E)>(multiply/Times) x<(3 type of LED(s) for number and color (601A, 6011, 601C, 601D)> so can get (3N×5×3=15N different combination). This is for example, This is not really number for each of 3 basic-parts for different design, so the possibility for different combination number maybe up to hundreds of the assortments or combinations can created by the different design for each of 3 basic-parts. This also is not same as other US prior arts scope and concepts.

From FIG. 1D the refractive or-and reflective optics-lens (AA-8) has plurality of piece fit into the movable or rotatable disc (AA-7) or holder or compartment which install with the axis (AA-10) to rotate by motor-assembly (AA-4). Incorporate with motor or moving device also can apply for the said image-forming unit or-and texture-lens can be a one piece has (a) shape openings, cutouts, stencils or (b) printing, window, texture, marking, or (c) film, slid, full color arts, or (d) texture lens; which can form the image, patterns while light passing through.

The FIG. 1D show the similar with FIG. 1A for garden light application has (LED or-and Laser) light beam for any combination preferred. Here prefers the garden light in a sport team shape like NFL. The said project-light has the outside housing is football shape. The application use LED light source and required for 100 feet to see clear image so may use super high power LEDs so can project the football team logo/slogan/Sign to 100 feet. At this time the heat came out from numbers of high power LEDs is very high so add the heat-sink or fan or other ventilations arrangement to allow the heat not hurt the parts & accessories also can prevent people to touched and injured.

From FIG. 1A, 1B, 1C, 1D, 1E, 2 the LED is 1 color or 2 color or more than 2 colors with desired light turn-on and turn-off with desired (d1) timing (d2) cycle (d3) duration (d4) sequential (d5) light show (d6) period time (d7) frequency. From these choice can have a lot of combinations or create variety of light performance to create desired or pre-determined functions, light effects.

From FIG. 1D the LED or-and laser outdoor project light has the wire (AA-6) and plug (AA-20) to connect with AC power source. It also can use alternative connectors such as bulb-base (AA-20'), prong, outside circuit to connect with AC power source. Furthermore, while use the different connector (A-20) also can make housing design or shape to let consumer can quickly recognize and know the housing or shape is for the certain application such as Bulb has limited housing, garden light has traditional cone or cylinder or speaker or pagoda or coach shape, the night light has small unit. However to apply the different housing shape or design or construction for the outdoor lighting as long as has the built-in 3 basic-parts of project assembly should still fall within the current invention scope and claims including above listed all the co-pending filed case idea, concept, features, function, construction, arrangement.

From the FIG. 1E also can see the bulb-shape outdoor light has non-optics properties window on its top cover to allow inner Laser LED light-beam passing through to create plurality of low-wattage laser light-beam (AA-21). However basing on drawing space limitation the plurality of laser light beam should cover wider location at least can see the lighted laser image or pattern on the clock's hour-arm position of 10/11/12/1/2 range.

From. FIG. 1E show the other embodiment of the LED or-and laser outdoor project light which has the project-bulb (aa-15) and assembled with garden light's housing, or housing, or stack, or bracket, or bar (A5) under some tiny modification or construction to fit the current invention project-bulb (AA-15) inside of outside garden-housing to become a complete outdoor lighting. The said ground stake, or bracket, or frame (A7) can be desired construction of conventional assembly skill to hold the project-bulb (AA-15). The alternatively, The outdoor light has project-bulb which having male bulb-base (A20') to fit into the garden or outdoor light housing female bulb receiving-socket (O-26 of FIG. 3C) inside so can simple twist the male-bulb-base (A20') into female receiving-socket (O-26) so can offer the same function with above discussed outdoor lighting as drawing for FIG. 1A or FIG. 1B or FIG. 1C. This kind of one project-bulb inside garden light also offer replaceable project-bulb (AA-15) features so no need to buy other light while need to get other different light performance or light effects.

From FIG. 1E the LED or-and laser outdoor light may have optional built-in
(1) USB port (AA-18) to get power from outside power source, or-and
(2) USB ports (AA-18') for charging other device, or-and
(3) AUX plug (AA-17) is Auxiliary function to connect with music device, or-and
(4) Rechargeable battery (AA-16) for power fail or back battery purpose, or-and
(5) Switch or sensor or moving detectors, or-and
(6) Wireless controller receiver;
so can make the project-bulb outdoor light to use for outdoor with most completely functions for outdoor illumination, project image or patterns, power fail light, USB charger, USB Power back, wireless device These are some added functions for project-bulb outdoor light but not limited for listed (1) to (6) functions. It should cover all possibility function which not shown here.

From the FIG. 1E show the (LED or-and Laser) light source for light device, the light device is a bulb which has the 1$^{st}$ optic-element. The 1st optics-element is inside optics-lens having refractive or-and reflective optics properties or-and texture/treated lens so can change the (LED or-and laser) light beam become plurality of light beam as many as possible. Then, the (LED or-and laser) light beam came out from 1$^{st}$ inner Optics-lens get into the 2$^{nd}$ optic-lens which is Top-cover. The said 1$^{st}$ or 2$^{nd}$ optics-lens have refractive or-and reflective optics properties so can create more and much more lighted image or patterns, and spread out and enlarge the lighted image or patterns to emit out from top-cover to desired location(s) including wall, ceiling, fence, ground, house, building, floor . . . etc.

From FIG. 1E) also show the inside housing may also include (1) rechargeable battery or batteries which prefer the rechargeable type, and (2) Circuitry to make recharge or power fail or power bank functions with or without IC help, and (3) USB ports for receiving USB-plug for charged port or-and supply power port. These parts been disclosure on co-pending (#ZZZ-2011) (#GGG) (#III) (#JJJ) (#KKK) on above list. These 3 extra features can add on every bulb or light device with the (LED or-and Laser) light source for 3 added functions top of the original projection function and illumination functions.

From FIG. 1E has both LED light source (AA-22) and Laser light source (AA-19). The Laser light source (AA-19) emit one or more color Laser light-beam to the 1$^{st}$ grating-piece (AA-20) to split the original high-wattage laser light-beam into plurality low-wattage laser light-beams (AA-21) and spread out to big areas to be seen. The grating-piece (AA-21) can be one piece or more than one piece, so can make more splendid arts or-and geometric lighted patterns or-and lighted image. The light device (AA-15) also has LED light source (AA-22), and light-beam emit through the 1$^{st}$ optics-lens (AA-23) which having at least one of refractive or-and reflective lens to reflected or-and refracted for many times while LED light beam. The said LED light-beam travel through the 1$^{st}$ optics-lens (AA-23) and came out to emit to the 2$^{nd}$ optics-lens (AA-24) so can created the light path like (AA-25). The light beam emit out from 2$^{nd}$-optis-lens to spread out to wider area as drawing to many different location outside sphere or ball cover to spread out as drawing LED light-beam path (AA-25) which can see as drawing shown located on 8/9/10 clock hour-arm position. Not only the 8/9/10 location can have the LED spread light-beam but all other 6/7/11/12 also has all LED spread light because the drawing space limitation so the LED spread light path (AA-25) not show on the clock position 6/7/11/12 and even the inner side of the Bulb-shape outdoor lighting unit. Hereof, the conductive piece (A20') is a bulb-base, it can change to AC-plug-wire to connect with AC-outlet so can become the outdoor garden project-light.

From FIG. 2 also disclosure the following extra and optional features:
1. The project assembly for (LED or-and Laser) light device (Z), The said light device has groove (Z), ditch, gap, slot, space to have wire arrangement for the said USB wire for charger or supply current to another device.
2. The project assembly for (LED or-and Laser) light device (Z), The said light device has groove, gap, slot, opening, ditch, holder (Z-1) to install the said be-charged device including portable phone, I pad, consumer electric device, computer device, communication devices which has USB charging related parts & accessories.
3. The project assembly for (LED or-and Laser) light device (Z) has desired outside shape for portable size products. In order to make the said device can fix on position, change light beam emit direction, angle, orientation by its outside shape including but not limited for multiple cuts for one circuit-housing into triangle, square, pentagon, hexagon, heptagon, octagon, nonagon, decagon, or any geometric shape of outside housing with desired angle and height adjustable kits.

From the FIG. 1D show the (LED or-and Laser) light source for light device (AA-1), the light device is a bulb which has all the 1$^{st}$ optic-element is inside optics-lens assembly (AA-3) which has refractive optics properties so can change the (LED or-and laser) (AA-11) light beam to wider direction. Then, the (LED or-and laser) (AA-11) light beam came out from 1$^{st}$ inner Optics-lens assembly (AA-3) get into the 2$^{nd}$ optic-lens which is Top-cover it may have refractive or-and reflective optics properties so can create more and much more lighted image or patterns to emit out from top-cover to desired surface including wall, ceiling, fence, ground, house, building, floor . . . etc.

From FIG. 1D show the inside housing may including:

(1) rechargeable battery or batteries which prefer the rechargeable type, and
(2) Circuitry to make recharge or power fail or power bank functions with or without IC help, and
(3) receiving ends here as the USB be charged port or-and supply power port, so these basic 3 parts selected from co-pending (#ZZZ-2011) list can make each or every bulb or light device with the (LED or-and Laser) light source can become at least 3 added functions top of the original projection function and illumination functions.

It is also appreciated the (LED or-and Laser) bulb has built-in DC power source (a) while bulb male bulb-base install into female bulb-socket on wall, ceiling to project lighted image or pattern or offer illumination to locations. Or The bulb has built-in DC power source (b) while bulb has add-on base with switch (hereafter as switch-female-base) and hanging hook to become a portable bulb can turn on-off by switch-female-base with magnetic for anywhere LED bulb.

The added-on base (switch-female-base) for LED bulb or garden light is a tiny female bulb-base can design to able sit on desktop/floor/ground with built-in multiple settings-switch. It can allow LED bulb put on the desktop/ground and allow people can carry everywhere and make the illumination by switch or hold by hand and touch both bulb (N-pole and I-pole) as wish.

This hand carries portable (LED or-and Laser) Bulb is portable unit and can change location to use every person's daily lighting fixture because daily lighting fixture always on the same position very few can be changed location or moved.

So, the current LED bulb with added-on bulb-base has built-in switch or inductive switch can let people to offer people has light anytime or anywhere when needed. This is very attractive because now can have good illumination for locations which no light. This is good for offer illumination for house or building including working room, living room, and it can offer more functions including change color, change brightness, change emit direction. It is really good for people can use one portable LED bulb to study, work, rest, wakeup, take a walk, go to toilet, find the things, thinking with desired areas be lighted and desired light emitting direction to people eyes.

From FIG. 2 show more details how to apply the (LED or-and Laser) light source for a bulb. The bulb also can fit into all kind of light device. This embodiment disclosure how to use (LED or-and Laser) bulb into a garden light or desk lamp housing. It is very simple as long as the light device has one case or housing has built-in bulb-socket, then, just insert or twist the (LED or-and laser) bulb to the bulb-socket so can become replaceable, changeable (LED or-and laser) light device. Especially like this replaceable and changeable (LED or-and Laser) bulb light device is very good for holiday/seasonal lighting. As known, the seasonal/holiday garden light or outdoor light only use for few days after the holiday/seasonal gone, people throw away or put into garage for next year use. However, the current invention for as cop ending (#QQQ-2011) (#QQQ-1) has project and illumination function so can use simple IC a circuitry design can make the single bulb change from Holiday/Seasonal to Every illumination bulb. Or-and change from everyday illumination to Holiday/Seasonal day use . . . . This can simple use power shut-down circuitry or IC chip or remote controller to make this happen. The said (LED or-and Laser) bulb can do more not only change between the holiday←>Everyday, But also can be LED←>Laser or any combination of all kind of lighting function in 1 (LED or-and Laser) bulb as the (#QQQ-4) (#QQQ-5) (#ZZZ-4) (#XX-2010) (#DD-2008) co-pending filings for the variety assembly for Optics-lens, project-assembly, optics-elements for desired combinations.

From FIG. 2 the outdoor light (Z) has cone or tube or cylinder housing and AC (Z4) plug-wire to connect with preferred connector selected from the 4 suggestion type as rectangular-column show and above discussed.

The outdoor light (Z) the cone or tube or cylinder housing has wire arrangement slots or ditch (Z1) to allow the USB related wires (Not shown) can coil or wrap or fit into while people use the USB related wire to charge or to supply the power. The inner of the housing not only has the 3 basic-parts (Z12)(Z9)(Z13)(Z10)(Z14) including light-source (Z-12) (Z9) of project-assembly as above all discussion but also has rechargeable battery (Z7). The 1$^{st}$ optics-lens (Z13), the 1$^{st}$ grating-piece (Z-10), the 2$^{nd}$ optics-lens (Z-14) of project-assembly as above all discussion. The Type-C USB ports (Z6) and type-A USB ports (Z5) for (USB 1) charging or supplying current from built-in Type-A USB (Z5) to outside rechargeable battery of electric or digital data device including the i-phone or android phone or communication or computer device. Or Type-C USB ports (Z-6) is (USB 2) to get electric power from outside power source through the Micro USB or Type-C USB (Z6). The said inner parts also can have the power fail or other more functions circuit to get desired multiple functions light which can use the built-in rechargeable-battery (Z7) to supply power with proper power fail or-and other more functions' circuit.

From FIG. 2 The said Inner housing has all parts including the (i) 3 basic-parts for laser light source (Z9), & 1$^{st}$ optic-lens is grating-piece (Z10), & 2$^{nd}$ optics-lens is protective-lens (not shown); or (ii) 3 basic-parts LED (Z12) & 1$^{st}$ optic-lens (Z13) & 2$^{nd}$ optics-lens (Z14) of project-assembly. The outdoor light inside housing also can have rechargeable battery, or-and USB ports can inside preferred housing as the above discussed and following discussion of FIGS. 3A, 3B,3C, 3D with wires to AC-plug, or prong, or bulb-base.

From FIG. 2 the outdoor light use the bulb-shape housing which has combo-light source and combo 1$^{st}$ optics-lens including the LED image-forming unit(s) (Z13) for LED light source and 1$^{st}$ grating-piece for laser light source. The AC connector (Z2) (Z3) can selected from four suggestion type (attached details inside Fig Z) here use the male-bulb-base (Z2) to fit into the housing female-bulb-socket (Z3).

Figure 3A:
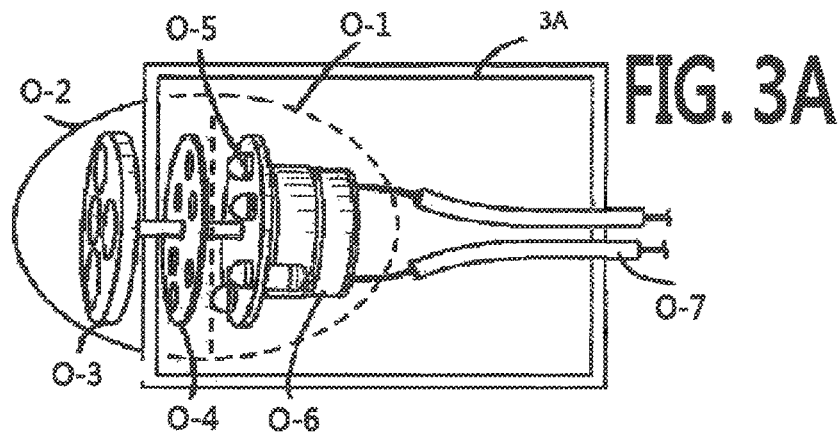
FIGS. 3A to 3D is the other preferred (LED or-and Laser) light source or bulb for different lighting fixture housing for different application including the Garden light, desk lamp, outdoor lighting, camping light, anywhere light. Those has built-in different assembly of projection light, or-and white light illumination, or-and colorful projection, or-and colorful lighted patterns, or-and USB charger, or-and USB power bank, or-and power fail light functions or other market available function with switch, sensor, remote controller, wireless controller to turn-on and turn-off the said (LED or-and laser) light source.

From FIG. 3A disclosure the one light device has its housing which can put into current invention's (LED or-and Laser) bulb or project-assembly with moving or rotating unit into so can instantly become a certain application lighting.

From 3A if the housing is garden light shape housing, it can put the project-assembly as FIG. 2 the (LED or-and Laser) unit or project-assembly with moving or rotating into and fixed and connected by AC-Plug wire to power source. It instantly become an (LED or-and laser) garden light power by wired. Here of, the said the project-assembly of (LED or-and Laser) unit also has two pole on 2 sides to fit into the housing 2 pole holder so the said (LED or-and laser) unit also can be tile and changed the angle or position to aim for light beam direction.

From FIG. 3A The outdoor or garden or seasonal LED or-and laser light has desired housing to fit the 3 basic-parts of project-assembly as current and co-pending filed concept and idea and construction. The said outdoor light has different shape of housing including tube shape (O-8), or Cone shape (O-17), or Speaker shape (O-17), or football shape (O-28), or any geometric shape (O-8). The different housing fit or install the basic 3 basic-parts of project assembly (AA-3 of FIG. 1D) and the optional selected added-parts including the Disc, holder, compartment (AA-7 of FIG. 1D) to load plurality of LED(s); or-and image-forming unit(s), or-and texture-lens, or-and grating piece; or-and refractive or-and reflective or-and diffusing or-and protective lens. The 3 basic-parts can be built-in or installed into the desired housing to form the most simple outdoor projection outdoor light.

The arrangement for built-in or installed 3 basic-parts (AA-3 of FIG. 1D) as below preferred drawing but any alternative design should still fall within the current invention.

From FIG. 3A show the outdoor light has 3 basic-parts (O-3) (O-4) (O-5) of project assembly fit into a geometric-shape and here preferred is football-shape housing only. The said football housing is environment-protection housing or has outer protective-housing (3A) which is a rectangular housing (3A). The current example the said light device is only for laser light source application, the top or front optics-lens or optics-cover is protective-lens (O-2), dome (O-2), sphere (O-2) or ½ ball or more than ½ ball shape (O-2) and allow the inner 3 basic-parts (O-30 (O-4) (O-5) project-assembly to create the desired laser lighted image or-and light patterns. The inner 3 basic-parts has motor (O-6) to make any combination as above discussed (X-types of choice of light source)×(Y-types of choice of image-forming unit)×(Z-types of choice of refractive or protective lens) of 3 parts to rotate to make hundreds of assortments of light show. The said light has wire to work with above discussed "AC power source" connector to form a completely outdoor light.

Same as the FIGS. 3A, 3B, 3C and FIG. 4, From FIG. 3A show the 3 basic-parts (O-11) (O-12) (O-13) of project-assembly fit into one housing (O-9) for outdoor use or-and optional have $2^{nd}$ environment or protective or cosmetic housing or outer-protective-housing (O-8). The outdoor light has flat cover or flat lens (O-10) to protect the inner 3 basic-parts of project-assembly, and the said 3 basic-parts has the desired combinations to rotate or non-rotate any of the 3 parts to create splendid light performance.

Figure 3B:
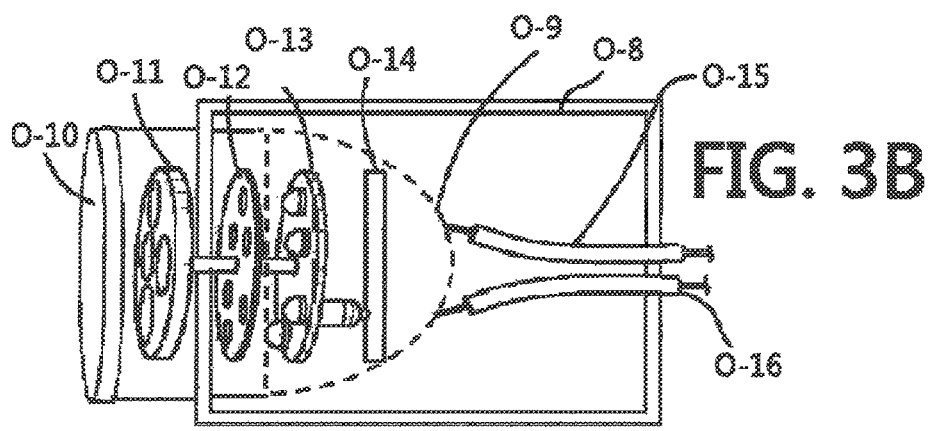
Figure 3C:
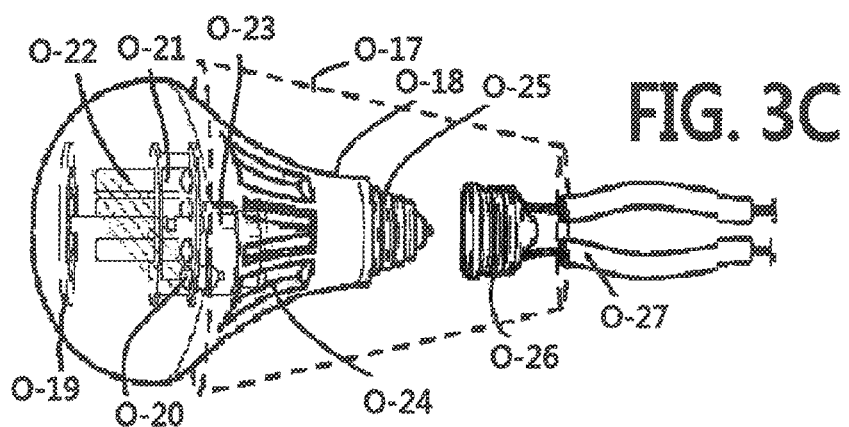

From FIG. 3C, the 3 basic-parts (O-19) (O-20) (O-21) installed into a project-bulb into desired outside housing (O-18) and it is not using the conductive wire (O-7) (O-15) (O-16) to connector to get AC power. The project-bulb fit into the desired outdoor light housing (O-18) has its own connector is a male bulb-base (O-25) and can assemble with housing (O-17) built-in female bulb receiving-socket (O-26) or other female bulb-socket (not shown) to build the electric delivery. The female bulb-socket (O-26) can use any one of the 4 connectors as above discussed to get AC power source while use different shape of the outdoor housing as the FIGS. 3A. 3B, 3C. The said project-bulb (O-18) fit into outdoor light (O-18) female receiving-socket (026) which may BE sealed together with rubber-sealing (not shown) or not depend on different requirement for environment standard or-and for easily replace the project-bulb (O-18). The said project-bulb also is one individual LED or-and laser project light device which still fall within the current invention and co-pending filed parent or child filed cases claim and scope. The said project-bulb fit or install on outdoor-light device including the outdoor-light housing, frame, holder, bracket, stand, ground-pole or ground-stake with holders.

From FIG. 3B same as FIG. 3A but has different rotating device. The FIG. 3A the said image forming-unit has printed piece or cut-outs or holes or windows or shaped arts with the rotate optic-lens sets on top. So, the super bright high power LED light beam can pass through the image forming-unit and passing through the rotating refractive optics-lens so can see the image is moving for arc traveling path to viewer. The FIG. 3A use rotate device is a motor and gear set may have variable resistor or other electric parts & accessories can make brightness or speed or focus adjustable.

From FIG. 3B the rotate device is so silent and less power consumption clock movement instead of FIG. 3A the motor and gear-set which is noisy and big power consumption.

From FIG. 3C it the above discussed put the (LED or-and laser) bulb into any existing light device Big housing which has built-in bulb socket. While the bulb-socket are sealed into a super compact size housing with on-off switch and hook/hanger/magnetic will become an anywhere light as above discussed.

Figure 3D:
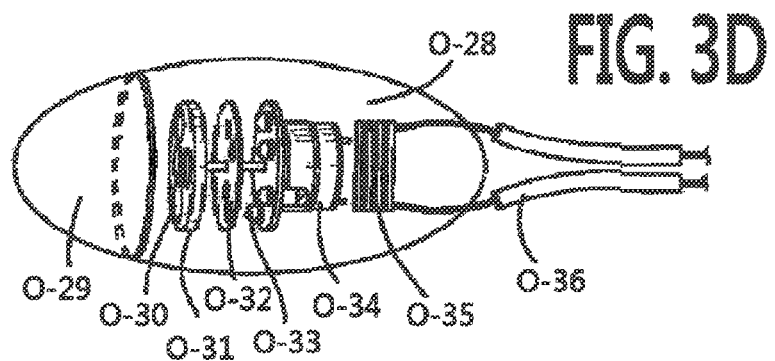

From FIG. 3D is same as above discussed FIG. 3A. This is more details drawing for the inner construction.

From FIG. 3D, show the outdoor light is football shape (O-28) which has one end (O-29) is cosmetic or movable or detachable piece. The 3 basic-parts (O-31) (O-32) (O-33) install inside the housing (O-28) and the LED (O-33) are high-powered LEDs which have high-temperature so need heat-sink (O-35) to make ventilation to cool down the heat. The alternative can use fan or more heat-sink (O-35) while use more high-power LED (033) to project brighter or more long distance for projection image-or-and patterns. Same as the Laser light source while use the high wattage laser light source also can have the optional ventilation design including ventilation hole, grill, slots, heat sink or fan or liquid ventilation medium.

Figure 4:
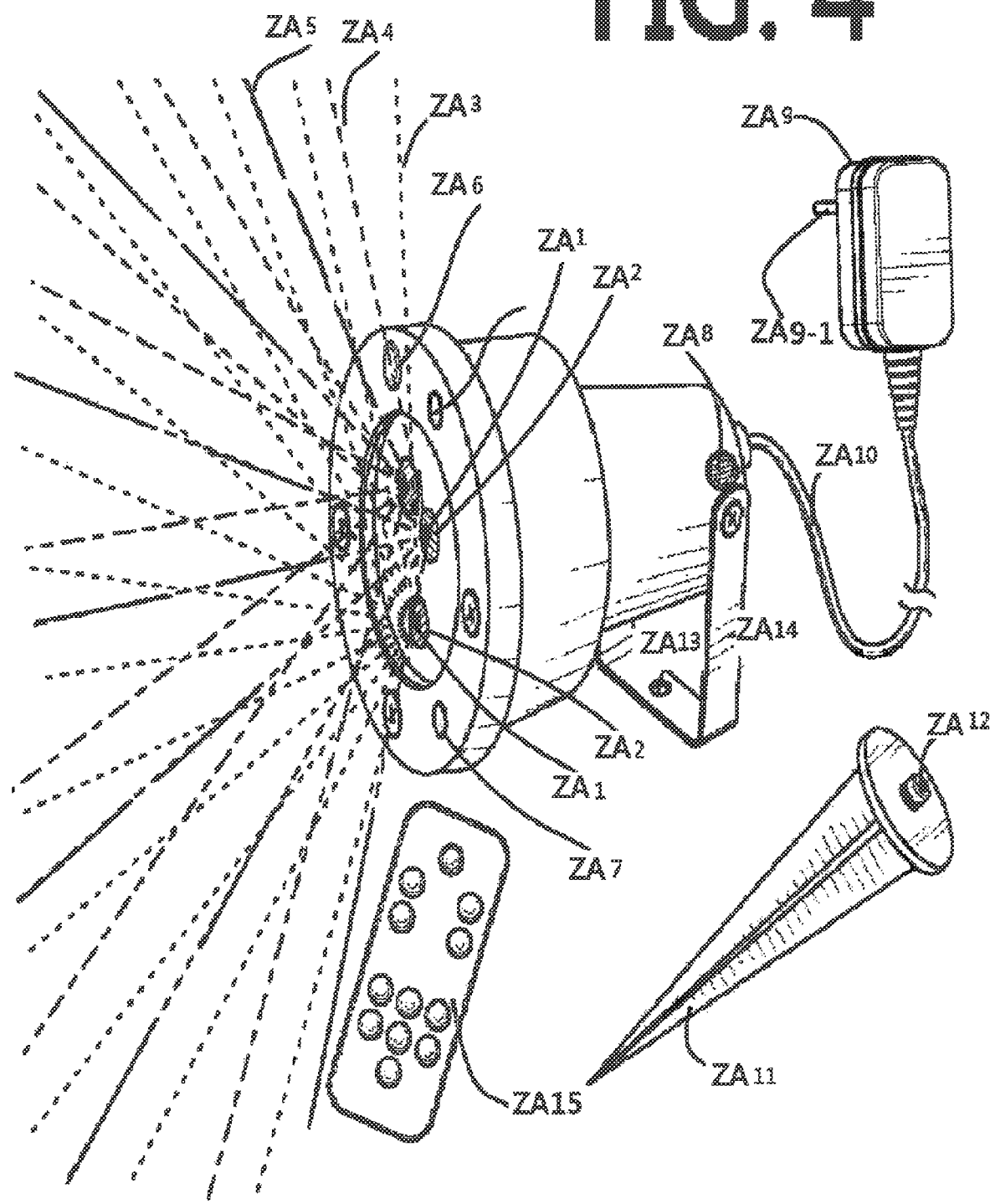
FIG. 4 is the co-pending filing case has Laser light source inside the said garden light.

From FIG. 4 is similar with FIG. 1 as co-pend (#XX-2) FIG. 4 of Co-pending Ser. No. 15/170,071 for Laser Projection garden light.

From FIG. 4 the LED or-and Laser outdoor light which is same as the FIG. 1A. The difference at the FIG. 4 grating-piece (ZA2) is only in front of the laser light source (ZA1) and not same as the FIG. 1A that has rotatable disc to load plurality of grating-piece(s). And $2^{nd}$ difference at each grating-piece of FIG. 1A has different-design including; (a) some can project the array, or (b) some can project linear art, or (c) some can project contour or shape art, or (d) some can project dots or matrix, or (e) some can project special geometric shape, or (f) others. So these are the major difference for one vs. plurality rotating grating-piece.

The other difference at the FIG. 4 show the multiple color of Laser light beams including $1^{st}$ color (ZA3) and $2^{nd}$ color (ZA4) and $3^{rd}$ color (ZA5). The outdoor light also has photo-sensor (ZA6), or motion sensor/a pair of moving detectors (ZA7), or even has speaker (ZA8). The outdoor light also can optional incorporated inside wireless communication system including Wi-Fi, Zigbee-wave, internet, IR remote controller, RF remote controller, or-and incorporate with APP software and communicate by 3G/4G/5G network.

Furthermore, the current invention also had update (22) features which follow co-inventor all and non-listed co-pending or issued patents content, spirit, concept is as list below:

1. The project assembly for (LED or-and Laser) light device consist of;
   At least one of (LED or-and laser) light source which has strong light beam to project image or lighted patterns from 10 feet to 100 feet distance to be seen; and
   At least one project assembly to create the lighted image or patterns has following arrangement:

(a) At least one of tube; or tube-like piece; or cylinder shape tube; or-and housing parts to prevent light beam leakage out from light device.
(b) At least one of image forming-unit; or-and lighted pattern forming-unit; or optics-pattern forming-unit (optics-lens) fit within (A) and in-front of the light source(es) to get the lighted image or lighted patterns.
(c) At least one of optics-elements for the light device's top-cover is one of flat piece; or partial round shape; or sphere; or dome shape. The-cover has wider opening to allow inner light beam to pass through and show desired lighted image or-and lighted patterns on surface which is away from light device and at least 10 feet away to present desired lighted image or patterns for any wall, ground, floor, buildings, surface.

The project assembly for (LED or-and Laser) light device, the said project assembly further incorporate with moving device which is one of a motor, clock movement, inductive device, rotating unit, spin unit, gear set, elastic twist set to make the said forming-unit; or-and optics-element; or-and optics lens; or-and top cover to move to create the moving effects.

2. The project assembly for (LED or-and Laser) light device, the said project assembly has at least one of image forming-unit which selected from slide; film; printed piece; stencil; piece has holes, cutouts, windows; LCD displayer, wireless-data screen, LCoS Lens with data-changing screen, internet wireless image.

3. The project assembly for (LED or-and Laser) light device, the said project assembly has at least one of the lighted image forming-unit which selected from printed piece; stencil; piece has holes, cutouts, windows; geometric shaped windows with or without the movable device.

4. The project assembly for (LED or-and Laser) light device project-assembly has at least one of the optics image forming-unit or optic-lens having at least one of optics properties selected from: (1) reflective, or-and (2) refractive, or-and (3) different light passing capability, or-and (4) laser treated film having grating or hologram effects in one or-and two surface. These optics-lens or piece or film has different thickness, texture, curvature, finish, focus, light passing through capability, color, gaps, line-number, on anywhere of the said single piece of said optics-lens or optics-film for pre-designed specification.

5. The project assembly for (LED or-and Laser) light device, the said the said project assembly has high power LED light source which from 0.5 Watt up to 50 wattages with or without the heat sink, ventilation device, fan to get rid-off the heat made from light device.

6. The project assembly for (LED or-and Laser) light device, the said (LED or-and Laser) light source for light device has at least one of (LED or-and Laser) light source for any number from one to N (N is any number)

7. The project assembly for (LED or-and Laser) light device, the said (LED or-and laser) light source for light device which can create as many as different light functions while incorporate with circuitry, or-and IC, or-and control device so can change the multiple function from one to others function under pre-determined circuit and function design.

8. The project assembly for (LED or-and Laser) light device, the said (LED or-and laser) light source for light device has at least one of control device which in group combination selected from switch, sensor, motion sensor, sound sensor, remote controller, IR or RF remote controller, power on-off change function system, wireless communication system, Wi-Fi & APP controller, Z-way controller, wireless controller.

9. The project assembly for (LED or-and Laser) light device, the said (LED or-and laser) light is powered by the (1) AC, or-and (2) DC, or-and (3) backup battery or rechargeable battery, or-and (4) solar power module charge inner energy storage device and energy device offer the power to garden light.

10. The project assembly for (LED or-and Laser) light device, the said (LED or-and Laser) light housing has built-in at least one of bulb female-socket to receive (LED or-and Laser) bulb male bulb-base, and the said light device is controlled by control device for desired light functions or effects for steady or changeable features.

11. The project assembly for (LED or-and Laser) light device, the said (LED or-and Laser) light source having changeable function(s) by electric device to (1) change to other light performance, (2) change to other taste, (3) change from seasonal/holiday performance to everyday illumination function; and-or (4) change from everyday application to seasonal/holiday performance; to save consumer pocket.

12. The project assembly for (LED or-and Laser) light device, the said (LED or-and Laser) light source for the bulb application, the said combo-base-type has built-in more than one different-size-bases into one base. And, size selected from E-11, E-12, E-17, E-26, E-27, E-30 or other market available size base including screw base, bayonet base, twist-base, one more twist or rotating angle base.

13. The project assembly for (LED or-and Laser) light device, the said light is an outdoor lighting having more than one functions select from:
(1) power fail, (2) warning light, (3) SOS help light to get people notice and get help, (4) flood warning light, (5) motion sensor security light, (6) night light, (7) photo sensor light, (8) burglar alarm light, (9) camera or video and image or-and sound storage light, (10) animal/wolf/bear/deer alarm light, (11) animal repelled light (12) light has siren device; to protect residence person or-and property safety.

14. The project assembly for (LED or-and Laser) light device, the said the light device project at least one of the image or lighted pattern has steady or moving effects, performance including; (1) Holiday/Seasonal art; (2) (LED or-and laser) lighted image; (3) image has matrix or array arrangement; (4) single or multiple color of (LED or-and Laser) (image or-and lighted patterns); (5) words, character, logo, geometric arts; (6) Sports team sign; (7) commercial related data, image, art, slogan.

15. The project assembly for (LED or-and Laser) light device, the said light device incorporate with Laser light source has built-in safety sensor to stop the laser beam while object/people is detected and get into safety range and the light device will shut-down the laser light source until the object/people is out and away of the safety range.

16. The project assembly for (LED or-and Laser) light device, the said light device incorporated with Laser-Bulb as light source having built-in safety sensor to stop the laser beam while object/people is detected and get into safety range and the light device will shut-down the laser light source until the object/people is out and away from the safety range.

17. The project assembly for (LED or-and Laser) light device the said (LED or-and laser) light source for light device which having at least one function including (1)

project image or lighted pattern for steady or moving effects; (2) Offer the illumination; (3) take photo or video at any time, or while sensor been triggered; (4) offer power to other device from built-in USB ports and related USB wire accessories.

18. The project assembly for (LED or-and Laser) light device, the said light device is a one of indoor light device including night light, bulb with bulb-base, down light, room light, desktop light, seasonal/holiday light including light string; (or-and) is a one of outdoor light device including garden light, patio light, seasonal/holiday light including light string, camping light has at least one or more than one functions including projection, illumination, USB charging or be charged function, USB power bank function, power fail function.

19. The project assembly for (LED or-and Laser) light device, The said light device is an outdoor garden light has required waterproof or-and anti-environment has installation kits to Insert into ground or sit on the surface of outdoor fields.

20. The project assembly for (LED or-and Laser) light device as claim 1, The said light device has groove, ditch, gap, slot, space to have wire arrangement for the said USB wire for charger or supply current to another device.

21. The project assembly for (LED or-and Laser) light device, The said light device has groove, gap, slot, opening, ditch, holder to install the said be-charged device including portable phone, I pad, consumer electric device, computer device, communication devices which has USB charging related parts & accessories.

22. The project assembly for (LED or-and Laser) light device, The said light device has desired outside shape for portable size products in order to make the said device can fix on position, change light beam emit direction, angle, orientation by its outside shape including but not limited for multiple cuts for one circuit into triangle, square, pentagon, hexagon, heptagon, octagon, nonagon, decagon, or any geometric shape with desired angle and height adjustable kits.

23. The (LED or-and Laser) light source for light device consist of;

At least one of (LED or-and laser) light source or (LED or-and Laser)-bulb which has strong light beam to create image or lighted patterns from 10 feet to 100 feet distance to be seen; and At least one optics-assembly to create the lighted image or patterns has following arrangement:

(1) At least one of tube; or tube-like piece; or cylinder shape tube; or-and housing parts to prevent light beam leakage out from garden light.

(2) At least one of image forming-unit; or-and lighted pattern forming-unit; or optics-pattern forming-unit (optics-lens) fit within the said in-front of the light source(es) to get the lighted image or lighted patterns.

(3) At least one of optics-elements for the light device top-cover which is one of flat piece; or partial round shape; or sphere; or dome shape has wider opening to allow inner light beam to pass through and show desired lighted image or-and patterns on surface which away from light device at least is 10 feet away to present lighted image or patterns for any wall, ground, floor, buildings, surface.

The improvement;

The said (LED or-and Laser) light source and the said (A) (B) (C) all fit into the space of the said light device and powered by AC; or-and DC; or-and solar power with energy storage system.

24. The (LED or-and Laser) light source or bulb for garden light consist of;

At least one of (LED or-and laser) light source or (LED or-and Laser)-bulb which has strong light beam to create image or lighted patterns from 10 feet to 100 feet distance to be seen; and At least one optics-assembly to create the lighted image or patterns has following arrangement:

(1) At least one of tube; or tube-like piece; or cylinder shape tube; or-and housing parts to prevent light beam leakage out from garden light.

(2) At least one of image forming-unit; or-and lighted pattern forming-unit; or optics-pattern forming-unit (optics-lens) fit within the (A) and in-front of the light source(es) to get the lighted image or lighted patterns.

(3) At least one of optics-elements for the light device top-cover which is one of flat piece; or partial round shape; or sphere; or dome shape has wider opening to allow inner light beam to pass through and show desired lighted image or-and patterns on surface which away from garden light and at least is 10 feet away to present lighted image or patterns for any outdoor wall, ground, floor, buildings, house, surface.

The improvement;

The said (LED or-and Laser) light source and the said (A) (B) (C) all fit into the space of the said garden light.

The said garden light has qualified for certain degree of waterproof or-and anti-environment and has installation kits to Insert into ground or sit on the surface of outdoor fields and powered by AC; or-and DC; or-and solar power with rechargeable energy storage system.

Not only these (24) features but also has the below (3) co-pending filing cases with same skill, concept, combination, method as below copy all original filing details description for examiner to review or cross-reference much easily and quickly.

Below is co-pending filing (#XXX-2) Detail description should still fall within the current invention claims:

The current invention for a safety laser projection light has light beam blocking wall and safety sensor means to prevent people from directly looking at the laser unit's strong light beams to overcome all marketplace concerns.

The current invention also provides a combination of a laser projection light and built-in LED light source that serves as a night light to supplement the laser projection light function. In case people do not want to see laser light performance, so that people can turn off the laser projection light and keep the LED night light on when plugged into an outlet, thereby adding practicality to the laser projection light.

The current invention also may apply a motor means, adjustable means, time piece parts and accessories, and/or motion means to cause the at least one laser, hologram, or grating means to change relative orientation, position, and/or distance and thereby cause the light beam patterns to change or vary for an eye-catching laser beam light performance.

As shown in FIG. 5 the laser projection light includes a laser unit (1*f*), circuitry (1*g*), prongs (1*q*) (1*q'*), and an adjustable means (1*e*) to change the relative orientation or position of the laser, a hologram, a grating, or other optics means and create changeable, variable, variety, plurality of the different laser light beams performance.

As shown in FIG. 5, The said adjustable-unit (le) has adjustable or changeable $2^{nd}$ grating-piece (1*f'''*) is located top of 3 basic-parts of project-assembly which are protective-lens (side of 1e) and grating-piece (1f''') and lower Laser light source (1f') consist the basic laser project-assembly. The said laser project-assembly install within the light housing by parts may select from group combination from housing parts, or (ii) bracket(s), frame(s), holder(s), bar(s), or
(iii) screws, or
(iv) tube(s) or tube-piece, or tube-assembly;
to install the said 3 basic-parts of project-assembly and prevent the light-source light-beam to leakage out while light-beam travel from the light source to grating-piece to top protective-lens. It also can arrange like parent filed case the 3 basic-parts can put into a single or plurality of piece(s) tube which has wall to prevent from light-beam leakage out from LED to image-forming units to top optics-lens.

The laser unit (1f) faces upwardly while the prong means (1q) (1q') face a rear side of the housing facing a wall outlet and a sensor (1j), lens (1m), and blocking wall (see element 2-2d in FIG. 2-2) are on the front side. The laser light beam be blocked by the blocking wall, so the laser light beams can only be emitted to a certain angle from the ceiling, which angle can be designed so people cannot directly see the light beams to harm their eyes. The safety sensor means (1j) senses people close to the projection light and stops the laser unit from emitting laser beams to provide protection that is in addition to that provided by the blocking wall.

FIGS. 6A, 6B, 6C. 6D show details of the preferred embodiment of FIG. 1, including a lens (2-1d) (2-2b), front housing (2-1c) (2-2a), laser unit with adjustable grating-kit (2-1e) (2-4d), LED (2-1g) (2-2f) (2-3e), prong (2-1f) (2-2c), safety sensor (2-1b) (2-3b), optional blocking wall (2-2d) (2-4c) and photo sensor (2-1b), (2-2d, (2-3b).

FIG. 6E shows the laser light beam performance provided the laser projection unit on walls and a ceiling. It also shows the sensor means to sense people close to the laser projection light. When people fall within the sensing range, the sensor will deliver an electric signal to circuit means to turn off the laser unit and stop it from emitting laser beams. This will prevent kids or people from directly viewing the strong light beams emitted by the laser unit, which would otherwise harm the people's eyes. The sensor range designed as required by the market. A preferred range is one feet, covering a vertical range of 45 degrees above and below the center and a horizontal range of 90 degrees or more to the left and right of center. In the meantime, the laser projects onto the wall into which the projection light is plugged and onto the ceiling, but part of the projection area is blocked by the blocking wall. The text-box notes of original filed drawing also show the features including (1) LED light beam emit to the top ceiling (C) or-and Wall (W) from the laser-unit (2-5f),
(2) the sensor (2-5a) to detect person range vertical up to 180 degree and horizon up to 270 degree, or
(3) the sensor detected distance can up to 200 feet or more;
To the person to sensor people and stop laser beam for safety protection The text-box notes of original filed drawing also show the Laser or-and LED light device for all applications including Laser light source (2-5f) or-and LED (2-5g) or-and switch (2-5h) to turn on or turn off the light device (2-5A), or-and photo-sensor (2-5i).

The text-box notes of original filed drawing also show laser image project to wall and ceiling from outlet location but not beyond the block-wall (2-5j).

Figure 7A:
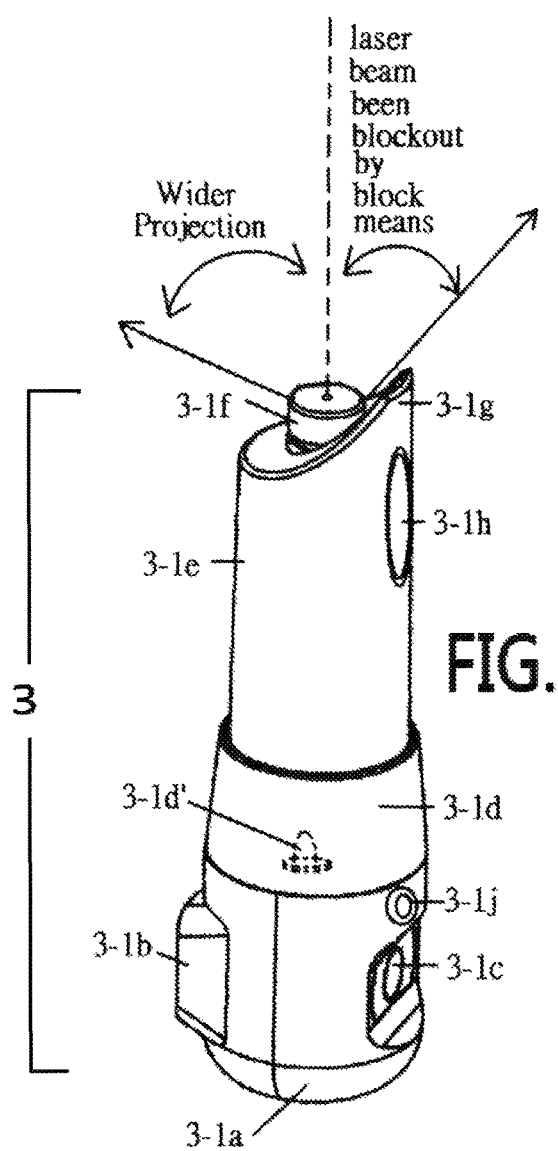
Figure 7B:
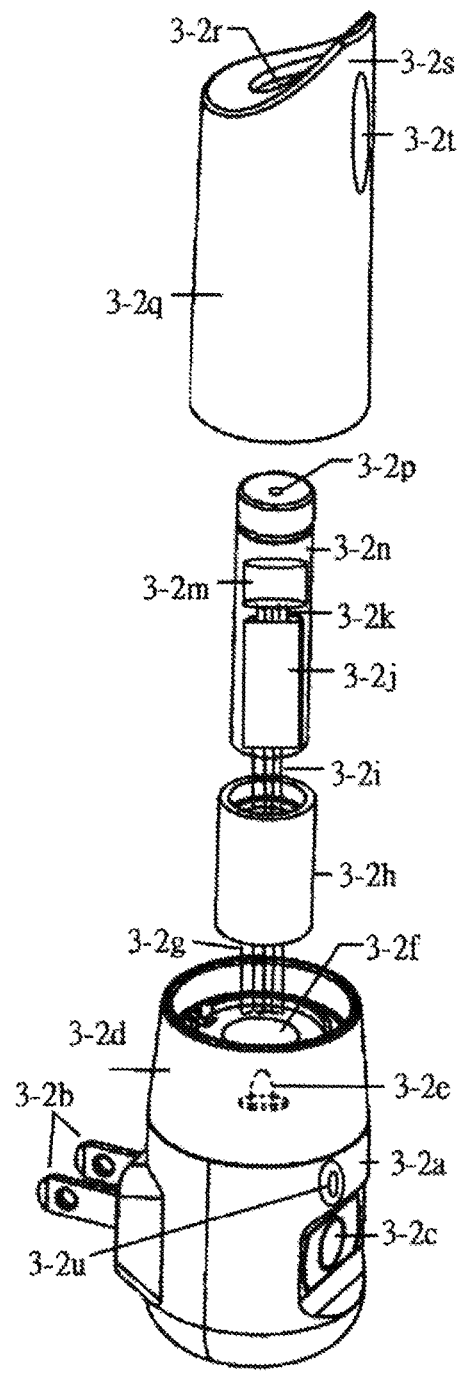

FIGS. 7A, 7B, 7C. 7D, 7E, 7F, 7G show a second preferred embodiment. This is a different shape of the laser projection light but which still has a blocking wall (3-1g) (3-2s) extending on one side of the housing. And, the light-device have at least one of desired parts including:

a safety sensor means (3-1h) (3-2t),
a top housing (3-1e) (3-2q),
a lower housing (3-1d) (3-2d),
a LED night light base with UL approval certification (3-1a) (3-2a),
a built-in LED (3-1d') (3-2e) that serves as a night light,
a photo sensor (3-1c) (3-2c),
a switch means (3-1j) (3-2u) to turn off the laser projection light by manual operation,
a laser unit (3-1f) (3-2m),
a circuit means (3-2j),
a conductive means (3-2i) (3-2g),
a holder (3-2h),
a lens (3-1d) (3-2d),
a prong means (3-2b),
a battery compartment (3-1b) or
other electric parts and accessories
to cause the laser (3-1f) (3-2m) and LED (3-1d') 93-2e) to provide two light sources in one unit. This embodiment may also include just the laser projection light without the LED. Optional added features include a hologram, laser, grating optics means and means to change the relative position and orientation of the laser unit by a motor means, adjustment means, movement means or other means to enable at least one of the optics means to change from a last position or orientation and create changeable or variable laser light effects. Or FIGS. 7A to 7F show a second preferred embodiment. That is a different shape of the laser projection light for DC powered or AC powered. And get power from battery or adaptor or transformer or power generator or from house AC power source for Laser indoor or outdoor light. The laser projection light has optional function select from blocking wall (3-1g) (3-2s) extending on one side of the housing, or a safety sensor (3-1h) (3-2t), or a top housing (3-1e) (3-2q), or a lower housing (3-id) (3-2d). Or, night light base with UL approval certification (3-1a) (3-2a), a built-in LED (3-1d') (3-2e) that serves as a night light, a photo sensor (3-1c) (3-2c). Or, a switch (3-1j) (3-2u) to turn off the laser projection light by manual operation, or, a laser unit (3-1f) (3-2m), or circuit (3-2j), conductive piece (3-2i) (3-2g). Or, a holder (3-2h), a lens (3-1d) (3-2d), prong (3-2b), a battery compartment (3-1b). Or, other electric parts and accessories to cause the laser (3-1f) (3-2m) and LED (3-1d') 93-2e) to provide two light sources in one unit. This embodiment may also include just the laser projection light without the LED. Optional added features include a hologram, laser, grating optics piece and parts to change the relative position and orientation of the laser unit by a motor, adjustment kits, movement device or other device to enable at least one of the optics-piece or optics-element to change from a last position or orientation and create changeable or variable laser light effects.

As shown in FIGS. 7A, 7B, the blocking wall (3-1g), (3-2s) extends into the wider projection area so as to block laser beams on side of the projection area. The blocking wall (3-1g) (3-2s) is on the same side as the sensor (3-1h), (3-2t) for turning off the light device in case someone enters the sensing area. An LED (3-1d'),(3-2e) is also provided to provide a night light function through housing part (3-1d), (3-2d) even when the laser unit (3-1f),(3-2n) is switched off by switch (3-1c),(3-2c). As usual, the night light LED controlled by a light sensor (3-1c), (3-2u). Power may be provided by batteries, a transformer or adaptor, or, as shown in FIG. 7B, prongs (3-2b).

From text box notes of original drawing, the current invention Laser Project light is powered by DC or batteries or adaptor or transformer or power generator device from market available power source and through preferred conductive parts or-and accessories including prong, AC Plug wire, or other conductive piece or connectors for different indoor or outdoor applications.

From the FIGS. 7C, 7D, 7E show the front and side and back viewing angle for $2^{nd}$ embodiment for laser or-and LED light device for indoor or outdoor application. From FIG. 7C show the front of light device (3-3A) which has optional safety sensor (3-3a) which can detect object move into the safety range or not to let laser light source to stop emit light and also has optional LED light source (3-3b) which can be control by the switch (3-3c) and photo sensor (3-3d). The said light device (3-3A) can have desired housing to fit for different indoor or outdoor application(s).

From FIG. 7D and FIG. 7E also disclosure the 3 basic-parts of laser project-assembly.

From the FIG. 7D and FIG. 7E show the preferred parts and accessories for all kind application only need change desired light housing design can instantly become one preferred light device including; (i) indoor light or (2) outdoor garden or (3) patio light(s) has laser or-and LED light device.

One of the preferred embodiments is tube or cylinder or cone shape garden light which can have different conductive parts and accessories to connect with AC or DC power source including conductive (a) prong, (b) plug-wire, (c) metal conductive-piece such as battery contactors.

The said Laser or-and LED light (3-4A) (3-5A) which has the Laser light unit (3-4a) has circuitry (3-4b) to emit the desired color of the Laser light beam with desired wattage which can installed or fixed on housing or tube or tube-assembly (3-4c). To assemble the said 3 basic-parts for laser project-assembly by frame, holder, bracket(s) to assembled together to make sure the limited laser light-beam travel from light source to grating-piece to top protective-lens has no light-beam leakage out.

From FIG. 3-4A) (3-5A) see the laser light source and grating-piece and top protective lens has separated section with preferred assembly parts including housing parts, bracket, frame, holder and screw; to make a no light-beam leakage from the light source to grating-piece and emit to top lens.

In front or top of the laser light unit (3-4a) has at least one of the optics-lens where preferred is grating-piece (3-4d) which will split the laser unit (3-4a) big wattage laser-beam into plurality of the low-wattage laser-beam and go through the top or front opening to wider area or range. The upgrade applications can optional add movable or-and adjustable $2^{nd}$ grating-piece (3-4e) which can be single-piece (3-4e) or plurality of pieces or plurality of grating-films fit into movable disc, and incorporate with desired rotatable head (3-4f) or rotatable disc (not shown) by manual or automatically.

So the Laser-beam out from laser-unit (3-4a) go through the 1st optics-piece (3-4d) and also go through the $2^{nd}$ optics-piece (3-4e) to create more splendid lighted patterns, image, array, matrix, contour of objects. The rotatable head (3-4f) or disc while changing by manual or automatically, the said lighted patterns, image, array, matrix, contour of object also will change according the different the $2^{nd}$ optics-lens (3-4e) or $2^{nd}$ grating-piece (3-4e). These concept are same as co-inventor's parent filed case (#ZZZ-3) U.S. application Ser. No. 14/503,647 filed on Oct. 1 2014, now is U.S. Pat. No. 9,719,654 which disclosure the Laser or-and LED light beam passing through at least $1^{st}$ and 2nd optics-lens.

These concept also are same as co-inventor (#QQQ-3) U.S. application Ser. No. 14/983,993 filed on Dec. 30 2015 and its parent filing case (#FF-2008) U.S. application Ser. No. 12/318,470 filed on Dec. 30 200.

Both disclosure plurality of image-forming units or optic-lens install on movable or rotating disc or holder or compartment to rotate or move by motor, movement, spin-device to change by manual or automatically.

The current invention also has parent filed cases (#11-2009) U.S. application Ser. No. 12/624,621 filed on Nov. 24 2009 show the said LED light application to apply for the garden light, outdoor light, seasonal lighting, or seasonal garden light.

The said laser project light for outdoor all application has more than one same system(s) as above discussed, or-and
(ii) more than one of the laser-unit (s) (3-4a), or-and
(iii) different colors or desired one or two or three or more colors, or-and
(iv) more than one front or top optics-lens (3-4d and 3-4e), or-and
(v) motor or movement-kit or rotating-unit;
to make the said at least one of the front or top optics-lens here is preferred grating-piece (3-4d or-and 3-4e or more) to rotating or movable so can make it has changeable variable laser lighted patterns, image, array, matrix, contour of objects. More details same as FIG. 4.

From FIGS. 7C, 7D, 7E show the said Laser or-and LED light has Laser or-and LED light source built-inside preferred night light or garden light or outdoor light or outdoor light strings. So, The Light has not only has laser light-beam show contour of object, lighted patterns, array, matrix; but also can show LED light performance for characters, cartoon, image, geometric arts which same as co-inventors variety parent filing case including;

A. (#ZZZ-3) U.S. application Ser. No. 14/503,647 filed on Oct. 1 2014 now is U.S. Pat. No. 9,719,654; and
B. (#QQQ-3) U.S. application Ser. No. 14/983,993 filed on Dec. 30 2015; and C. (#FF-1) U.S. application Ser. No. 12/886,832 filed on Sep. 21 2010 now is U.S. Pat. No. 8,721,160; and
D. (#TT-12) U.S. application Ser. No. 12/866,832, Filed on Sep. 21 2010; and
E. (#II-2009) U.S. application Ser. No. 12/624,621 filed on Nov. 24 2009, publication data US2010/0214541 date Aug. 26 2010.

More important is all these parent filed and each of parent filed case still has child patent(s) pending, so none of these (A to E) parent filed case or issued patents can be as PRIOR-ART of current filed case.

Those has image-forming unit or display or film or slide or cut-out piece to create image, patterns, cartoon, characters and let the said LED(s) light beam passing through to create a desired image or patterns through reflective or-and refractive lens to wide or big range or areas.

From FIGS. 7C, 7D, 7E show other preferred embodiment of Laser or-and LED light which has geometric shape housing for outdoor or garden light. At least one of Laser light source (3-3a) has circuitry (3-3b) to make the single color or more than one color of LED light beam to emit out from top or front housing. The current preferred embodiment has preferred choice of ground stake or bracket or pole as FIG. 1A shown can clip this cylinder tube housing on frame, bracket, pole bracket with adjust angle kits.

As shown in FIG. 8 which disclosure the concept to apply the laser light for garden light. The garden project light has laser light source and its preferred laser optics-piece or-and other optics-piece to put into outdoor garden light which has ground stack/pole to insert into the garden ground with waterproof or water resistance or any environment grade quality for outdoor use.

As shown in FIG. 8 which disclosure the above discussed many embodiments and co-pending filed parent cases' concept to apply the laser light for garden light (4A). The laser garden light has laser light source (not shown) and its preferred laser optics-piece (4d) or-and another optics-piece such as grating-piece (4d) to put in front of the said laser-unit (not shown) of outdoor garden light (4A). The said laser garden or outdoor light has ground stack/pole (4e) to insert into the garden ground with waterproof or water resistance or any environment grade quality of housing construction for outdoor use.

The laser project garden light mainly to offer the laser light effects for building, house, home, walls, fence, garage door all wider areas with desired light effects. Which have to have a wider opening for the said Laser garden light that is same as the above listed (#ZZZ-3).

The current invention is a Division filing from the co-pending filing or parent filing cases as below attached drawing and details that from (#ZZZ-3) the Parent filing case U.S. Ser. No. 14/503,647 filed on Oct. 1, 2014.

That is CIP Filing of (#ZZZ-2013) Parent case U.S. Ser. No. 14/023,889 that is filed on Sep. 11 2013 show more details for wide areas projection by Laser(s) or by LED(s) or combination of the Laser(s) & LED(s).

From above discussed and illustration shown the wider opening for laser project garden light, project bulb, light string has laser project light unit(s) all same need a wider opening on the laser light emit ends so can allow Laser light beam widely spread out from the laser light beam output end(s).

Also, The current invention need to incorporated the laser optics-piece including but not limited such as grating piece or hologram piece, or-and to incorporate the other optics-piece including but not limited for convex-lens, diffusor-lens, random-diffusor lens, plurality different or variable thickness diffusor lens, reflective lens, refraction lens with single or multiple or plurality of different optics-focus. And the thickness in one piece as design or light effects required.

From above discussed on (#ZZZ-3) and illustration on the background shown many different optics-piece including the said cut-out, stencil, color filter, windows, opening, shaped windows or same functions or equivalent piece. The purpose is to create desired light effects and place top of the light source output end including laser light source or LED light source or another light source. These laser optic-pieces or any other optics-piece mainly to make simple laser or LED or incandescent bulb to get desired light effect has certain range and distance to see the lighted pattern.

Also From the (#ZZZ-3), The current invention is a division filing from the co-pending filing or parent filing cases as below attached drawing and details, which from (#ZZZ-3) the Parent filing case U.S. Ser. No. 14/503,647 filed on Oct. 1 2014 which is CIP Filing of (#ZZZ-2013) parent case U.S. Ser. No. 14/023,889 filed on Sep. 11 2013. That incorporate the moving device which including but not limited for motor, gear set, moving device, rotating device, spin device, movement or any moving kits to make the said optics-piece including laser optics-piece or other optics-piece or other cutout, plastic piece, injection piece, lens, film, slide, cutout, stencil, window, filter to moving to make the moving device. It also may incorporate with IC, timer, sensor, switch, controller, wireless controller, Bluetooth, WIFI, internet, wired or wireless communication sets, Zig-Bee, Z-wave communication or controller, power source, invertor, adaptor, transformer, USB power parts & accessories, solar module, rechargeable batteries, wind power source, chemical power source to turn on and turn off the said laser light device for pre-determined functions.

The said Laser garden light has at least one of color of laser light source. It may be two or three color or more color. And, the light-device has pre-determined turn-on and turn-off timing to create one or more color lighted spot, image, shape, matrix, array for any conventional laser image effects. Which may be a dot matrix, linear array, seasonal signs, characters, words . . . and it may get IC help to create flashing, chasing, random, Fade-in and Fade-out, pair flashing, dot-matrix, image matrix, image array with desired time period, duty, cycle, brightness, colors . . . etc.

While the light-device incorporate with moving device to create the changeable, variable, sequential laser beam light show has moving effects and changeable features. It may incorporate with other light source such as super strong brightness LED light source to create desired light effects, or to combine with laser light beam effects to form the alive image.

Those effects are one of moving aurora effects, galaxy, solar system, water wave, animation or all marketing available laser light show. All these features as above listed all the co-pending or co-inventor all filing case after the current filing case parent filing case (#XX-2010) including the (#TT-2010) (#ZZZ-3) (#QQQ-3) (#II) (#II-1) (#II-2) family including the each family parent and child filing case. All filed case including 2010 (#XX-2010) and following CIP or Division (#TT-2010) (#ZZZ-3) (#QQQ-3) (#II) (#M) (#II-2) family have all related technical, skill, method, design, concept, construction, functions, features, parts. It should be still considered within the current invention scope for the current invention for (a) Garden light (b) light string (c) laser Bulb (d) Laser Night Light application and each of the current invention claims had very clear limitations for each (a) (b) (c)(d) has certain parts and accessories as below claim content.

From FIG. 8 can see the garden light has 3 color laser light source including Red color, Green color, Blue color and has the simplest laser optic-piece on front with IC or-and motor/movement device to make the multiple colors laser light beams to come out continue changeable, variable, sequential changing light effects to project the lighted dots, Shape image, matrix, array, shapes, character, words to remote away distance to cover big and wide surface of building, house, ground, floor, fence, walls, surface, wall, residence to present desired words, image, message, geometric image on the said wide areas. The said garden light has ground stake or pole which can insert into garden ground or install on the garden floor and has the power source which may connect with 120 Volt AC or get power from the invertor/transformer/adaptor or from the garden available for low-voltage power source which for the conventional low-voltage garden light. It also powered by the solar power source, wind power source, chemical power source with its rechargeable energy storage device maybe are rechargeable batteries. From FIG. 4 also show the wireless controller for preferred embodiment to control the light functions, brightness, color, timer, on-off even can control the sound while the said Garden light incorporated with the sound device, speaker, Radio, Bluetooth speaker or WIFI speaker or other market available sound device.

The said garden light also can have metal base or bracket to hold or install the said garden light on other application. while the garden light housing redesign to make more than 180 wide opening like the said above discussed (#ZZZ-3) drawing. It can fit into Camping light device so can allow people to carry while go to Camping and still has the ground stake/pole to insert into the camping campus ground for 180 degree or wide angle areas has laser light show for night time celebration or party. The camping light may have Bluetooth speaker, USB port so can rechargeable inner rechargeable battery or batteries and same time it become a Power bank to charge mobile phone, iPad, iPhone while power ran out.

These application is CIP or Division for co-pending filing for
(#GGG-2011) U.S. Pat. No. 8,783,936,
(#GGG-1) U.S. Pat. No. 8,915,608,
(#GGG-2) U.S. Pat. No. 8,919,137,
(#GGG-3) U.S. Filing Ser. No. 14/189,062,
(#GGG-1C) Filing Ser. No. 14/548,561,
(#GGG-2C) Filing Ser. No. 14/548,620,
(#GGG-3C) Filing Ser. No. 14/643,026,
(#GGG-4) Filing Ser. No. 14/189,062,
(#GGG-4C) Filing Ser. No. 14/827,810,
(#GGG-5) Filing Ser. No. 14/839,935,
(#GGG-5-1) Filing Ser. No. 14/858,538,
(#GGG-6) Filing Ser. No. 14/834,557,
(#GGG-7) Filing Ser. No. 14/834,823,
(#GGG-8) Filing Ser. No. 14/834,613,
(#GGG-9) Filing Ser. No. 14/870,601,
(#GGG-10) Filing Ser. No. 14/951,872

This family has all details discussion for the USB charging port features and method to making same.

From FIG. 8 show the laser project garden light (4A) mainly to offer the laser light effects for building, house, home, walls, fence, garage door all wider areas with desired light effects. The laser light has to have a wider opening (4c) with protective-lens to protect inside parts of laser light device. This embodiment same as the parent filing case (#ZZZ-3) U.S. application Ser. No. 14/503,647 filed on Oct. 1 2014 now is U.S. Pat. No. 9,719,654. The current invention is a child filing from co-pending filing or parent filing cases as below attached drawing and details from (#ZZZ-2013) Parent case U.S. Ser. No. 14/023,889 filed on Sep. 11, 2013 show more details for Wide Areas projection by Laser(s) or by LED(s) or combination of the Laser(s) & LED(s).

Also, The laser-unit need to incorporated the laser optics-piece (4d) including but not limited grating piece (4d) or hologram piece, or-and to incorporate the other optics-piece including but not limited for convex-lens,
(ii) diffusor-lens,
(iii) random-diffusor lens,
(iv) plurality different or variable thickness diffusor lens,
(v) reflective lens,
(vi) refraction lens,
(vii) single or multiple or plurality of different optics-focus and thickness in one piece which same as above discussed and illustration of (#FF-2) or-and (#QQQ03) or-and (#ZZZ-3) show many different optics-piece which the said image-forming unit, also including the said
(viii) cut-out,
(ix) stencil,
(x) color filter,
(xi) windows,
(xii) opening,
(xiii) shaped windows or same functions or equivalent piece Those parts is to create desired light effects and place top or front of the light source output end including laser light source or LED light source or another light source.

These laser optic-piece (4d) or any other optics-piece mainly to create or make desire image or patterns for the simple laser or LED to get desired light effect shown on certain range and distance away from the light device to see the lighted pattern.

Also From the (#ZZZ-3) the current invention is a child filing from the co-pending filing or parent filing cases (#ZZZ-2013) Parent case U.S. Ser. No. 14/023,889 filed on Sep. 11, 2013. From FIGS. 30A to 30C (Same drawing of #ZZZ-2013 FIGS. 4A to 4C) show moving device (405-4A) (405"-4A) which including but not limited for motor (405-4A), gear set (405"-4A), moving device (405-4A), rotating device (405-4A), spin device (405-4A), movement (405-4A) or any moving kits (405"-4A) to make one of light source or image-forming-unit or optics-lens to rotate.

The said image-forming-unit is one of (i) FIG. 31A optics-piece (502-1), or (ii) FIG. 1A laser optics-piece or grating-piece (A-13), or (iii) FIGS. 33A,33B,33C other optics-piece (X-13) of movable disc, or (iv) other cutout (X-19), plastic piece (X-20), injection piece, lens, film, slide, cutout, stencil, window, filter.

To make moving at least one of the light source or image forming-unit or optics-lens can create expected moving lighted image or-and patterns effects.

From above discussed and illustration of co-pending and parent filed case shown the wider opening (4c) is a protective-lens for laser project garden light (4A), project-bulb, light string has laser project light units. All these applications is same and just need a wider opening (4c) in front of the optic-lens or grating-piece (4d) which is located in front on the laser light emit-ends (not shown) so can allow Laser light beam widely spread out from the optic-lens or grating-piece (4d) in front of the said laser light beam output-end(s).

Also, Laser garden light or night light need to incorporated the laser optics-piece including but not limited such as grating piece or hologram piece or-and to incorporate the other optics-piece. The other parts including but not limited for protect flat lens convex-lens, diffusor-lens, random-diffusor lens, plurality different or variable thickness diffusor lens, reflective lens, refraction lens with single or multiple or plurality of different optics-focus and thickness in one piece as design or light effects required.

From above discussed on (#ZZZ-3) and illustration show many different optics-piece which also including the said cut-out, stencil, color filter, windows, opening, shaped windows or same functions or equivalent piece which the purpose is to create desired light effects and place top of the light source output end including laser light source or LED light source or other light source.

It also may incorporate with IC, timer, sensor, switch, controller, wireless controller, Bluetooth, WIFI, internet, wired or wireless communication sets, ZigBee, Z-wave communication or controller, power source, invertor, adaptor, transformer, USB power parts & accessories, solar module, rechargeable batteries, wind power source, chemical power source to turn on and turn off the said laser light device for pre-determined functions. From FIG. 8, The light device incorporate at least one of parts select from; IC, timer, motion sensor (4h), photo sensor (4i), siren or sound device (4j), switch, controller, wireless controller (4m), Bluetooth (4m), wife, internet, wired or wireless (4m) controller, wireless communication sets, zee-way communication, or IR or RF controller, power source (4n), invertor (4n), adaptor (4n), transformer (4n), USB power parts & accessories, solar module, rechargeable batteries, wind power source, or chemical power source. The parts and circuitry turn on and turn off the said laser light device for pre-determined functions.

The said Laser Garden light has at least one color laser light source. The colors are the two, or three, or more colors. And, It has pre-determined turn-on and turn-off timing to create one or more color lighted spot, image, shape, matrix, array for any conventional laser image effects. The effect is one of a dot matrix, linear array, seasonal signs, characters, words . . . and it may get IC help to create flashing, chasing, random, Fade-in and Fade-out, pair flashing, dot-matrix, image matrix, image array with desired time period, duty, cycle, brightness, colors . . . etc.

The said Laser Garden light (4A) has at least one or more than one color laser light source to get blue-color laser-light-beam (4e), red-color laser-light-beam, (4f), green-color laser-light-beam (4g). Laser light may have two or three color or more color and has pre-determined turn-on and turn-off timing to create one or more color lighted spot, image, shape, matrix, array which available at conventional laser image effects. The laser light effects can be one of dot matrix, linear array, seasonal signs, characters, words. The said LED or-and laser light have following desired one or combination of flashing, chasing, random, fade-in and fade-out, pair flashing, dot-matrix, image matrix, image array with desired time period, duty, cycle, brightness, colors while incorporate with IC chip and related circuitry.

While incorporate with moving or IC device can create the changeable, variable, laser beam light show and moving effects and changeable features.

From FIG. 8 the said Laser garden light also can incorporate with other light source such as super strong LED light source to create the light effects to combine with laser light beam effects. Same as FIGS. 33A, 33B, 33C, The light device has built-in laser light source (x1)(x8) and LEDs (x4)(x10). The said 2 different light source(s) light and desired image forming-unit (x2) (x5) (x11)(x19) can create desired light effects including (i) alive image, or (ii) moving aurora, or (iii) splendid galaxy, or (iv) solar system, or (v) water-wave, or (vi) animation. These effects is same as features as above discussed co-pending or co-inventor all filing case BEFORE the current parent filed case (#XX-2010) including the (#TT-2010) (#ZZZ-3) (#QQQ-3) (#II-2009) (#M) (#II-2) family including each family parent and child filing case.

From FIGS. 10A, 10B, 10C, 10D, 10E, 10F, 10G show the Laser project bulb for different construction. The inner parts & accessories for laser light source, laser optic-piece (grating or hologram or other laser piece), with or without motor is similar with the above discuss for FIG. 8 or the said all parent filing case and its CIP or Division co-pending cases.

The Current from FIGS. 10A, 10B, 10C, 10D, 10E, 10F, 10G mainly to show more optic-piece including:
cutout, stencil, window (clearly see though but not opening), filter, color filter, opening, plastic piece, reflective lens, refraction lens, convex lens, diffusor lens, variable thickness lens, plurality of focus lens, texture lens or all kind of plastic piece, film, injection piece, lens to increase the laser or-and LED project light performance, effects.

From FIGS. 10A, 10B, 10C, 10D, 10E, 10F, 10G show the all different lens and light top opening design. Laser light have to big and wide opening so allow all the laser beams can emit to all directions as many as possible. The preferred embodiment is 180 degree or can design for over 180 degrees up to 270 or smaller degrees depend on market requirement.

From FIGS. 10A, 10B, 10C, 10D, 10E, 10F, 10G also show the Laser project has above discussed preferred parts and accessories inside the housing with the bub-base which can be any type of market available type for different bulb-holder for different shape/size bulb shape for different lighting fixture used. Furthermore, the current invention show the variety preferred more than 1 optics-lens, optics-piece, optics-cover to add top of the said inner laser light parts & accessories to create more eye-catching light performance.

Figure 10B:
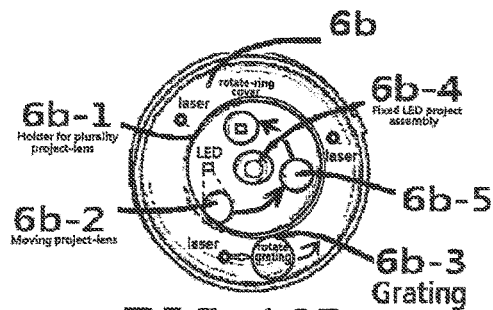
Figure 10C:
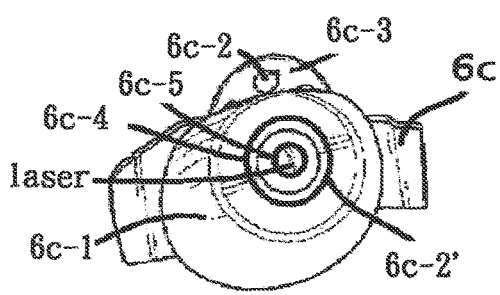
Figure 10D:
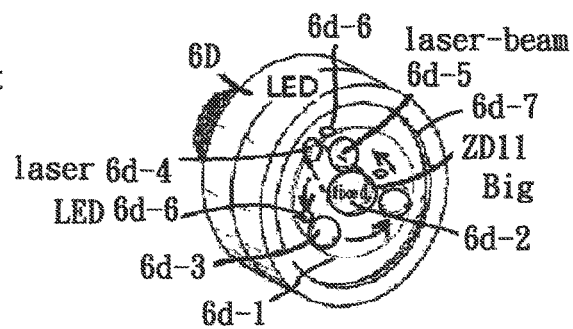
Figure 10E:
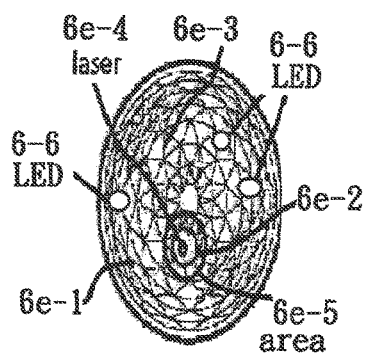
Figure 10F:
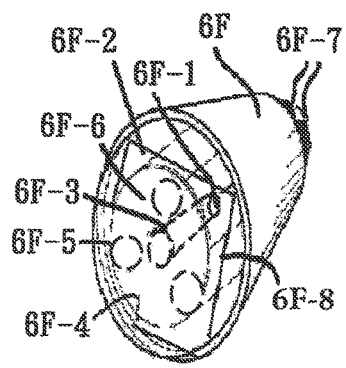

Such as FIG. 10D just has windows, FIG. 10E has the plurality of reflective properties lens. FIG. 10F has plurality of round diffusor lens into one-piece optic-cover to make inner laser light beam to become aurora effects. Some other laser light is passing though from clear window which has no plurality of round diffusor lens so it only passes through inner laser-optic piece such as grating piece so can get plurality of lighted spots or matrix or array look like planets for different colors so can make like galaxy look-like effects.

Figure 10G:
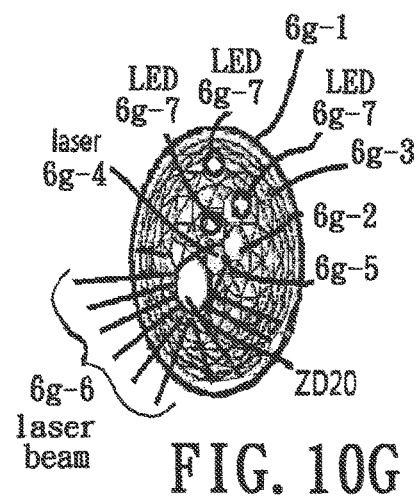

The FIG. 10G show the optics lens install on moving disc so can make the lighted image to moving for certain degree arc or circles on surface . . . . It maybe many tubes and limited optic-lens which has more details description and skill on co-pending filing (#QQQ-3) US filing Series Ser. No. 14/983,993 filed on Dec. 30 2015.

From FIG. 10A, show the movable or tilt able LED project Bulb which can move the top level for projector away from top block means which may desk lamp top metal frame or shade frame/support so the laser or LED projector Bulb can overcome the block metal frame, metal shade support for desk lamp.

From FIG. 10B is LED bulb for recess light or ceiling installation which is not like for Desk lamp has block metal frame or metal shade support, so no need tilt or movable along the axis to let project light beam do not block by the metal frame of metal shade support of desk lamp.

From FIG. 10C show the project Bulb which has changeable slide, laser film, grating film, hologram film or other optics piece or slide, film, display piece on the roller which can use manual or automatically change so can different light effects.

From FIGS. 10D, 10E, 10F, 10G show all has wide opening on front of laser project bulb because need to have Bigger and wider opening so can allow all laser light beam spread out to wider areas.

From FIGS. 10A, 10B, 10C show the LED project Bulb or garden light which the top of the Bulb or garden light has Lens-size opening normally is as smaller as possible. Because it will affect the cost for the inner image-display/film/slide and inner other optic-lens such as convex lens or concave lens if had any and inner tube diameter and size. So LED project bulb top lens is as smaller as possible so can make low cost unit. So Laser and LED project bulb has major different construction but the current invention all is CIP or DIV for (#XX-10) filing and has more details can see from above listed co-pending parent filings cases.

From FIGS. 10H, 10I, 10J, 10K, 10L, 10M, 10N show the housing shape with bulb-base to allow all Laser or LED project bulb fit into relatively Bulb-holder. The bulb shape for laser bulb need as big & wide as possible to allow all laser beam emit out. The LED project bulb top end only need have magnified lens size so it is smaller as possible to save cost. The regular LED bulb or other light source for illumination purpose those no need any opening because it glows for all direction as radiation light source. Not like Laser light source belong to point light source so need laser optic-piece or other optic-piece to help to get the laser or LED narrow light beams to spread out to have desired light performance and effects.

From FIGS. 10A, 10B, 10C, 10D, 10E, 10G and FIGS. 10A-1, 10B-1, 10C-1, 10D-1, 10E-1, 10G-1 show the Laser project light while has different housing construction and design can become the project bulb or garden light or night light for different construction.

The inner parts & accessories for laser light source, laser optic-piece (grating or hologram or other laser piece), with or without motor is similar with the above discuss for FIG. 4 or the said all parent filing case and its CIP or Division co-pending cases.

From FIG. 10A to FIG. 10G show more image forming units including but not limited including following parts, cutout, stencil, window (clearly see though but not opening), filter, color filter, opening, plastic piece, reflective lens, refraction lens, convex lens, diffusor lens, variable thickness lens, plurality of focus lens, texture lens, or all kind of plastic piece, film, injection piece, lens. Those can increase the laser or-and LED project light performance, effects.

From FIG. 10A to FIG. 10G show the all different lens and light top opening design. Laser light has big and wide opening so allow all the laser beams can emit to all directions as many as possible. The preferred embodiment is 180 degree or can design for over 180 degrees up to 270 or smaller degrees that depend on market requirement.

From FIG. 10A to FIG. 10G show the Laser project has above discussed preferred parts and accessories inside the housing with the bulb-base or AC plug-wire, or prong; while incorporate with bulb-base which can be any type of market available type for different bulb-holder for different shape/size bulb shape for different lighting fixture used.

Furthermore, the current invention show the variety preferred more than 1 optics-lens, optics-piece, optics-cover to add top of the said inner laser light parts & accessories to create more eye-catching light performance.

From FIGS. 10A, 10B show the preferred laser project outdoor or indoor light (6A) (6B) only has one color laser unit (laser) inside of housing (6a-1) (6B-1) which has grating-piece (6a-2) (6B-2) in front of laser unit (laser) and split the big wattage laser-beam to plurality of the low-wattage laser-beam emit from the front protective-lens (6a-3) (6B-3) to wider areas.

From FIG. 10C show the laser project garden or indoor light (6C) has housing (6c-1) with plurality of grating-piece (6c-2) install on the said disc (6c-3) and may incorporate with motor or rotating device (not shown) to rotate or move by manual or automatically.

The said plurality of the grating-piece (6c-2) in front of laser-unit (laser) to split the high-wattage laser-light-beam forming the contour or image of laser lighted patterns or-and image to pass through the front protective lens (6c-4) to wider areas.

The same construction is shown on parent filing case shown on the (#FF) and (#II family of FIG. 16) shown the movable or rotating disc (78) to load plurality of image-forming-units or optics-lens (79). Or, same as the (#QQQ-3) rotating disc which load reflective or-and refractive optics-lens.

The said movable or rotatable grating-piece (6c-2) to allow lower laser-unit laser-light-beam passing through to split and form the said desired lighted patterns or-and image to pass through the top of housing (6c-1) protective lens (6c-4).

From FIG. 10D show the wider opening (6d-1) which is at least 180 degree opening (6d-1) which has at least one or more than one of the lens design (6d-2) (6d-3). At least one area (6d-2) is for the laser light source (6d-4) that just a protective-lens (6d-2) which has no optics-properties and just let plurality of laser-light-beam to go through, and other area is optics-lens (6d-3) which is design for inner LED light source(s) (6d-6) that has the optic-properties including;
(i) reflective, or-and
(ii) refractive, or-and
(iii) diffusion, or-and
(iv) retro-reflective or-and refractive properties, or-and
(v) other optics properties lens,
so the LED light beams may go through inner
(aa) $1^{st}$ image forming unit, or
(bb) $1^{st}$ treated optic-lens or texture-lens Then go through the top reflective or refractive optics-lens (6d-3) to enlarge to make wider spread out the pre-determined lighted patterns or-and image. Such as FIG. 10D just has windows (6d-2) to allow plurality of laser light beam to emit through, From FIG. 10E, the laser garden light (6E) has optics-properties lens which is a prism-lens (6e-1) which has window area (6-5) top of the inner grating-piece (6e-2) to allow the plurality low-voltage laser-light-beam to emit out. The rest of area is prism-lens which has treated and has many teeth-like tringle polished surface (s) to make the inner LED light source (6-6) light-beam to make multiple-times reflected or-and refractive to make plurality of lighted patterns or-and image. The lighted patterns or-and image that is similar with the FIG. 33B) prism-lens (x11) show the LED light beam emit out from LED (x10) and emit to the $1^{st}$ optic-lens (x11) and emit to $2^{nd}$ optic-lens (x15) to spread out the LED light-beam. The both $1^{st}$ and $2^{nd}$ optics-lens (x-11) (x-15) has the desired reflective or-and refractive properties so make the LED light-beam emit out from $2^{nd}$ optics-lens (x15) and make the LED light beam direction to make deviation or-and change angles. This is evidence for LED or-and laser light-beam to passing though the $1^{st}$ and $2^{nd}$ optics-lens (x11) (x15) those has pre-determined optics-properties of each one for laser or LED light-beam.

From FIG. 10G, The laser outdoor or garden (6G) has wide opening optic-lens (6g-1) which has construction for plurality of variable thickness round diffusor lens (6g-3) into one piece optics-lens (6g-1) here as the optic-cover (6g-1) has one window or area (6g-2) which is a protective-lens to protect inner grating-piece and laser light source (6g-4) and parts. The rest area (6g-3) of the optics-lens (6g-1) is diffusion optics-lens for inner LED(s) (6g-7) light-beam to pass the inner image-from unit(s). This is same as FIG. 36A (81) or FIG. 36B(90)(92) or FIG. 36D(110) (113) or FIG. 36E (120)(121) or FIG. 36F(136).

Then light-beam emit out from $1^{st}$ optics-lens and emit to the top or front $2^{nd}$ optic-lens (6g-3) which has reflective or-and refractive properties to enlarge and change LED light-beams direction to wide spread-out to desired location or surface.

The wide opening optics-lens (6g-1) has one window (6g-2) which is protective-lens to protect inner laser-unit (6g-4) and other parts and allow the plurality of low-wattage laser light-beam effects and incorporate with LED light effects to create galaxy or-and aurora effects. And light device have some laser light-beam passing through from clear window (6g-2) which has no plurality of diffusor lens so it only pass though inner laser-optic piece such as grating piece so can get plurality of lighted spots or matrix or array look like planets for different colors so can make like galaxy look-like effects.

From FIG. 10G show the Laser outdoor or garden light (6F) has wider opening optics lens (6F-1) which is clear sphere or ball shape and inner has laser or-and LED light source (6F-1), image forming unit (6F-2) or $1^{st}$ optics-lens (6F-2). There have plurality of $2^{nd}$ optics-lens (6F-5) or grating-lens (6F-5) install on moving disc (6F-4) so can make the lighted image or-and patterns to moving for certain degree arc or circles on surface same as Fig (parent filing #QQQ-3 drawing). While the light-source(s) incorporate with different diameter or size tubes with texture-lens or-and 2nd optic-lens including image-forming-unit to create the steady or-and moving image(s) emit from one of the laser or-and LED outdoor or garden or night light or bulb. The more details description and skill show on co-pending filing (#QQQ-3) U.S. Ser. No. 14/983,993 filed on Dec. 30, 2015 and difference only at the different conductive-piece for current invention is AC-plug wire or outside transformer, the parent filed case is a bulb-base or prong for alternative or equal function or replaceable conductive-piece.

While the connector kit changed from prong or AC plug-wire to bulb-base. The above discussed Laser or-and LED light can change to Laser or-and ED project Bulb. The above discussed or listed preferred embodiments can instantly change to project bulb, project garden light, or outdoor light as below details description. It is appreciated that any replaceable or equal function or alternative to use different conductive-piece still fall within the current invention scope and claims because all these prong, AC plug-wire, bulb-base, USB wire & ports, quickly connector all same purpose to CONNECT POWER SOURCE.

Alternative, From FIG. 10A show the movable or tilt-able LED project-bulb which can move the top level for projector away from top block-unit which may desk lamp top metal frame or shade frame/support so the laser or LED projector Bulb can overcome the block metal frame, metal shade support for desk lamp.

Alternative, From FIG. 10B is LED project-bulb for recess light or ceiling installation which also can apply for Desk lamp with or without block metal frame or metal shade support, so no need tilt or movable along the axis to let project light beam do not block by the metal frame of metal shade support of desk lamp.

Alternative From FIG. 10C show the project Bulb which has changeable slide, laser film, grating film, hologram film or other optics piece or slide, film, display piece on the roller which can use manual or automatically change so can different light effects.

Alternative From FIGS. 10D, 10E, 10G,10G show all has wide opening on front of laser project bulb because need to have Bigger and wider opening so can allow all laser light beam spread out to wider areas.

From FIGS. 10A, 10B, 10C show the LED project Bulb which the top of the Bulb has refractive lens-size opening normally is as smaller as possible because it will affect the cost for the inner image-display/film/slide and inner other optic-lens such as convex lens if had any and inner tube diameter and size. The LED project bulb top lens is as smaller as possible so can make low cost unit. The said Laser and LED project bulb has major different construction but the current invention all is CIP or DIV for above list parent filing and has more details can see from above listed co-pending parent filings cases.

From FIG. 10A-1 to FIG. 10G-1 show some preferred current invention housing shape has different laser or-and LED light performance or effects as above discussed for outdoor garden light details. The said light device incorporate different conductive connector which one of bulb-base or AC plug-wire or outside transformer to allow all Laser or LED project bulb or light-device for indoor or outdoor application with pre-determined light performance.

The bulb shape for project-bulb need as big & wide top opening lens as possible to allow all laser beam emit out. The LED project bulb top opening-lens only need have little-bigger than refractive-lens size which is as smaller as possible to save cost.

The regular LED bulb without project function and only for illumination purpose no need any opening because it glow for as wider as possible direction as radiation light source. Not like Laser or-and LED project light belong to point light source so need laser optic-piece or other optic-piece to help to get the laser or LED narrow light beams to spread out to have desired light performance and effects.

From FIGS. 10D, 10E, 10F, 10G, The current invention use the similar construction or concept of all parent filed cases has wide opening and desired optics-lens to create desired laser project-Bulb. The project-bulb has inner at least one or more of the same or different colors laser light source and its related laser-optics piece or piece(s) with or without added other optics-piece to get desired steady or movable or changeable or variable lighted image, message, dots, shape image, contour shape, array, matrix light effects.

The laser or LED project-bulb for the preferred light string has;
(1) it may not need bulb-base because the desired laser or LED project light string already has built-in laser or-and LED project Bulb by proper injection process, or
(2) it has female bulb-socket of the said light string so people can replace the laser LED project bulbs.

From FIG. 9A show how to apply the FIG. 10D, 10E, 10F, 10G laser project bulb and FIG. 10A, 10B, 10C laser project bulb to apply the said market all kind of light string same as co-pending (#TT-10).

The co-pending case
(#TT-10=Laser or-and LED for all light device has project functions), and
(#ZZZ-3=Laser or LED for wide areas projection), and
(#II-09=Light string with project function), and
(#II-1=Light string with project function)(#II-2=light string with project function), and
(#QQQ-1=LED bulb has project functions), and
(#XX-10=Laser project light for all kind of lighting)
also show the variety power source and linkable functions show as below drawing. This is one of the examples for these power sources and one of the linkable examples. It is appreciated all kind of market available power source and linkable skill still fall within the parent and current filing cases that including but not limited for any AC or DC or solar power source(s) and linkable by quickly connector, plug, receiving ends and insert ends and all market available parts & kits.

The current invention to add the laser project Bulb with desired construction into the market available all kind of light string for everyday use for patio, backyard, BBQ areas for nighttime activities or Camping campus use.

The current invention uses the similar of FIG. 10D, 10E, 10F, 10G wide opening laser project Bulb that has inner at least one or more of the same color or different colors laser light source. And its related laser-optics piece or piece(s) with or without added other optics-piece to get desired steady or movable or changeable or variable lighted image, message, dots, shape image, contour shape, array, matrix light effects.

The laser or LED project Bulb or light-device or light-string it may not need bulb-base. And the laser project light or LED project light can be installed within the molded base by preferable parts for the said molded light string or has the bulb-base to let the said light string can replace the illumination bulbs (incandescent bulb or LED bulb) and-or laser project Bulb and-or LED project bulbs.

Because laser or-and LED project Blub or light is very costly so current invention preferred just use limited number of the Laser or-and LED project bulb or light for the existing illumination purpose light string including every day or seasonal light string. For example, 10 light string maybe only add 2 for laser or-and LED project bulb or light, so the cost is not dramatically too high. However, some application has very long light string in one piece such as 36 feet or 48 feet which can have more unit such as every 6 feet has one Laser or-and LED project Bulb or light unit on the whole light string. Some short items have big space between each illumination bulbs so can have whole string with laser or-and LED project bulb. The number of laser or LED project bulb or light depend on market requirement, While the everyday light string or seasonal light string has limited number or whole light string has all laser or-and LED project bulbs or units can make a big light performance than the current only illumination purpose for these light string. Furthermore, if add the laser project bulb(s) or unit(s) on the light string. The wide area will be lighted by the eye-catching, splendid, colorful, changeable, variable of lighted spots, image, shaped image, words, message to increase accent and decoration the backyard, garden, patio, BBQ areas or other areas, space people have night time or dark environment activities.

So the current invention for the FIG. 9A show the very exciting light strings for everyday light string. And it have incandescent or LED light source or other light source to offer illumination, but also has laser light beam light effects or-and LED project light effects is the big improvement than single offer illumination singles one functions light string for more value.

From the CIP or Division filing after the parent (#XX-2010) and its Child filing (#XX-1) US Filing Series Ser. No. 14/844,314 filed on Sep. 3, 2015 and parent filed case (XX-2010) US filing Ser. No. 12/938,564 filed on Nov. 3 2010 now is U.S. Pat. No. 9,239,513.

See FIGS. 5, 6A to 6E, 7A to 7F, 8 and earlier all co-pending filed cases including:
(#TT-10=Laser or-and LED for all light device has project functions),
(#II-09=Light string with project function),
(#II-1=Light string with project function),
(#II-2=light string with project function).
And later filed cases but still co-pending cases including:
(#QQQ-4&3&2&1&2012=LED bulb has project functions),
(#ZZZ-3 & 4,2,1,2013=Laser or LED for wide areas projection)
have details discussion the said how to connect the project light or project Bulb by the clipper, holder, hook, frame, snake hose, flex-n-hold, bar, fix device, connector, snap kits. Those kits to hold, fix, position the said laser or-LED bulb or light-unit on the light string, and can position the direction for the laser or LED light beams to emit to desired areas and direction.

The said Laser or-and LED bulb or light-unit for the market available all kind of light string with positional kits help to let laser or-LED project light can emit to desired wide or near-by areas is the $3^{rd}$ application for current invention. As above illustration or some examples show but not limited for all above listed co-pending case and All other case(s) filed after (#XX-10) filed on Nov. 3 2010 those concept, idea, construction, features should be fall within the current invention scope. And, those parent or child filed cases spirit should be fall within the current invention spirit and claims cover range for laser project light for (a) Garden light (b) Laser project Bulb or light unit (c) Laser project bulb or light unit for all kind of light string (d) laser project for Night light application for indoor and outdoor use.

Below is co-pending filing (#QQQ-5) Detail description should still fall within the current invention claims:

From the above background and drawing discussion, the current invention for

LED night light as FIG. 5, 6A, 6B, 6C, 6D, 6E, 7A, 7B,7C, 7D, 7E, 20A, 21, 22, 23,24,25, 26A, 26B, 26C, 27, 28, 29D, 29G, 30A, 30B, 30C, 31A, 31B, 31C, 32, or LED Bulb as FIG. 1E, 20B, 21, 22, 23,24,25, 26A, 26B, 26C, 27, 28, 29A, 29B, 29C, 29F, 30A, 30B, 30C, 31A, 31B, 31C, 32, or LED outdoor garden light as FIGS. 31A, 31B, 31C, 32, and FIG. 1A, 1B, 1C, 1D, 2, 3A, 3B, 3C, 3D, 4, 8, 10A, 10B, 10C, 10D, 10E, 10F, 10G, 10H, 10I, 10J, 10K, 10L, 10M, 10N, 100, 21, 22, 23, 24, 25, 26A, 26B, 26C, 27, 28, 29E, 30A, 30B, 30C, or LED and/or laser light-string as FIGS. 9A, 9B, 21, 22, 23, 24, 25, 26A, 26B, 26C, 27, 28, 30A, 30B, 30C, 31A, 31B, 31C, 32, can present a continue moving at least one or plurality of big projection image to move within certain degree from appear to dis-appear for angle or-and present multiple big project image on the surface at the same time.

The current invention and co-pending filing cases already made a big improvement than conventional market available all kind of LED night light or-and LED bulb or-and LED outdoor garden light or-and LED light string. The market items which only can offer near-by areas illumination not like the current invention not only has more than one levels, parts, accessories can change position by moveable-means. To make the inventor LED night light or-and LED Bulb or-and LED outdoor garden light or-and LED light string overcome all kind of block-means, but also create special light effect which may happen by the following situations but not limited to:
(a) Heat created by LED(s) or its circuit, electric components
(b) Light beam block means to affect or interfere light traveling
(c) Signal block means to affect or interfere all kind of electric signal transmitting
(d) Other block means to destroy the said LED desire functions, performance, effects But also, the current inventor's LED or-and laser night light, bulb, garden light can use for at least or more than one LED or-and laser light source for night light, bulb, garden light to offer near-by and far-away illumination or image or both. And the said night light or bulb or garden light have other features such as
(1) Multiple colors with changeable colors and moving effects
(2) Multiple functions select from market available any LED or-and laser light effects for indoor and outdoor lighting
(3) Multiple control device or system which select from market available control, sensor, switch, blue-tooth, wifi, internet, app software, remote, infra-red (IR) or RF or other electric or electronic related circuit or device(s)
(4) More than one movable-means
(5) Changeable geometric shape
(6) Changeable construction (7) moveable parts select from any group combination from bar, pole, spin, rotate, hinge, arms, joints, join, frame, connector, sections to make the levels, parts, accessories to be move away to desire location, positions.

These are the main features of the current invention.

The co-pending filing cases already made said LED or-and laser night light, Bulb, garden light, light string has more than one level(s) and has desire level(s) of parts or optics-lens or image-forming-device. These arrangement can change position, location, orientation to overcome any block-means or create special moving image effects to get the desire LED or-and laser functions by variety type of moveable-means.

Also, the current invention and all co-pending filing cases has light beam emit out from LED or-and laser light source [.] That have at least one of desire control kits selected from power failure, remote control, Infra-red controller, bluetooth with mobile phone, Wi-Fi, internet control, app software control, motion sensor to trigger light beam, or to offer illumination or image, or lighted patterns with moving or steady effects to area(s).

Also, the co-pending filing cases also has other (16) features as below listed:

Features 1: The LED project light-device or bulb is consisting of:
At least one LED(s) as light source of said LED project light-device or bulb which emit light beam to desire areas, locations with predetermined illumination, function, time period, performance.
The said LED project light-device or bulb has parts or accessories that select from
Optic piece, lens, adjustable focus kits, twisted kits, rotate kits, elastic contact end, more than one output light beam(s), rotating frame, bulb shade with arms for rotating/tile, more twist bulb base, support for shade, LED assembly, LED tubular piece, adjust piece, project piece, digital data display, LCoS display, LCD display, digital camera, data storage, data been projected by optics, sensor, switch, IC, circuit, extend piece, extractable piece, filter, stencil, cutout, painting, motion sensor, Remote control, blue tooth, and Internet wireless. These parts or accessories to make the said LED bulb emit the light beams, image, time, data, digital message, internet data(s) to desire near-by area(s) or remote-away distance area(s) for illumination.
The said LED bulb connect with power source by contact base in preferred construction and configuration and incorporate with electric parts & accessories to emit the light beam(s) to areas with adjustable angle cover preferred in x-y-z axis or any combination as required for preferred light performance, effects, functions.
The improvement including:
At one of the output light beam(s) from the said LED bulb can adjust direction to certain area(s), location(s), distance(s) while adjust above listed component(s) of said LED bulb.
The said base of LED bulb is mail insert means to fit into the female receiving means for desired construction.
The said LED Bulb at least has adjustable parts to make the said at least one of light beam can change position, direction, and orientation.

Features 2: The LED Bulb as above listed (Feature #1), the said elastic contact means which allow the said LED bulb can adjust the said at least one of the light beam can be position, location, direction to certain area(s) in x-y-z axis.

Features 3: The LED Bulb or garden light as above listed (Feature #1), the said extendable, extractable parts or kits can be extend away from the said LED Bulb[.] And, the said extendable and extractable parts has certain configuration and construction to allow install some electric parts & accessories, sensor, motion sensor, remote control, heat sensitive kits within so overcome heat, light's shade, light's lens, light's curtain, light's glass, light's cover, cavity's depth, or any other block means.

Features 4: The LED Bulb or garden light as above listed (Feature #1), the said same light beam can incorporate with Optics elements, optics lens, optics lens assembly with parts & accessories to make the same light beam has different light performance.

Features 5: The LED Bulb or garden light as above listed (Feature #1), the focus adjust kits can make same light beam to present different light performance on the certain location, position, area for desire brightness, size, performance.

Features 6: The LED Bulb or garden light as above listed (Feature #1), the said Bulb or garden light housing frame, support or arms or bar or bendable tube which offer the project or light-device or Bulb can be twist, tilt, rotate, spin, adjust angle and also has hold means to overcome any heat issues to make the said change desired angle.

Features 7: The LED Bulb as above listed (Feature #1), the said Base of LED bulb can be in any construction including screw type, pins type, poles type, multiple poles type, twist type, bayonet type, conventional market type for current invention.

Features 8: The LED Bulb as above listed (Feature #1), the said More than one light beam output(s) which means the said LED bulb or garden light has more than one of the light beam(s) are emit to the location(s), area(s), position(s) which is remote-away from the said LED Bulb.

Features 9: The LED Bulb or garden light as above listed (Feature #1), the said LED assembly, LED tubular tray-assembly, Project assembly construction, parts & accessories which make the certain LED(s) light beam do not leakage out. And, the LED light-beam passing though the said optics element(s), optics lens, display unit, image, LCD display image, LCoS image, digital display, and emit out of said LED Bulb to get light beam or image to desire location, position, areas.

Features 10: The LED Bulb or garden light as above listed (Feature #1), the said sensor means, switch means, motion sensor means, remote control means, blue tooth means, photo sensor means or other market available electric parts & accessories incorporate the circuit means to make the said LED light source to emit light under predetermined light function, performance, effects.

Features 11: The LED Bulb or garden light as above listed (Feature #1), the said extend means, retractable means can install the select electric parts & accessories. It is also the LED light source depend on the LED bulb application including up or down or horizon arrangement.

Features 12: The LED Bulb or garden light as above listed (Feature #1), the said LED Bulb or garden light can illuminate the areas including any combination of areas(s) which are near-by area(s), far-away area(s) or together for both near-by and far-away area(s) effects.

Features 13:
The LED Bulb or garden light as above listed (Feature #1), the said LED bulb or garden light has more than one functions not only offer the illumination for near-by area or remote-away distance area(s) but also may incorporate with motion sensor, remote control, blue-tooth for other functions.

Features 14: The LED bulb or garden light consist of;

At least one LED bulb or garden light which has at least one LED(s) as light source to offer the illumination or image while the light source is connect with related circuit means, IC means, electric parts & accessories and related switch means, sensor means, remote control means, blue-tooth means or equivalent trigger means.

The said LED Bulb or garden light has extendable and retractable kits to install the electric parts & accessories, extra LED, sensor means, control means, RF receiving means, IR sensor means, or other equivalent control means to overcome the LED(s) heat, or surrounding block-means of lighting fixture shade, cover, glass, frame, support, ceiling, wood piece, metal piece, plastic pieces. And/or adjust distance of project-lens with image-forming-unit to change focus by manual or motor-gear-set.

The said extend and retractable kits can extend to certain distance to away from LED(s) heat or any block-means to allow the light beams or electric signal delivery direction without interfere by surrounding heat and block-means to let said LED bulb or garden light have pre-determined function(s), Performance(s), Effects(s).

Feature 15: The LED bulb consist of:

At least one LED bulb which has at least one LED(s) as light source to offer the illumination or image while the light source is connect with related circuit means, IC means, electric parts & accessories and related switch means, sensor means, remote control means, blue-tooth means or equivalent trigger means.

The said LED bulb supply the illumination or image to a remote-away areas(s) by angle, position, orientation, direction, focus adjust means while incorporated with optics means, optics lens, project assembly, LED(s) assembly.

The said LED bulb emit the light beam to desire area(s) in preferred combination of near-by illumination, far-away illumination, near-by image, far-away image, digital data image, movie image, internet digital data image, time display, motion picture image, colorful image.

Feature 16: The LED bulb consist of;

At least one LED bulb which has at least one LED(s) as light source to offer the illumination or image while the light source connects with related circuit means, IC means, electric parts & accessories and related switch means, sensor means, remote control means, blue-tooth means or equivalent trigger means.

The said LED Bulb has more than one of light beam emit out from the said LED bulb for illumination or image.

At least one of the LED light beam are triggered by control means which may select from group combinations from motion sensor, remote control, Infra-red sensor, Bluetooth means, power failure means & build in Direct current power storage means, sensor means, switch means, or other electric parts & accessories means.

The current invention has very details notes on each drawing so here do not discuss detail, please refer to attached drawing with brief description below:

FIGS. 11A to 11G, and FIGS. 12 to 18, and FIG. 19A to 19G, and FIGS. 20A and 20B, as above and following discussion.

FIGS. 11 to 20B all related to the One male bulb-base has more than one size of insert male base so can fit into more than one of female bulb-sockets. This had brief drawing show details discussion on above FIGS. 11 to 20B FIGS. 21 and 22 Disclosure the 1$^{st}$ embodiment of the said project assembly to project moving and changeable image main construction for LED night light or LED Bulb or garden light or light-string. The said light-device has LED light source(s) (01) (01'), image carrier(s) (02)(02'), project-lens(s) (03)(03') or project-lens assembly (01+02+F)(01'+02'+F) to form the big moving or rotating or changeable project image (not shown) on desired location and emit out from the said LED night light or LED bulb or garden light or light-string.

All the current invention or the co-pending applications of the said projection LED light still use the optic theory of the FIGS. 23, 24, 25. The only different is the current invention apply the project-assembly have the projection theory 3 major fixed, rotating, moving, replaceable, detachable in geometric-shape parts including LED light source(s) (01)(01'), image carrier(s)(02)(02'), project-lens(s)(03)(03') or inner project-lens assembly (01+02+F) ( ) (01'+02'+F) put on different location, or has different construction, arranged fit on tube or housing parts[.]

The said LED light-source incorporate with IC or desired circuit, and has motor/movement/spin/rotating device to make the said desired number of the said 3 major parts to change position, or The said LED light has track, groove, ditch to make the manual or automatic by motor-gear set to adjust the optic-lens to adjust the focus, or The said LED light has moving or adjustable parts to allow adjust the project image angle or other features listed or discussed inside of all co-inventor's earlier applications cases and above discussed for moving and adjustment kits.

From FIGS. 21 and 22 the said movement (05) which is super silent noisy device or motor-gear set (05') (05") which has axis (06) (06') has elongate length to install or passing-through the LEDs (01) its base circuit board which connect with the PCB (04'). And, the PCB (04' has the electric parts & accessories to control the LEDs to has desired function including chasing, random, pair flash, sequential, random flash, fade-in and fade-out or any LEDs light function available from market place.

The one of alternative arrange for LED light-device. The LEDs position with the optional top position-board (08) which has walls can fit with the preferred or optional other optic-lens[.] The said position board (08) with optional optics-lens main purpose is to make each LED's narrow LED light beam to become wider viewing angle LED light beam so can cover to the as wider as possible wider range light beam can emit to the said image carrier (02). So, while LED light-beam emit to image-carrier (02) can get shaped light beams because the light-beam to pass through the opening(s), printed window(s), cutout(s), films, slides on the said image carrier (02).

The shaped or tiny image light beam out from the said image carrier will emit to the said top project-lens (03)(03') or project-lens-assembly (01+02+F)( )(01'+02'+F) which can be a single project lens (03') or plurality of the optics-lens from into one assembly (01+02+F)( )(01'+02'+F). The project-lens (03)(03') or project-lens-assembly (01+02+F)( )(01'+02'+F) has at least one optic properties is the refraction the shaped or tiny-image light beam to wider viewing angle image has the desired brightness, color, image, shape, moving. The said big or wider viewing angle project-image (not shown) show on the certain distance away from (i) the said LED night light or LED Bulb or garden light or light-string, or from (ii) the light device has same or alternative project-assembly construction inside different outside housing[.] From FIG. 21, the Axis (06) of the movement (05) extend to top and passing-through or install (i) LEDs (01) and circuit board and (ii) top optional position board (08) with wall to install the one piece or plurality of optic-lens (09)[.] And all these parts including LEDs (01), circuit board, top position board (08), optics-lens (09) all is not rotating for this embodiment. Only the image-carrier (02) is moving, rotating, spin with the said movement (05) axis (06) and speed can be design as wish. Alternative arrangement for only optics-lens or optics-lens assembly rotating for other requirement is still fall within the current invention. The moving or fixed, rotating, moving, replaceable, detachable in geometric-shape image carrier (02) or optics-lens or optics-lens (03) (03') assembly (F) will allow the below LED(s) (01) light beam to pass through the different portion of the said image carrier (02) or optic-lens (03) (03') (F)[.]

And, the lighted shaped or tiny-image light beam come out from the fixed, rotating, moving, replaceable, detachable in geometric-shape openings, cutouts, film, slide, printed windows and the lighted shaped or tiny-image light beam to emit to the top plurality of optics-lens-assembly's (F) to form the big viewing angle project-image[.]

And, the said projected-image is emit out from more than 90 degree to 270 degree opening-top cover after go through the said inner project-lens (03)(03') or project-lens-assembly (F)[.]

So, the said LED and/or laser project light device can project a super big size of the project-image on the desired surface including ceiling, walls, floor, garden, fence, garage door, front entrance door to show out moving effects or the said shaped or tiny-image light beam out of the said image-carrier.

The said FIG. 22 shaped or tiny-image light beams while pass through the top plurality of optic-lens assembly (3') or plurality or single project-lens (03") which refracted the all shaped light beam to random directions. The said different shaped light patterns is formed by while the light-beam emit to the fixed, rotating, moving, replaceable, detachable in geometric-shape image carrier has shape openings or cutout or printed windows or film or slide. One of example of lighted image or patterns is one like the aurora effects with moving effects which are created by the moving image-carrier or optics-lens-assembly (03'). This is one of the applications and should not limited to for other or alternative or equal construction to make the image-carrier and/or optic-lens (03") or optics-lens-assembly (03') to be rotated, spin, moving.

From FIG. 22 is very similar with the FIG. 21 but the rotating or moving unit is the said top Project-lens (03") or project-lens-assembly (03') not the said Image carrier (02'). The different arrangement or rotating unit from the image carrier (02) to change to project-lens (03") or project-lens-assembly (03') will form the different light effects.

To rotating the project-lens (03") or project-lens-assembly (03') will get the shaped or tiny-image out for the image-carrier (02') to pass through the top each single optic-lens (03") of the multiple optic-lens assembly (03'), so can get one by one big-size projected image shown on the different location[.]

And, the plurality of big-size projected-image(s) look like continue image moving for certain degree such as FIGS. 31A, 31B, 31C, 32 shown 6 optics-lens assembly can get around 60 degree moving image.

This has details design description on the FIGS. 31A, 31B, 31C and FIG. 32. Same as FIG. 21, the FIG. 22 embodiment has the 3 major fixed or rotating or movable or replaceable piece of inner or outer having desired geometric-shape components for LEDs (01') and Image-carrier (02') and Project-lens-assembly (03') all fit along with the below motor (05') and motor gear set (05"). The motor has very faster rotate cycles per minutes (RPM) so need one gear set (05") to reduce to preferred RPM so people will not see too quickly rotating or moving project-image feel bad.

The LEDs (01') fit on the circuit board and LED(s) light beam emit through the optional position board (08') or other design frame, support, holder Or, one of alternative arrangement for the said LED light-device has the other optics-lens (09) to make the narrow LEDs light beam to become wider viewing angle LED light beam and pass though the said the top of the LEDs position board (08') has the image carrier (02') which same as the FIG. 21 The said fixed, rotating, moving, replaceable, detachable in geometric-shape image-carrier (02') has the preferred shaped openings, cutouts, stencils, film, slide, display-unit so can allow the LEDs light beam to pass and emit the said shaped or tiny-image light beam to the said each single project-lens (03") or each optic-lens (03") of lens-assembly (03') to form the image[.] Because the each single project-lens (03") or optics-lens assembly (03') is rotating so the shaped or tiny-image light beam will go though one by one of the single optics-lens (03") to form the image on different timing and angle so can form a continue same big project-image shown on the surface.

From FIG. 22, the said LED and/or laser light device rotate the said project-lens (03") or project-lens-assembly (03') which has number of the single optic-lens (03"), and while the lighted shaped or tiny-image light beam has sufficient wider angle so can pass through the one or many of the said the top single optic-lens (03")[.] The bigger-size projected-image show while the tiny-lighted-image fall within the first-edge of rotating-optics-lens and the bigger-size projected-image will disappear while the lighted-image fall out the second edge of the said rotating optics-lens[.]

Because optics-lens (03") or optic-lens-assembly (03') is rotating so the tiny-size lighted image will be emit from each rotating optics-lens (03") to travel for period of time, and the look like same image continue show up and moving from one circle side to other circle side. The moving direction can be clockwise or anti-clockwise which depend on the lower-position or behind-position motor or movement or spin device rotation direction. The number of the shape or opening or cutout or printed window or film or slide or the display-unit and its related LED number to form the lighted shape or tiny-image light beam also will get the number of big project-image.

More detail for the moving Project-lens (03") or project-lens-assembly (03') for lighting effects shown on the FIGS. 31A, 31B, 31C, 32 with more details.

From FIG. 26A and FIG. 33A are same drawing with different marking details and also show at the co-pending filing case alternative way to create a wider viewing angle project-image on the surface. This embodiment use more than one fixed or rotating or movable or replaceable piece of inner or outer inner and/or top-cover optic-lens(s) those at least one piece is refractive or reflective or both lens as FIG. 26B (3g) is at least one of prism optics-lens. The said inner or outer-cover optics-lens of geometric-shape is design to make the LEDs light beams to pass though the $1^{st}$ lens to get narrow LEDs light beam to become many of refraction or reflection or both light beams[.] And, the said many refraction or reflection or both light beams out of the $1^{st}$ inner-lens and go through the inner and/or outside $2^{nd}$ or more optics-lens to make the wider viewing angle project-images or project-light-beam as FIG. 26A (4) (5) (6) (7) (8). The said the $1^{st}$ or $2^{nd}$ or more inner and/or outer-cover optics lens may also have texture which can be a wave or desired type, and the LEDs can be more than one of Blue-light or Green-light or white-light LEDs with IC controller to make the said LEDs color changing on desired time period. The said light device incorporate IC and incorporate with desired functions, speed, brightness may select but not limited for fade-in and fade-out, chasing, pair-flashing, random, automatically changing function, freeze function, sequential or other market available LED light functions still fall within the current invention's scope.

The FIG. 26A is same as FIG. 33A both different for marking and details, the blue, blue, blue color 3 LED light beam emit to the at least one of fixed, rotating, moving, replaceable, detachable in geometric-shape inner or outer-cover or both wave (3c) or texture (3) optical lens which has received LEDs light beam[.] And, the said LED light-beam go through the wave or texture inner optics-lens(s) or outer-cover has refractive or reflective or both optics-properties such as at least one of prism-lens as FIG. 26B (3g) or other optic lens so came out many of the light beam[.]

and, the light-beam emit out from $1^{st}$ inner optics-lens pass though the $2^{nd}$ or more optics-lens then can come out a lot of wave shaped blue, green, white project image.

While the blue, green white LEDs are turn on and turn off on different time and stay for period of time, and from $1^{st}$ Blue→$2^{nd}$ Blue→$3^{rd}$ blue with preferred fade-in and fade-out and sequential flashing[.]

and LEDs arrangement with 1→2→3 back-and-forth repeatedly operation, then, The light-device can create the moving water wave effects so this is use non-motor device to make a big viewing angle moving project-image is the one of the current and co-invention application features and should be fall within the current invention for moving project-image scope.

From FIG. 26B is same as FIG. 33B both different for marking and details, and FIG. 27, From The FIG. 26B show the outside shape and FIG. 27 show the details construction how to make the moving project-image like the said Aurora as the said preferred embodiment of FIG. 21.

The said FIG. 26B is same as FIG. 33B both different for marking and details, from FIG. 26B has the top wide angle around 180 degree opening for project-lens or outer-cover (3e). The said fixed or rotating or movable or replaceable piece of inner or outer project or outer-cover optics-lens or inner-optics-lens which are formed by plurality of small optic-lens and each small optic-lens has its focus and thickness and curvature of the lens so can make the different reflective, refractive light effects.

The said inner construction as the above discussed FIG. 21 or from FIG. 27, the fixed, rotating, moving, replaceable, detachable in geometric-shape main 3 components for project-assembly are LEDs (w8), image-carrier (w4), project-lens-assembly (w7) as above discussion.

The current invention and all the FIGS. 26A, 26B, 26C, 27, 28 has prongs or AC-plug-wire to become a big viewing angle projection night time use light or outdoor garden-light.

while the same construction of the major 3 components of projection-assembly fit into the Bulb shape housing with bulb-base can instantly become the LED Bulb has the moving project-image LED bulb.

The power source come from AC outlet supply the different housing light-device and the current is from the (i) bulb-base power source or (ii) just through the different conductive prong or (iii) AC-plug-wire or (iv) AC conductive bulb base. So all the current invention coverage for LED plug-in night light or the outdoor garden project light with AC-plug-wire or LED bulb with conductive bulb base; for all kind specification and different housing for different light application(s) should be still fall within the current invention. So all the preferred embodiment has prong is equal has the bulb base. The housing can be any geometric shape.

From FIGS. 26C, 28, the FIG. 26C is same as FIG. 33C both different for marking and details. The FIG. 26C is outside shape and details construction show the other alternative way to get the moving project-image for LED night light or outdoor garden-light or light-string or the LED bulb.

Again, this is same as co-pending filing case (#ZZZ-3) U.S. application Ser. No. 14/503,647 now is U.S. Pat. No. 9,719,654 issued date Aug. 1 2017.

From FIG. 28 apply the same 3 major fixed or rotating or movable or replaceable piece of inner or outer components LEDs (201"), image-carrier (202"), and Project-lens assembly (203") to form the big viewing angle project-image. The said moving or changing project-image made by electric magnetic force to pull or push the vibration, shaking, swing, waving, moving part (202B), arm (202B), pole (202B), craft (202B), axis (202B), bar (202B), pole (202B) which connect with magnetic unit (202A). The said magnetic unit (202A) which will be affect or reaction to the said magnetic-coil device (202E) while the different current passing through the said magnetic-coil (202E) to create magnetic field and force to pull or push the magnetic-unit (202A) for close or pull away.

So the magnetic-unit will bring the attached, connected, joint-together said moving part (202B), arms (202B), pole (202B), craft (202B), axis (202B), bar (202B), pole (202B) to be waving, shaking, swing, moving to make the $1^{st}$ optic lens or image-carrier (202") has texture or without texture to be change position to make the said desired light effects.

The said moving parts (202B) is attached on the $1^{st}$ optic-lens or image carrier (202") two sides pole (202C) while the moving parts (202B) is moving and the two sides pole (202C) sit on the two side frame (202D) will be also change position.

So, make the said 1$^{st}$ optic-lens or image-carrier (202") moving so make the image carrier 1$^{st}$ optics-lens to emit the different light beam to the top project-lens and form the big viewing angle project image on the desired floor, ceiling or walls but not shown on the wall where has the outlet or surface has the bulb base.

From FIG. 27 show the alternative construction for the FIG. 26B which has different base (W) and top 2$^{nd}$ optics-lens act as top cover (W7) and both assembly with middle housing frame (W6) together. The said at least one of rotating 1$^{st}$ optics-lens or image-forming-piece (W4) with desired geometric-shape (W4), or flat piece (W4-1) act as rotating image-forming unit to create the movable and changeable 1$^{st}$ image while the lower position LED (W3) emit light beam to the rotating 1$^{st}$ optics-lens (W4) or slide (W4) or film (W4) or printed-piece (W4) or painting-piece (W4). The light beam came out from rotating 1$^{st}$ optics-lens (W4) emit to the top 2$^{nd}$ optic-lens as top-cover (W7) which is refractive or-and diffusion or-and reflective optics-properties to create the splendid light effects. The said rotating 1$^{st}$ optic-lens which is connect with the lower movement device (W1) which may is a motor or movement or other rotate unit (W1) with axis (W2) to fix the rotating 1$^{st}$ optic-lens and assembled the rest of the parts by frame or holder (W8).

From FIG. 28 show the one of alternative or replaceable or equal function arrangement to make moving function by electric magnetic-force to pull-or-push the (i) optic-lens (203"), or-and (ii) image-forming unit, display unit (202"), or-and (iv) LED (201") to make vibration, shaking, swing, waving. The said 3 basic-parts of project-assembly may incorporate with related-parts selected from moving part (202B), arm (202B), pole (202B), craft (202B), axis (202B), bar (202B), pole (202B). Those parts connect with magnetic unit (202A) which will be affect or reaction to the said magnetic-coil device (202E), while the different current passing through the said magnetic-coil (202E) to create magnetic-field and force to pull-or-push the magnetic-unit (202A). The said magnetic-unit (202A) which may connect with LED (201") or-and image forming unit(s) (202") or optics lens (203") for close-or pull-away to make the 3 major components to make moving in x or-and y or-and Z-axis for 3 dimensional movement to make desired functions.

From FIG. 28, The current invention is one of the embodiment but not limited for all the magnetic-unit will make the attached or connected or joint-together said moving part (02B), or arms (02B), or pole (02B), or craft (02B), or axis (02B), or bar (02B), or pole (02B) to be waving, shaking, swing, moving. It also make the any combination of (i) optic lens (203") or (ii) image-carrier (202") has texture or without texture or-and (iii) LED(s) (201") to be change position to make the said desired light effects.

From FIG. 28 It also same as the co-pending (#ZZZ-family) that the said moving parts (202B) is assembled with 1st optic-lens (202") or image carrier (202") at one or both end or two-sides-pole (202C) like the scale or weight-balance equipment. so It only need small magnetic-force between the magnetic-coil and magnetic-parts can easily to make the scale or weight-balance construction to move. The move will make the optics-lens (203") or-and image-forming-unit(s)(202") to move like incorporate with motor (05") or movement (05) has same or equal or replace purpose. While the moving parts (202B) is moving and also move the optics-lens (202") or image-forming-unit (202"). The two-sides-pole (202C) sit on the two ends frame (202D) will be also change position so make the said 1st optic-lens (202") or image-carrier (202") moving. This make the image carrier (202") or-and 1st optics-lens (203") to emit the different light-beam to the 2$^{nd}$ optics-lens here is top project-lens (203") or cover (203") and form the big viewing angle project image on the desired floor, ceiling or walls but not shown on the wall where has the outlet or surface has the bulb base.

From FIGS. 29A, 29B, 29C, 29D, 29E, 29F, 29G show the co-pending filing all kind of preferred LED bulb designs and shape. The inner may have the desired moving optics-lens, moving image-carrier, different LED turn on and turn off time, magnetic reaction force device, or single project tube device, or multiple single project tube device, or project assembly inside these housing to get the wide viewing angle moving project-image show on the surface.

From FIGS. 29A, 29B, 29C, 29D, 29E, 29F, 29G show the co-pending filing all kind of preferred LED bulb designs and shape. The inner may have the desired moving optics-lens, moving image-carrier, different LED turn on and turn off time, magnetic reaction force device, or single project tube device, or multiple single project tube device, or project assembly inside these housing to get the wide viewing angle moving project-image show on the surface. The 3 major parts as above discussed as co-inventor earlier (#II) (#II-1) (#I I-2) claim 1 said the project assembly fit into main products and main products including garden light, light bulb, night light, light string. From this simple change outside housing geometric shape and simple change the prong, AC-plug-wire, bulb-base can have the same project-assembly fit within the FIGS. 29A, 29B, 29C, 29D into outdoor garden light housing, into light-string, into night light, into bulb housing can instantly to have same functions for different housing for different applications.

Furthermore, the co-inventor filed case both are issued patents and both have the identical drawing with the FIGS. 29A, 29B, 29C, 29D are 1. (#QQQ-3) U.S. application Ser. No. 14/983,993 filed on Dec. 30 2015 now is U.S. Pat. No. 9,090,739 issued date on Mar. 6 2018, and 2. (#ZZZ-3) U.S. application Ser. No. 14/503,647 filed on Oct. 1 2014, Now is U.S. Pat. No. 9,719,654 issued date Aug. 1 2017

Figure 29A:
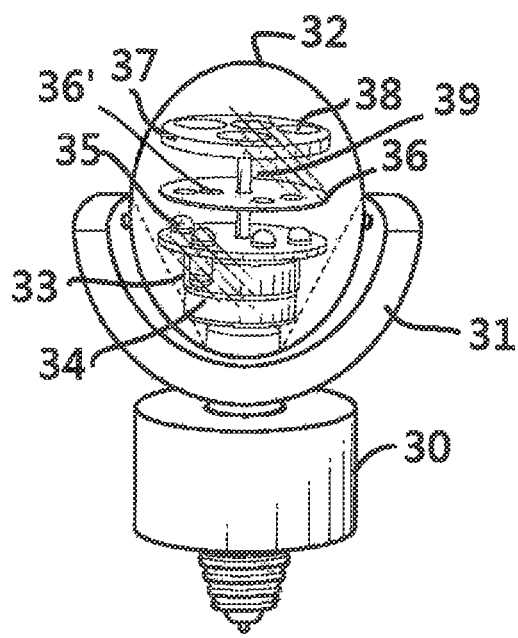
Figure 29B:
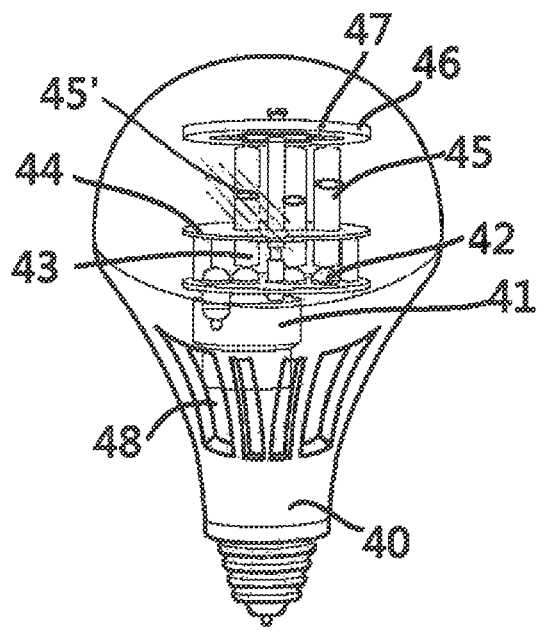

From the FIGS. 29A, 29B both LED project light (30) (40) in bulb-shape housing or other shape-housing has the major difference for 3 basic-parts project-assembly at the project-assembly has (1) LED (35)(42), and (2) image-carrier (36') (45'), and (3) refractive project-lens (38) (47). The difference at the project-assembly whether has the extra tube (43) or tubes (45) or tube-assembly (43 and 45) to make some image or-and pattern do not interfered by other LED(s) light. For example like FIG. 2C which has the 2 types of the image-or-and-pattern projection which has center is one individual image-or-and-pattern project-assembly which is surrounded by the 4 rotating lighted image-or-and-patterns.

Because the center is separated with the surrounding other project-assembly, so need the tube (43) or tubes (45) or tube-assembly or housing-parts or walls to make the 2 different project-assemblies is isolated or separated. This is the major difference.

Also, the said tube (43) or tubes (45) or tube-assembly (43 & 45) also can be a tray, a holder, a join-piece and each has wall surrounded to prevent light-beam to leakage out while assembled. This is other big features of current invention and co-pending filed case features which not existing at any US prior-arts. Other features is the co-inventor's refractive-lens is installed on highest-housing opening or is install above top-of-inner-housing tube, so the refractive-lens spread light-beam will not blocked by higher tube or housing-parts and make the image is not spread-out wide.

Figure 29C:
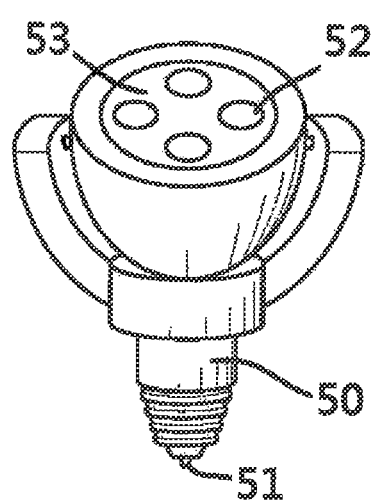
Figure 29D:
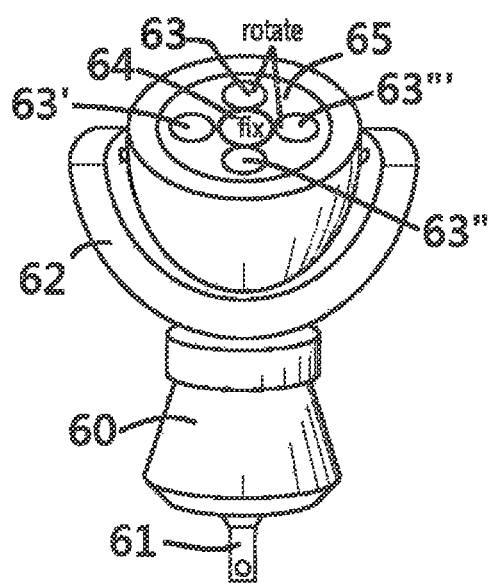
Figures 29E, 29F, 29G:
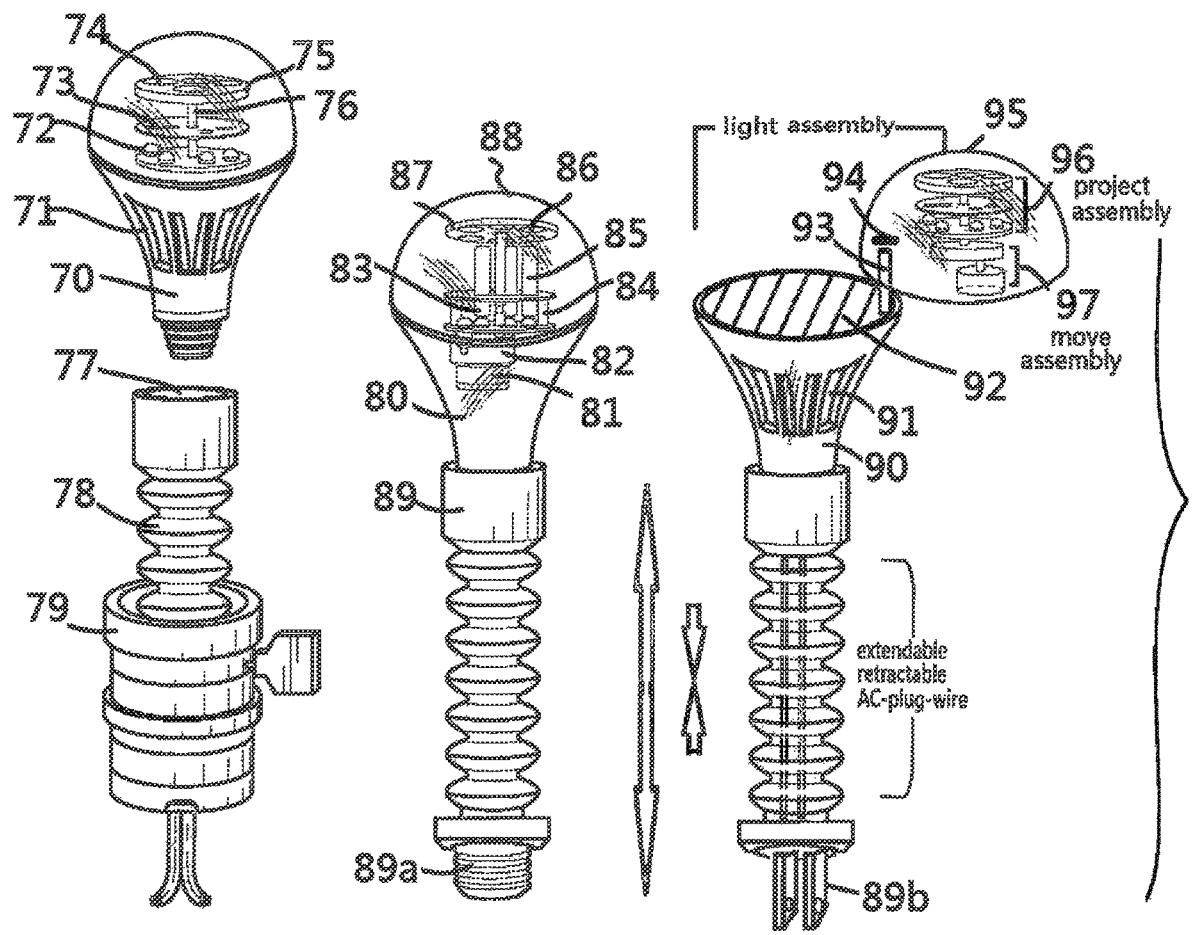

From FIGS. 29C, 29D which show the LED project light has plurality of rotating or fixed-n-rotating project lighted image-or-and-patterns. From FIG. 3C has 4 rotating image-or-and-patterns which has mechanical construction similar with the FIG. 3. The FIG. 3C has center big size fixed lighted image-or-and-patterns projection which is surrounded by the 4 rotating and moving lighted image-or-and-patterns which has similar mechanical construction with the FIG. 3.

For the FIGS. 29A, 29B, 29C, 29D the housing is bulb shape and bulb-base. It has other housing design and construction so can instantly change to other LED light application. The changes still keep the current and co-pending filing cases which has unique installation for top refractive-lens and lower tube/tubes/tube-assembly/holder-assembly/tray-assembly or desired combination for tray and holder and tube but each one has wall-surrounded so can joint-together without any light-beam leakage out. This is very important for current and co-pending invention.

From FIG. 29C, 29D is outside shape and details construction show the other alternative way to get the moving project-image for LED night time use light. Again, this is same as Co-pending filing case (#ZZZ-3) U.S. application Ser. No. 14/503,647 now is U.S. Pat. No. 9,719,654 which apply the same 3 major components LEDs (01"), image-carrier (02"), and Project-lens assembly (03") to form the big viewing angle project-image, or has $1^{st}$ and $2^{nd}$ optics-lens and light-traveling back-and-forth within the more than one optics-lens.

From FIG. 29A, 29B, 29C, 29D 29E, 29F, 29G show the co-pending filing all kind of preferred LED project light applications here show the preferred project-bulb designs and shape. The inner may have the desired (i) moving optics-lens, or-and (ii) moving image-carrier, or-and (iii) moving LED(s), or-and (iv) different LED turn on and turn off time, or-and (v) magnetic reaction force device, or-and (vi) single project tube device, or-and (vii) multiple piece of project tube-piece device, or-and (viii) project assembly inside these housing. These parts with preferred assembled to create or get the wide viewing angle moving project-image show on the surface.

The drawings also show the LED bulb has its preferred construction or even incorporate with the bendable or flexible bulb-base (78) as FIGS. 3D, 3E, 3F which has long length of the bendable or flexible piece to make the people to make the project or illumination aim to desired position or location or orientation. From FIG. 29F also show the tilt or move horizon part of the LED bulb for more than one functions including project or moving projection or illumination for near-by area.

From FIGS. 30A, 30B, 30C disclosure the Co-pending Filing (#ZZZ-12) U.S. application Ser. No. (#ZZZ-1) Ser. No. 14/323,318 and (#ZZZ-12) Ser. No. 14/023,889 those drawing show the $1^{st}$ embodiment to use the said motor (405-4A) to drive the axis (4A) to rotating the top at least one of inner or outer-cover project-lens which has multiple refraction or-and reflection lens to allow the inner LEDs (401-4) (401-4B) to passing though the multiple reflective or-and refractive lens. This arrangement in order to spread out the different turn on and turn off LED color light beam to wide viewing angle for moving project-image.

The each color of the said LEDs (401-4) and (401-4B) can be different color and turn on and turn off controlled by IC so can had all kind of light effects including chasing, random, pair flash, fade-in and fade out, sequential, color changing, freeze function, auto changing function, 7 function in 1 or any other available function from market place.

The FIGS. 30A, 30B, 30C also has circuit (4C-4) (4C-4A) (4C-4B) and motor's gear set (405'-4) (405'-4A) (405"-4B) so can get desired rotating speed of axis (4A) to drive the top multiple reflective or-and refractive dome lens rotating under predetermined speed. This arrangement in order to make people enjoy the moving and changeable color, function light effects from the said current invention for LED Night Light or LED Bub while the same construction fit into the plug-in Night light or fit into the said Bulb shape with the bulb base to get the Power source.

From FIG. 31A disclosure the Same construction with the FIGS. 29A, 29B which has the moving or rotating optic-lens-assembly (503D) which has the 6 of the single optic-lens (503-1) which can project the shaped or tiny-image light beam through the its refractive or reflective or both lens (503-1) to become big project-image shown on the desire surface.

The current invention has the 6 single optical-lens arrange proper spacing within a frame (5F) for 360 degree round or geometric-shape holder (5F) so each single optic-lens (503-1) almost cover the 60 degree of the said frame (5F). So the wide viewing angle project-image will move or travel a path around 60 degree for circle range while the top project-lens-assembly each single project lens travel or rotating 60 degree, then the big project image traveling will be around 60 degree.

The said LEDs (501-1) has narrow viewing angle so may have optional (i) optic-lens added like FIG. 502-2), or (ii) add desired optic-lens top of LED(s) to let the narrow light beam become wider viewing angle light beams. Or (iii) add/adjust the distance from the LED to the top image-carries but it will be loose some light brightness, or (iv) alternative arrangements.

While the LEDs light beam emit to top the said image carrier (502-1) through the image carrier's (502-1) openings, printed windows, stencils, cutouts, films, slide, display-units or changeable image or display, the said lighted shaped or tiny-image light beam will emit to top single optical-lens (503-1) fixed on the said frame (5F) of the said projection-lens-assembly (503D).

The wider viewing angle the said shaped or tiny-image light beam go through the said rotating each single optics-lens (503-1) and form the moving, changeable, rotating image. Because all the optic-lens (503-1) is rotating one by one so the each of single optic-lens image will look like a continue one image to moving from circle one side to other side for certain degree depend on the each of single optic-lens (503-1) occupy how many angle of the said frame (5F).

The FIG. 31A, the image carrier (502-1) has 4 shaped opening, holes, cutout, printed windows, film, slide, display-unit, printing, panting, arts, or changeable display windows so can project 4 different images. if each of 4 image-forming-unit(s) had relatively LED for supply sufficient light-brightness to create the said 4 different tiny-images that is openings, holes, cutout, printed windows, film, slide, display-unit, changeable display windows to create the 4 big project-image and rotating on all same direction or desired directions.

From FIG. 31A the LED (501-1), Image carrier (502-1), project lens assembly (503-D) and single optics-lens (503-1) and motor (505A) and Gear set (505"-1) all fix along the axis (5A) with desire frame (5F) or fix on the housing parts (not shown)[.] So[,] whenever the outside housing changed to different housing construction instantly change application of the current invention and the application can be for LED night light or LED bulb or outdoor garden light or light-string and each had its prong (not shown) or Bulb base (5LB) (5LB1) or AC-plug-wire (5LB2) to get the AC power.

The FIG. 31A inner LED, image-forming-unit, inner plurality of project-lens assembly can simple install within the desired housing to change project-light for different application as above discussion shown on the following drawing LED night light as FIG. 5, 6A, 6B, 6C, 6D, 6E, 7A, 7B,7C, 7D, 7E, 20A, 21, 22, 23,24,25, 26A, 26B, 26C, 27, 28, 29D, 29G, 30A, 30B, 30C, 31A, 31B, 31C, 32, or LED Bulb as FIG. 1E, 20B, 21, 22, 23,24,25, 26A, 26B, 26C, 27, 28, 29A, 29B, 29C, 29F, 30A, 30B, 30C, 31A, 31B, 31C, 32, or LED outdoor garden light as FIGS. 31A, 31B, 31C, 32, and FIG. 1A, 1B, 1C, 1D, 2, 3A, 3B, 3C, 3D, 4, 8, 10A, 10B, 10C, 10D, 10E, 10F, 10G,10H, 10I, 10J, 10K, 10L, 10M, 10N, 10O, 21, 22, 23, 24, 25, 26A, 26B, 26C, 27, 28, 29E, 30A, 30B, 30C, or LED and/or laser light-string as FIGS. 9A, 9B, 21, 22, 23, 24, 25, 26A, 26B, 26C, 27, 28, 30A, 30B, 30C, 31A, 31B, 31C, 32, From the FIG. 31B same as the all co-inventor and co-pending LED project light has the same LEDs (501-2) and image-carrier (502-2) and Project-lens assembly (503-2) with single optic-lens (503D)[.]

And, only the said project-lens-assembly is rotting along the axis (5A). The said project-light incorporate with tube or tube assembly (5T) to install the said other optional optic-lens to wider the narrow LEDs light beam and also use the tube or tube-assembly (5T) to prevent from the light beam leakage so can concentrate all LED wide light beam to cover as many as single optic-lens.

Or/The Tube or tube-assembly it have an optic-lens fit to make the narrow LED light become wider and also can prevent from the light leakage through the wall of the said tube-like tray-assembly or tube or tube-assembly. This depend on the market requirement so this Fig is for just one of alternative examples for tube-like tray-assembly which can be in any shape such as wider top and narrow end type of tube-like tray-assembly or tube-assembly (Not shown).

From FIG. 31C show the alternative way the image-carrier (502-3) is a film or slide which fit into the optic-like tube (5T) or tube-assembly (5T). The said the optic-like tube or tube-assembly (5T) which may straight or wider-top-narrow-base optical-tube which has reflective material coated outside or made of light-block-material so no light can leakage to outside. And, The said LEDs (501-3) may also into the one end or located on lower-area of the optic-like tube (5T) or tube-assembly (5T) so even the film or slide is install within the optic-like tube inside by groove, holder, ring, or other fix-skill still can get sufficient light brightness for projection function. Then, the wider shaped or tiny-image light beam emit to top (i) rotating or fixed or separated single optic-lens (503-3) or (ii) one of the rotating, moving optic-lens (503-3) of the rotating, moving project-lens's tray (503-D). The said rotating, movable project-lens' tray (503D) which has plurality of optic-lens (503-3) and create moving rotating certain degree multiple big projection image such as STARWAR characters, Frozen character or any Disney Characters or cartoon, time, logo, art work etc.

The said LED (501-3) emit light beam into image-carrier-unit which fit within the tube or tube-like tray-assembly or tube-assembly to form lighted tiny image or patterns to emit to the top refractive project-lens to form big-size projected-image shown on outdoor fence, wall, garage door, entrance door or indoor wall, ceiling, floor depend on the LED projection install locations. This is same as inventor's parent filed case (#FF-Family) including (#FF-4) which is CIP of (#FF-3) which is CIP of (#FF-2) which is CIP of (#FF-1) which is CIP of (#FF-2009). The said single project-light have single of LED and image-forming-unit and project-lens also can added on the FIG. 31A unit and put on center location to form one Big center single FIXED Big Image as main role and surrounding N-number of moving project-images.

From FIG. 32 show the fixed or rotating or movable or movable or detachable 3 main components LEDs (601-LED), image carrier (602-ImCa), project-lens-assembly (603-PL) to make the wider viewing angle big moving project image.

The FIG. 31 and FIG. 32 is identical drawing with co-inventor filed case both are issued patents 1. (#QQQ-3) U.S. application Ser. No. 14/983,993 filed on Dec. 30 2015 now is U.S. Pat. No. 9,090,739 issued date on Mar. 6 2018 for LED Bulb while change outside housing can be current invention for LED outdoor garden light or LED night time use light or LED light-string, and 2. (#ZZZ-3) U.S. application Ser. No. 14/503,647 filed on Oct. 1 2014, Now is U.S. Pat. No. 9,719,654 issued date Aug. 1 2017

The said LEDs (601-LED) has its relatively top image carrier (602-ImCa) so can has the shaped or tiny-image light beams to emit to the project-lens-assembly (603-PL). Each single project-lens project out the continuously moving clear and big project-image to travel certain degrees of the circle or path or arc with wide viewing angle to viewer.

The LEDs (601-LED) has narrow light beam as right hand side of FIG. 32 for narrow light beam (N1) through the optional other optic-lens (OP-1) or optics-like tube (OP-1) can become wider (W2). And, LED light-beam passing through the image carrier (602-ImCa) with some distance to get much wider (W3) shaped or tiny-image light beam to emit to project-lens-assembly (03-PL) to form the continuously moving big project-image (604-MBPI).

The more LEDs (601A, 601B, 601C, 601D) and its each respect image-carrier (A) can get more moving big project image. The moving big project image (604-MBPI) have the moving direction for clock-wise or anti-clock wise depend on the motor and its gear-set direction.

The moving big projection image (604-MBPI) moving angle will depend on the number of single optics-lens (04E) number within the 360 degree of holder or frame. More single optics-lens (604E) will has less traveling angle or path or arc of the said moving big project image (04-MBPI).

For the FIG. 32, the 6 single optic-lens (604E) within the 360 degree round frame or holder, the moving big project-image (604-MBPI) will travel around 360/6=60 degree. So more single optic-lens (604E) inside of the frame (6F) will get less travel angle or path or arc.

Also, the less openings (604B), cutouts (604C), printed windows (604D), film (604B), slides (604E) will get less type/design/shape/image of the moving big project-image (04-MBPI).

Also, if only had one top single optic-lens with one printed-window, the one continue moving big project image (604-MBPI) will move very slow because the axis rotate 360 degrees only had one single optic-lens can project image for around 180 degrees. So the moving big project image (604-MBPI)

F

Below is co-pending filing (#ZZZ-4) Detail description should still fall within the current invention claims:

Furthermore, the co-inventor filed case (#ZZZ-3) U.S. application Ser. No. 14/503,647 filed on Oct. 1 2014, Now is U.S. Pat. No. 9,719,654 issued date Aug. 1 2017 have the identical drawing with the
FIGS. 33A, 33B, 33C,
And FIGS. 34A, 34B, 34C, 34D, 34E, 34F, 34G, 34H, 34I, 34J,
And FIGS. 35A, 35B,
And, FIGS. 36A, 36B, 36C, 36D, 36E, 36F,
And FIG. 37
And FIG. 38
And FIG. 39A, 39B. 39C FIGS. 33A, 33B, 33C is same drawing of FIGS. 26A, 26B, 26C just for different marking, details for discussion: shows 3 preferred embodiment of the current invention has prong or alternative conductive-kit including AC-plug-wire or bulb-base as above examples and discussion and more than one optic element(s) to create wide viewing angle image.

All of these embodiments has common fixed or rotating or moving or detachable parts including
(1) Light source including LEDs or Laser-light(s)
(2) Wider angle top cover (preferred for Optics-lens has refractive function) with its preferred optic properties
(3) More than one of optics element(s) including inner $1^{st}$ or more optics element(s) each may has plenty areas to allow light passing or form the shape lighting or-and have the reflective or refractive or both function build-in
(4) Each optics element(s) has predetermined optics properties including (i) marking or texture or treatment on optics-lens for different size, shape, thickness, variable thickness, height, or (ii) optics-element have one of cutout, stencil, window, silkscreened, or other assortment, arrangement, combination[.]
And, the geometric shape optics-element may also has (a) plenty of the convex-lens or concave lens or reflective tiny piece build in one optic reflector as $1^{st}$ one optics-element(s), or (b) all variable construction should be fall within the current invention scope.
(5) the optics element(s) or light source (LEDs or/and laser-light) incorporate with motor/spin/rotating/movement/magnetic unit & coil assembly in order to make the optical elements or light source become moving optical-element(s) or light source. And make the splendid light performance including changeable image, lighted patterns, message, time, geometric art, nature scene, galaxy, milky way, sky, cloud, starts, mom, water waves, animal, characters, cartoon, sign, logo, commercial to been seen.

From FIGS. 33A, 33B, 33C is same drawing of FIGS. 26A, 26B, 26C just for different marking, details for discussion, the LED (x4) and/or laser-light (x1) device which has more than one optical element(s) (x5) (x6) including at least one of inner (x5) or outer-cover (x6) optics-lens(s) which reflective or refractive or both properties.

These devices have plug-in type such as prongs (x7) or AC-plug-wire (not shown) to connect with outlets from a wall, an extension cord, a power station, or a desk lamp power station's outlet receptacle.

The LED and/or laser light device creates the light images towards indoor or outdoor ceilings, fence, walls, door, entrance door, garage door, floors, grounds, and all other preferred flat and visible area, but not limited to these prefers.

The top cover (x6) or inner optics-lens (x5) of said device, has a designated or waved or diffusion or refraction or reflection or desired treatment with preferred thickness, is able to project and create said images or-and lighted patterns to be widen to a bigger space, area, location, or all said surfaces.

The optics-elements has more than one including but not limited for optics-lens (x4) (x5) (x6) which has convex or reflective or refractive or any combination of these optics properties' construction basing on the requirement. Hence, the current invention any light beam can traveling or passing through at least more than one geometric shape optics-element (x5) (x6) and the said light beam emit out from LED (x4) or-and laser-lights' (x1) head to hit the $1^{st}$ reflective or refractive optics-lens (x5) or other material optics-element(s)(x2), then, Hit $2^{nd}, 3^{rd}, 4^{th}$ . . . . Till the light beam are pass through to outside through the top cover (x6) optics-elements which preferred is optic-lens with refraction properties.

The optics elements (x4) (x5) (x6) have more than one number and can be an optic lenses or any kind of material that will change the directions of path of the lights coming from the LEDs (x1) or-and laser (x4). Optical lens (x4) (x5) (x6) either has convex lenses with designed thickness or reflective/refractive lenses to increase light effects and incorporate with moving device to make the movement patterns of the lights. And, these moving or rotating inner lenses are not limited to be used as one, but can be used more than one or any combination of market available moving or rotating inner optics-lens with different optics properties.

From FIG. 33A show the more than one of optics-element(s) (x4) (x5) (x6) including the Top cover is optics-lens and inner optics-elements also is an optics-lens with desired lens specification and optics properties. This $1^{st}$ embodiment shown the 2 optics-elements both are optics-lens. The Top cover optic-lens has textures or variety or variable thickness or painting or printing or reflective or-and refractive design to make all incoming light beam to reflective or-and refracted traveling or passing though the top cover optics-lens to refraction to wider areas to viewer. The light beam emits from the below desired number and color and brightness LEDs (x1) or-and Laser-Light(s) (x4) to get the very splendid color, light sport, diffusion, variable pattern while incorporated with the said IC or movement device, motion unit to make the light effects has moving and color changing and exciting effects to view.

From FIG. 33B shown the more than one of fixed or rotating or moving optics-element which is not only including the fixed top cover optics-lens with textures here prefer as wave textures. But also inner $2^{nd}$ or more rotating or moving optics-element are the said optics-lens with treatment, or which is made of other preferred material with desired treatment including printed film, stencil, plastic sheet has opening, cutouts, shaped or windows[.] The said inner rotating or moving optics-lens or other material optics-element(s) incorporate with movable, shakable, waving, rotating, spin device(s) to make the non-movable Light source including LEDs or/and Laser-lights light beam passing through[.] And, LEDs or/and Laser-lights light beam passing through the movable or rotating inner or $2^{nd}$ optics-elements and its optics designs such as textures or plurality of wave construction to form the shaped light beam go back-and-forth and/or go through the outer or top cover or $1^{st}$ optics-lens multiple times of reflection or/and refraction [.]

So, The LED and/or laser light get the pre-designed light effects after the light beams come out from top cover optics-lens.

This is the examples for 2 or more optics-elements one is optic lens as top cover and other is the at least one of inner optic-lens. Or, other material's optic-elements which has it preferred shaped or film or slide or pre-shaped window or printed film or image-forming carrier on the optics-element to make the designed shape, image, characters, sign, slogan, words.

The light beam come out from inner or at least one of $2^{nd}$ optic-elements which incorporate with moving device so the light beams has its moving effects[,] and then hit the outer or top cover or $1^{st}$ top cover optics-lens and its texture or optics designs or painting or printing will make multiple times reflection or/and refraction or go-through[.] This one of example can make the light performance become motion waves effects or such as Aurora, moving clouds, changeable galaxy, moving stars, moving milky river or other nature, desired scene[.]

All the light effects can be produced under details design for (1) inner or $2^{nd}$ and/or (2) outer-cover or the $1^{st}$ optics-elements with design-forming carrier or image-forming carrier which may is film, slide, LCD display, stencil, printed film, at least one of moving prism-lens (x11), grating-piece (x9) . . . etc.

From FIG. 35A and FIG. 35B show one of alternative arrangement for the moving optics as FIG. 35BA and FIG. 35B preferred embodiment which has more than one of optics-elements which has 3 fixed or rotating or moving or detachable optics-elements which has plurality of tiny reflective or refractive or both optics-lens (V2) (V5) (V9) to form a big reflector and/or refractor and/or diffusor as FIG. 35A (V-1') or FIG. 35B (V-3)[.]

The said big reflector and/or refractor and/or diffusor which has desired different size, shape, geometric shape, thickness, focus, colors and may incorporate with motor, spin kit, rotating unit, movement, magnetic unit & coil assembly, shaking unit, waving kits, crane-shaft to make the fixed LEDs or Laser-lights' light beam travel and passing through[.]

The alternative arrange have the lower $3^{rd}$ or more optical-unit which preferred is crystal-like ball or nuts to create a hundred of light beam to hit to $2^{nd}$ optics-element[,] or the lower $3^{rd}$ or more optical-unit may is a moving or steady reflector which has plurality of small reflective lens arrange on a dish-like surface as FIG. 25B (V-3), or the lower $3^{rd}$ or more optical-unit (V8-1) is one of the LED or/and Laser light-unit as FIGS. 29A, 29Bs 29C, 29D, or $2^{nd}$ optic-element is made by other material with shaped holes, windows, cutouts, opening means and light beam can be shaped to desired arts to shown on certain range of surface such as aurora light shape, cloud shape, star shape, milky river, galaxy shape[.]

Then the light beam will hit to the $1^{st}$ optics-element which is a top cover optics-lens to enlarge light beam to spread out to wider viewing angle image to let viewers to see.

The FIGS. 33A,33B, 33C shown detail drawing show all the light beam emits out from the lower position's LEDs (x4) or-and Laser-Light(s) (xl) traveling or/and passing though different inner fixed or rotating or moving $2^{nd}$ or $3^{rd}$ optic-elements to make some plurality of light beams or shaped light beams and hit the cover optics-elements[.]

The said outer or top cover preferred is optic-lens. The current invention can create the perfect light effects which are very good design and cannot make by single piece of fixed or rotating or moving inner and outer lens with optics-property such as only reflective or only refraction to get such effects.

From FIGS. 33A, 33B, 33C, 34A, 34B, 34C, 34D, 34E, and earlier discussed FIGS. 26A, 26B, 26C, 27, 28, 29A, 29B. 29C, 29D, 29E, 29F, 29G The current invention shown some inner and/or outer optics-element(s) including (1) Optic-lens has textures (2) Optics-element made of other material has shape holes, opening, cutouts, window, stencil, film, slide, LCD display, wireless changeable images.

(3) Optics-element or Optic-lens is at least one geometric-shape piece of rotating, moving while incorporate with crane-shift, motor & axis, spin kit, rotating kits, clock movement, Magnetic unit & coil assembly to offer arts/design and/or magnify-image and/or light-beam passing through and/or reflected or refracted or both the said incoming light-beams.

(4) Optic-element is a geometric shape unit has plurality tiny reflective or refractive or both lens arranged for geometric shape and the surface with different shape, size, color, thickness, variable thickness into or form a one unit to get fixed LEDs or-and Laser-light light beam to plurality of light beams become very splendid and spread out light beam (5) Optic-lens for inner or outer has dome, half ball, ⅔ ball or sphere shape or other preferred geometric-shape combination(s) to offer arts/design and/or magnify-image and/or light-beam passing through. The said outer or top cover assembled with wide opening of LED light-device so can has wider angle optics-lens to make all light beams to spread out to wider and bigger areas with said designed Image wanted with or without refractive optics properties.

(6) Optics-element in desired geometric-shape or construction for fixed or rotating or moving arrangement to offer arts/design made by preferred material such as plastic can be any shape such as sheet, piece, roll, curve, ball, half ball, dome, nuts, ⅔ ball, sphere, bar, cover or any other geometric shape with its preferred optic construction[.]

The said optics-construction or treatment including texture, opening, window, convex lens, slide, film, character image, LCD display, magnify lens, variable thickness, variable focus by plurality of tiny optic-lens, reflective piece, refraction-lens has steady fixed or has moving, waving, shaking, vibration, rotating device to added features.

So these are the other features for the current invention from the above FIGS. 33A, 33B, 33C, 34A, 34B, 34C, 34D, 34E.

From FIGS. 33A, 33B, 33C, 34A, 34B, 34C, 34D, 34E.

It has alternative design to get desired light effects which just has more than one LEDs or/and laser-light(s)[.] And, The said LED or-and Laser light source has different time to turn on and turn off with desired cycle, duration and frequency so can make the lighting is changeable for color, brightness so look like the moving or variable light effects to save a lot of complicated assembly or cost by using the motor or movement.

The LEDs or/and laser-light(s) may selected from group of color, specification, size, functions, power, watt[.]

One of alternative arrange for each LED or/and laser-light (s) can has its own housing to emit light-beam to its own image-forming-unit for desired direction, orientation, angle to anywhere.

while the each housing inner has more than one optics-elements including top refractive and/or reflective lens and image-forming-units as above filed history one group of inventor's co-pending patents FIGS. 11 to 19 of following filed case;

(#TT-2) U.S. application Ser. No. 14/968,250, Filed on Dec. 14 2015 which is Continue in Part of (#TT-1) U.S. application Ser. No. 14/944,953 Filed on Nov. 18 2015
which is Continue in Part of
(#TT-12) U.S. application Ser. No. 12/866,832, Filed on Sep. 21 2010

This is Division filing for

So[,] each LED or/and laser-light(s) device has more than one projected-image from more than one project-assemblies of one of LED and/or laser light.

Each project-assembly have different light emit direction even LED or/and laser-light emit angle is narrow but after the light beam been under reflected or/and refracted then, the light will come out from its wide opening cover including 180 flat, dome, ½ ball, ⅔ ball, sphere or dome shape cover[.]

So[,] can get the wider viewing angle image or lighted patterns shown on desired sides, areas, surface.

This is the result basing
(1) More than one LEDs or laser-light(s)
(2) More than one Reflect or Refractive optics-lens or units
(3) more than one optics-elements with desired optic properties And, The LED and/or laser light-device incorporate with other parts & accessories may in desired combination selected from:
motor,
movement,
magnetic unit & coil assembly for inductive control the optic-lens waving,
interchangeable power source,
moving optics-elements,
optic-element made of light-block material has shaped holes or opening or windows,
texture lens,
optics lens,
plurality of optics lens,
IC,
power source[.]

From FIGS. 34A, 34B, 34C, 34D, 34E show one of alternative embodiment that is one of the Plug-In type light device by prong as FIG. 34B or AC-Plug-wire as FIG. 34C or external transformer as FIG. 34D. To make the Alternative Current (A.C.) connect with light-device to drive inner circuit, LEDs or/and laser light source, Sensor, switch, controller or wireless controller[,]

And[,] incorporate with optional motor to make the moving optics-element including but not limited for optic-lens so can make motion effects of the related image to ceiling/walls/floor has plenty of color and moving (If add the motor or moving device).

The Said geometric shape optics-element(s), or optic-lens has more than one reflective or refractive or have shape the light beam properties are the said optics-elements of LED or-and laser light device.

The said LED or-and Laser light preferred has the sphere or ball or half ball or ⅔ ball or dome or around 180 degree flat wide opening lens as top cover optics-lens.

The said top-cover has desired optics-lens with desired optics properties including magnify or diffusion or spread out the light beams by following parts:
(1) mirror-polished reflective or refractive lens for outside or inside
(2) round convex surface arranged on outside of each optics-lens to become a convex-lens, so light-beam reflect and/or refract and pass through the said 180 degree wide flat cover or dome cover or sphere cover[.]

So[,] the wider 180 degree flat opening or dome or sphere or half-ball or ⅔ ball Cover optics-lens is needed for current invention.

It is appreciated that the non-shown details for the Alternative Current (A.C.) power source has receiving outlet or receptacle to receiving transformer, adaptor or AC plug-wires. Adaptor or AC wires to drive the light-device inner circuit to make the light source(s) turn on and emit light beam to desire area(s). It also can use USB wire to get power from the USB Ports.

From FIGS. 34F, 34G, 34H, 34I, 34J are similar with FIGS. 1E, 2, 19B, 19D, 19E, 19G, 20B, 29B, 29C, 29D, 29F, 31A for apply the fixed or rotating or moving or detachable (1) light-source and (2) Image-forming-unit and (3) project-lens with geometric-shape of the outside-housing and desired conductive-means to get AC-power-source.

From FIGS. 34F, 34G, 34H, 34I, 34J, It also can have the LED or-and laser light device has the Bulb-like shape housing and bulb-base as current delivery terminals to get AC power instead for Prongs application as FIG. 34B which always located on lower position. The Bulb-like shape device has bulb-base will be always on higher location for people to use is other current inventions features. These common skills can use from market place.

From FIGS. 34A, 34B, 34C, 34D shows light device its optic-element has more than one reflective or refractive on its surface within one optics-lens (T1) (T1') (T1") (T1'") to allow light beam can traveling or pass though the convex-lens especially for the TOP Cover (T1) (T1') (T1") (T1'") Optics-element and reflect within the reflective-lens or refractive lens (2 in one piece) (T1) (T1') (T1") (T1'") to let light emit out to create image on ceilings, walls, floor, so the more than one of optics-elements also including the one piece of lens has more than one optic-properties.

FIGS. 34A, 34B, 34C, 34D: shows a first preferred embodiment of the current invention has (2) Optics elements including one is top cover is optic-lens with refractive or-and reflective properties and one is inner disc-like optics-lens has refractive or-and reflective properties or convex lens.

And, both have the preferred wave-textures has variable thickness so the LEDs or Laser-Lights some of the light beam can passing though the disc-like optics-lens has wave textures, then has $1^{st}$ lighted patterns or image.

And, all these inner or $1^{st}$ group light beam will traveling or passing the outer or $2^{nd}$ Big and wide optics-lens to create the super large size viewing angle image, lighted patterns, message, time, geometric art, nature scene, galaxy, milky way, sky, cloud, starts, moon, water waves, animal, characters, cartoon, sign, logo, commercial to been seen.

From FIG. 34A show the current invention for $1^{st}$ embodiment get the AC power from different housing design including AC prong, AC bulb base or get the DC power from DC USB female port.

The prong, AC-plug-wire, Bulb base, USB female ports all only need to have positive and negative current connect with 2 prongs or 2 plugs or 2 terminals of bulb base or 2 ends of the USB female terminal. So, the current invention can have different shape of products but with same optics assembly application for Prong unit, AC-Plug-wire, Bulb base unit, USB port unit only different only at the power input terminal design for prong and for AC-plug and for bulb base unit and for USB-port. The FIGS. 34A, 34B, 34C, 34D show same or different optics arrangement, terminals including prongs, bulb base, USB female ports.

From FIGS. 34A, 34C, 34D, 34G to 34J show no prong on drawing those can be one of embodiment. The alternative is to get the Direct Current (DC) by the USB female ports or by the male-bulb-base connect with female-receiving-bulb-socket have DC current, so these can be DC power unit which can have power from any Direct current device such as batteries, energy storage means, solar power, wind power, chemical power. Or, same as these drawing have bulb-base to get AC power source while the male-bulb-base connect with female bulb-receiving-socket.

It is appreciated for the Interchangeable power source as the inventor prior art as above listed patent U.S. Pat. No. 8,434,927.

FIG. 34E shows the First embodiments details construction.

Figure 34F:
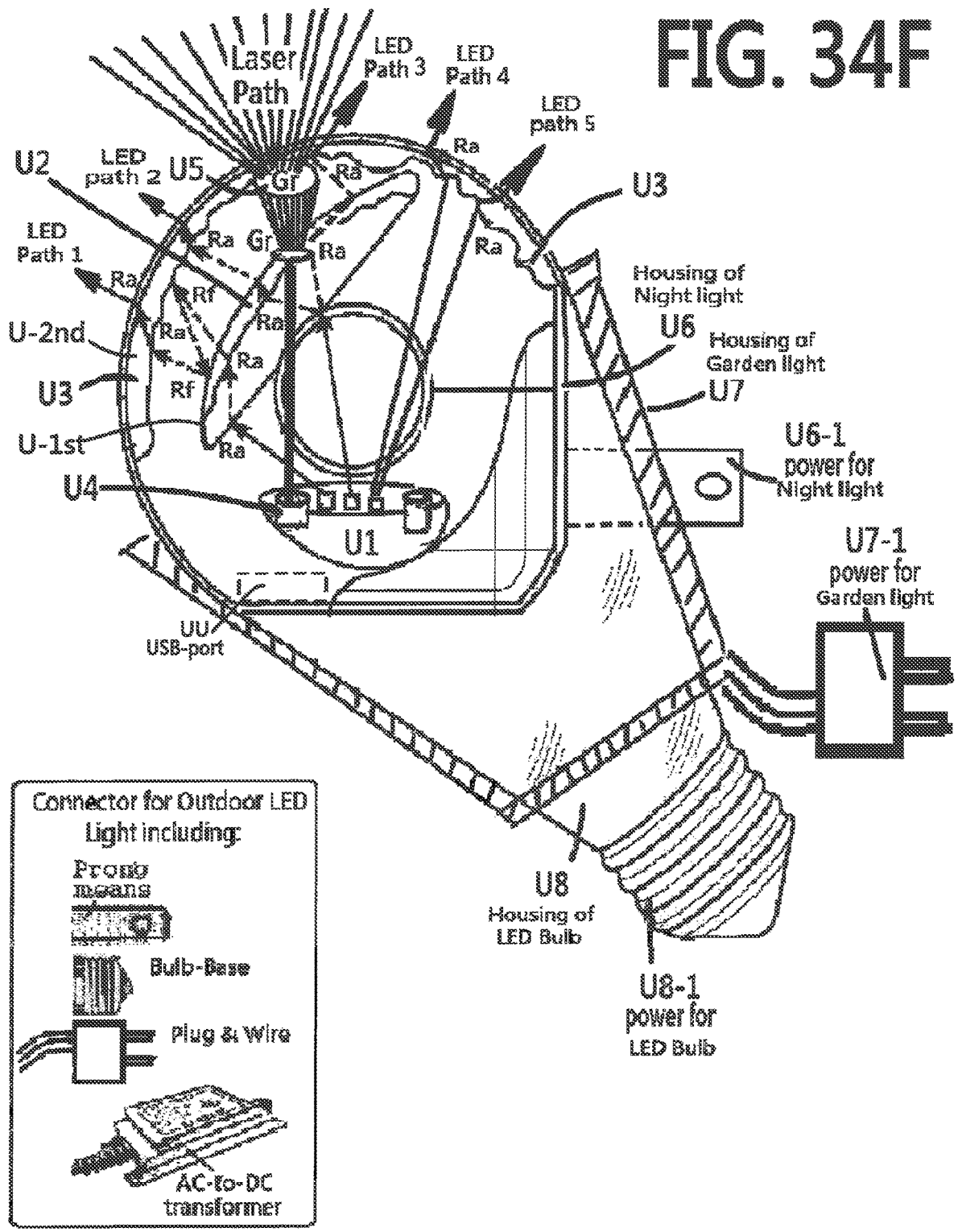

FIG. 34F is similar with earlier discussed FIG. 2 shows the $2^{nd}$ preferred embodiment of the current invention which is using a bulb base as power supply.

This figure symbolizes this invention can be powered up using many different ways such as, as shown in FIG. 34F, a bulb base, prongs, AC-plug-wire, or USB kits.

FIG. 34F is similar with earlier discussed FIG. 2 also shows the inner design which consists LED lights or-and laser lights light-beam (pattern shown as full lines and dotted lines) that are passing through the said at least one of $1^{st}$ optics-element (U-$1^{st}$) which maybe a convex, reflective or refractive or both, grating-piece (Gr), or desired optics lens[.]

And, the $2^{nd}$ optics-elements which may be a $2^{nd}$ optic-lens (U3) which has at least refractive properties to enlarge and spread out the light beam emit out from $1^{st}$ optics-element (U-$1^{st}$) (Gr) here preferred is convex lens to the outer lens (sphere) which are used for reflection and refraction. FIG. 34F also shows the replace of prongs by the shaped housing which has bulb base (making this product a bulb), or it can be other or alternative conductive-piece or wire to get power.

From FIG. 34F is similar with earlier discussed FIG. 2 show the same optics-elements and same optics-application can fit for different shape of the product may has different terminals to get the power.

The FIG. 34F show the unit has prong which same as the FIGS. 33A, 33B, 33C, 34B so can plug into the outlet device on wall or power strips or desk top power station. While it incorporated the bulb-base it can simple to change the product housing shape to bulb-like shape and the 2 power terminals can easily to connect on the bulb base-wall for one pole and bulb base-bottom for $2^{nd}$ pole which will has total same optics parts & accessories with the prong products.

Furthermore, while people would like to use USB female ports to connect with power source by USB wires, it is simple just add one USB female port on FIGS. 33A, 34A to 34D housing so can instantly can power by the Prong or the USB female ports by AC current (for Prong Product) and DC current (for USB female port) which only need change the inner circuit not even touch the Same optics parts & accessories.

FIGS. 34F, 34G, 34H, 34I, 34J shows the $2^{nd}$ preferred embodiment of the current invention which shows this invention to have (2) type fixed or rotating, moving optic elements: top cover on the outside, and at least one inner disc-like convex lens.

The said (2) type fixed or rotating, moving optic elements both have preferred textures or desired optics-properties and designs (wave-like) to vary the thickness of the lens so the said LED lights or laser-lights can pass through the at least one of fixed or rotating or moving inner disc-like convex or desired optics-properties lens.

One of alternative arrange for inner optics-lens which has a designed thickness or texture (wave-like) for lights can pass through, or alternative optical elements which is not an optic-lens(es), such as holes, stencils, walls, openings, or cutouts to project and show desired image.

FIGS. 33B, 33C without using an optical lens that has designed thickness, then pass through the outer optic element has refractive properties so can enlarge and spread out the light beam.

And create or project desired arts including; image(s), lighted patterns, message(s), number(s), time, geometric art(s), nature scene(s), galaxy(ies), milky way, sky(ies), cloud(s), space nebula, stars, moon, water-wave(s), aurora light(s), animal(s), character(s), cartoon(s), sign(s), logo(s), or commercial(s).

FIGS. 34F, 34G, 34H, 34I, 34J also shows the preferred embodiments on different power source housings such as corn-like bulb housing has bulb base; possible for many shape of the bulb available from market place and bulb bases such as e12, e17, e26, etc.

From FIGS. 34G, 34H, 34I, 34J show $4^{th}$ preferred embodiment that has the bulb shape light unit has bulb-base which the current invention can acquire power from any bulb bases that are connected to an AC power source such as lamps, or bulb base adapters. The bulb base does not limit to one specification; any bulb bases (most commonly E12, E17, E26) can connect to the current invention. The said the current for different product housing design with preferred power terminal including prong, Bulb base, USB female ports so can be plugged in or USB wire connected in or screwed in tightly to ensure the connectivity between the bulb base and the current this invention.

FIGS. 35A, 35B shows The 3rd preferred embodiment of the current invention's optic elements has (1) The inner optic-elements is a reflector unit which has plenty of small size different reflective optics lens build in on one piece of metalized treated reflector, the plenty of optics unit which has different size, shape, geometric shape, thickness, focus, reflective properties, refractive properties to make the LED(s) or Laser-light(s) light source light beam can travel or passing. And (2) To make the splendid and pre-designed light beam pattern, color, spread out, shape, brightness, and other light effects, performance, functions available from market place and may incorporate with motor/movement/spin/rotating/magnetic unit & coil assembly to make the said optic-elements become moving optics-elements.

From FIGS. 35A, 35B shows the more than one optics-elements on the top of light source (LEDs and Laser-lights) the both light source light beam hit the center crystal-like optics ball, some light traveling and passing though the crystal-like optics ball basing on reflective or refraction theory so can create the very eye-catching light effects. The Both of optics-elements can cooperate with motor/moving/spin/rotating/magnetic unit & coil assembly to make optics-elements for moving and moving at least one or both reflective lens and reflective-ball to get the desired light effects.

From FIGS. 35A, 35B show the (2) preferred optics-elements has built-in plurality tiny reflective-lens of different size, shape, thickness, focus, color optics lens in one disc-shape reflector piece to make the LEDs or-and Laser-lights' light beam traveling or passing through to hit the others optic-element which has desire optics properties may in group combination select from optics lens, convex lens, concave lens, reflective lens, refractive lens, moving optic-element, element made by light-block material with holes, or opening or windows or cutouts or stencils, optic texture lens to make the light beam→$1^{st}$ optic means→$2^{nd}$ optics means (or to N optics means) to create the splendid light performance, effects, functions.

From FIG. 35B, it also appreciated that the more than one optics means and LEDs or/and Laser-lights has also incorporated with other electric parts & accessories may in group combination selected from power source, circuit, motor, movement, spin kit, rotating kit, magnetic unit & coin assembly, IC, sensor, controller or wireless controller, conductive piece, prong, Bulb base, USB set, circuit, and all other electric parts & accessories so can have right and pre-determined light function.

FIGS. 36A, 36B, 36C, 36D, 36E is same or similar with FIG. 26C, FIG. 27 have the FIG. 21 and FIG. 22 same or alternative-parts or equal-function parts and construction fit into the said desired housing. From FIG. 36A, 36B, 36C, 36D, 36E, show the LED light have at least one moving optics-elements or moving light source which the said optics-elements (is not the optics-lens) has shaped openings, cutouts, holes, stencils, windows. To allow the LEDs or/and Laser-light beam passing though the light-bock means holes/opening/cutouts/stencils/windows and form the shaped lighted patterns. And its light beam traveling (reflected) or passing though (refracted) by the top wide angle cover. The said top-cover which has its preferred optics textures (plurality and variable focus of convex or concave small piece of lens to combine for one big as FIG. 36A big cover)[.]

And, The said optics texture or treatment have desired thickness, convex or concave lens properties, reflective or refraction optics properties to create image, lighted patterns, message, time, geometric art, nature scene, galaxy, milky way, sky, cloud, starts, moon, water waves, animal, characters, cartoon, sign, logo, commercial to been seen.

The second embodiment also may incorporate with motor/movement/spin/rotating/moving/magnetic unit & coil assembly to make the optics-element(s) or-and light source become moving type to make the motion light effects. This will increase more value for the said current invention.

FIG. 36F is same as FIG. 27 shows the second embodiment details construction.

From FIG. 36F is same as FIG. 27 show the inner construction for one of preferred the light device has built-in motor (or equivalent motor as above listed all replaceable device) to fix the motor on the housing may by screw. It also shown the motor has optional gear-set (not shown) to reduce the motor's rotating speed to slower speed to prevent from people uncomfortable to see quickly moving image on ceiling, walls, floor. It also not shows the switch, electric parts & accessories, conductive wires to connect with circuit and the get the power source constructions.

From FIG. 37 is same as FIGS. 33B and 26B with different marking and alternative parts. From FIG. 37 shows the Third preferred embodiment again has more than one of inner rotating or moving and outer-cover optics elements including top around 180 degree wide opening optic-lens cover. The said at least one of inner rotating or moving optics-lens preferred has wave-like textures, or prism-lens, or plurality of small convex lens with different focus design, or with big or small size mixed, or with variety of the thickness, or-and refractive or-and reflective properties. So, the top-cover has variable focus while the LEDs or/and laser-lights light beam hit the cover's some light beam will reflective and some light beam will refractive to viewer or desired areas.

For FIG. 37 3-1, The inner also has the $2^{nd}$ optics elements which may is a moving optic-elements or optic-lens connect with motor or magnetic unit & coil assembly to make shaving, waving, moving, motion of the said moving optic-elements. So, the light beam traveling or passing though the inner moving optics elements will make the LEDs or/and Laser-lights' light beam become changeable position, direction, orientation and hit the top cover's optic elements designs to come out more splendid light effects. The said light effects may be in any combination select from image, lighted patterns, message, time, geometric art, nature scene, galaxy, milky way, sky, cloud, starts, moon, water waves, animal, characters, cartoon, sign, logo, commercial to been seen.

From FIG. 38 is similar with FIG. 28 with brief alternative parts to shows the Third embodiment details construction.

FIGS. 39A, 39B, 39C show the co-pending drawing for alternative design of top cover optic-elements has plurality of reflective and refractive optics arrangement to form a one dome or sphere or preferred lens design[.]

so, The light source light beams to travel back and forth within the
(i) top positioned inner-lens or top cover or the $1^{st}$ optic-lens in sphere or ball or geometric shape and
(ii) higher or lower-positioned-housing or the $2^{nd}$ optics-lens to make the light source light beam to reflected and/or refracted and/or go through and/or spread out to get the image for wide range, big size.

This is one of basic embodiment for light-beam travel more than one of inner or outer optics-lens with multiple times reflected and/or refraction examples, This also can apply and fall within the current scope of the invention.

The current invention can have the said fixed or rotating or moving inner or $1^{st}$ optics-lens have desired geometric shape including half ball, ⅔ ball, sphere, flat, curved shape to get desired wider area or big area has the lighted patterns though the top optic-elements[.]

This is one of preferred embodiment but not only because the top optic-elements consist of plurality and more than one of reflective or-and refractive lens which use injection process to form one piece of the ball, ball like, sphere, half ball, ⅔ ball. And the alternative construction for the $1^{st}$ or the $2^{nd}$ optic-lens in geometric shape is incorporated with inside the LED(s) or-and Laser light source with predetermined color, number, brightness, IC, sequential, cycle, duration time, fade-in-N-fade out, pair flashing to get desired light effects. It also has the desired moving device which may select from motor, spin kit, rotating kits, clock movement, timer, sensor, switch[.] And, get power source by prongs, AC-plug-wire, bulb base, USB kits from AC or DC power source for plug-in wall outlet (female) by Prong (male) or insert into bulb socket (female) by Bulb base (male) or insert into USB port (Female) by USB Plug (male).

From co-pending filing, the alternative design for top cover or inner-lens have convex or diamond-cut or reflective and/or refractive optics-properties optics-lens or inner prism lens (FIG. 26B FIG. 33B) features also still fall within the current invention scope. And, the co-inventor filed case (#ZZZ-3) U.S. application Ser. No. 14/503,647 filed on Oct. 1 2014, Now is U.S. Pat. No. 9,719,654 issued date Aug. 1 2017 have the identical drawing with the FIGS. 33A, 33B, 33C and co-pending filed case as above listed (#ZZZ) (#ZZZ-I) (#ZZZ-II).

FIG. 39A also show the light beam reflect within the more than one reflect surface which located on inner of the optics-lens which are in the shape of sphere.

Also, the light beam pass though the optic-lens which refracted by material of the convex-lens and to project the image or lighted patterns to the indoor or outdoor surface including fence, building, garage door, front door, ceilings, walls, floor.

This embodiment teach one of the following optics-feature including
(1) more than one reflect-surface inside of optics-lens and refract-surface outside the same optics lens
(2) light project though the more than one optics-surface of same one piece of optic-lens which the inner side is a flat mirror-polished reflector and outside is convex-shape lens so it is built 2 kind of optics-properties in one optics-lens
(3) each reflective and refractive lens get together to form a semi-sphere geometric shape outer optics-lens.
(4) 2 half-sphere ball or ⅔ ball or dome or sphere are preferred designs.
(5) Light-beam travel from LED to more than one of reflective and/or refractive properties optics inner and outer rotating, moving optics-lens have multiple times reflection and refraction so can created splendid color and desired brightness lighted patterns emit out from the more than one inner and outer optic-lens. The said rotating, moving effects is created by motor and gear-set or movement as FIGS. 30A, 30B, 30C as above discussion.

FIG. 39B: Show the other viewing angle for the one preferred construction of ⅔ ball shape optic-lens has both reflective and refractive optics properties and base have the LED or-and Laser light device, the said geometric-shape optics-lens which has more than one optics-properties.

The ⅔ ball outer cover has more than one reflect-and refract lens. This is different with inventor's earlier U.S. Pat. No. 7,632,004 LED night light has more than one optics means. U.S. Pat. No. 8,277,087 has more than one reflect means. U.S. Pat. No. 7,455,444 LED night light has more than one LED. U.S. Pat. No. 8,434,927 interchange power source for current invention scope. From FIG. 39C: Show the inner side of the other shape optical-lens which has more than one reflective surfaces inside of optics-lens such as FIG. 26B or FIG. 33B prism-lens, so can overcome LED's narrow light beam angle.

The current invention all LED or-and laser light source has different direction to emit the light beam after go through multiple inner reflect-surface[.] Even the light angle is narrow it is not a problem because the light emit from LED or-and laser light beam will hit the 1st reflect-surface, then hit to 2nd, 3rd, 4th . . . reflect-surface(s) till the light beam been pass though outside multiple convex-surface of the ball-like outer optics-lens[.] so this is current features too! Add motor can make the image be rotating to get moving image to viewer.

The construction of the co-pending drawing for alternative design of top cover or inner optic-lens has plurality of reflective and refractive optics-surface(s) design built-in inner and outside of the cover optics-lens. So can make light source light beams to back and forth within the Top Cover or inner optics-lens such as current invention one of the ball-like shape to make the light source light beam to spread out to get the image for wide range, big size but this also can apply and fall within the current scope of the invention.

In the preferred embodiments, images created based on the relationship between the first optics-element(s) and the second optics-element(s) or all other optics-element(s). The light device can employ any kind of design, shape, display, or geometric arrangement of the more than one optics-element to create big size or large image to cover Big area for special light effects though the Big or wider opening of the Top cover with desired reflective or refractive lens assembly.

Although specific preferred embodiments of the current invention are described above, it is to be appreciated that all alternative, equivalent, same-function and/or same-skill-or-theory variations, modifications, replacements, arrangements, or constructions may still fall within the current scope of the invention.

The invention claimed is:

1. An LED outdoor projection light, comprising;
   at least one LED light source;
   at least one treated optics lens or image forming element positioned in front of the at least one light source to create an image or pattern; and
   at least one projection lens or outer cover, for projecting enlarged images or patterns onto at least one of an outdoor surface spaced from the outdoor projection light device by at least one foot, wherein:
   the LED outdoor projection light device is configured perform at least one of the following functions:
   (I) moving the projected image or pattern by a moving device or motor and gear-sets to rotate at least one of:
      (i) the treated optics lens,
      (ii) the image forming element,
      (iii) the outer cover, and
      (iv) a disc, holder, injected piece or gear unit having a plurality of optics lenses, films, or slides,
   (II) manually or automatically moving, rotating, or replacing the projected image or pattern by a movable, rotatable, replaceable, or detachable disk, holder, injected piece or gear unit having built-in at least one said optics lens or image forming element,
   (III) changing or moving the projected image or pattern,
   (IV) projecting a single steady central image surrounded by a plurality of moving images or patterns,
   (V) employing an IC or circuit to cause movement of the projected image or pattern by at least one of:
      (i) sequentially turning on and off a plurality or different groups of LEDs,
      (ii) changing a color of at least one LED, and
      (iii) changing a focus of the projected image or pattern.

2. A projection assembly for an LED seasonal or holiday light, comprising;
   at least one projection assembly including:
      (a) a projection or refractive optics lens or assembly;
      (b) an image or lighted pattern forming unit; and
      (c) an LED light source,
   wherein the LED seasonal or holiday light is incorporated with at least one of:
      (i) an integrated circuit (IC) and
      (ii) a moving device,
   wherein the LED light source includes at least one of an LED unit, one or more colorful LEDs, and an LED assembly,
   wherein the LED light source emits at least one color of light beam that passes through parts to form said image or pattern for projection onto an outdoor surface that is at least one foot away from the seasonal or holiday light device, said parts selected from:
      (a) a textured lens, film, printed piece, painted piece, or piece having at least one shaped hole;
      (b) a treated or refractive lens or lens-set;
      (c) a display or image carrier for forming said image or pattern;
      (d) a movable or detachable disc, injected piece, or holder, wherein the disc, injected piece, or holder has a plurality of slides, films, image-forming-elements, or refractive lenses fitted within or injected together in one piece, wherein the at least one projection assembly is arranged to be assembled, installed, built-in, or added on the seasonal or holiday light for indoor or outdoor applications, and wherein the seasonal or holiday light device is one of a (i) garland light, (ii) light string, (iii) tree top light, (iv) candle light, (v) dinner table candle light, (vi) garland light string, (vii) landscape light string, (viii) patio light string.

3. An LED projection light having moving or rotating light effects and configured to project at least one image and/or pattern created by emitting an LED light beam to an image forming unit and through at least one front refractive lens or projection lens, comprising:

at least one LED, wherein the at least one LED is:
 (A) configured to emit light beams to the at least one front wall of the image forming unit, wherein the image forming unit is at least one of a film, slide, printed sheet, painted piece, and piece having art, the image forming unit being curved, coiled, or rolled into a tube, cylinder, or circular structure; or
 (B) configured to emit light beams through the image forming unit, the image forming unit being a front or top flat image forming unit that is at least one of:
  (i) at least one slide, film, texture lens, or painted piece,
  (ii) a piece having art or designs; and
  (iii) a light blocking material with shaped openings, cutouts, or windows; and at least one of:
(a) a moving device to move at least one projection lens, and
(b) a circuit, integrated circuit, wireless system, or RF remote controller, to cause the at least one LED to change on-off timing, flashing, or fade-in and fade-out in sequence or in different orders to cause apparent motion of or changes in the projected image and/or pattern, wherein the moving or changing image or pattern is projected onto an indoor or outdoor surface for holiday or seasonal applications.

4. An LED outdoor garden projection light, comprising:
a plurality of LEDs having an assortment of colors and an integrated circuit to create predetermined light functions;

wherein light beams are emitted by the plurality of LEDs to at least one front image forming display, and go through at least one rotating disc, injected piece, or holder having at projection or refractive lenses to form a moving or changing light image or pattern shown on an outdoor surface.

5. An LED outdoor projection light having at least one inner moving optics lens, comprising:
a plurality of LEDs having a predetermined assortment of colors, groups, or sets and an integrated circuit for providing predetermined light functions, wherein the plurality of LEDs emit light beams to at least one
 (i) Treated, textured, or prism optics lens,
 (ii) image forming unit,
 (iii) plurality of projection lenses in one injected piece or inside a holder, or
 (iv) at least one prism lens,
to create light patterns for projection through at least one of:
 (a) a textured or treated outer cover having a spherical, partially spherical, flat, curved or dome shape, and
 (b) a painted, printed or stenciled cover with at least one of shaped opening, cutout, logo, printing, painting, art, design, word, art, or window.

6. An LED outdoor projection light as claimed in claim 1, wherein the image forming element is at least one of:
 (1) a slide, film, or laser film with or without a disc or holder;
 (2) a treated lens with or without disc or holder;
 (3) a lens set having treatments;
 (4) digital data;
 (5) an LCD screen;
 (6) a stencil;
 (7) a miniature piece;
 (8) a piece having indicia;
 (9) a piece having art; and
 (10) a design.

7. An LED outdoor projection light as claimed in claim 1, wherein the projected image or pattern includes at least one of a message, image, lighted pattern, shaped spot, work, slogan, advertisement, and cartoon character.

8. An LED outdoor projection light as claimed in claim 1, wherein the at least one LED light source includes a plurality of LEDs selected from (a) chip or dice LEDs, or (b) a plurality of different colored dice or chips built into one LED.

9. An LED outdoor projection light as claimed in claim 1, wherein the LED outdoor projection light includes circuitry to connect to a power source for providing direct current power to the at least one LED light source according to predetermined functions.

10. An LED outdoor projection light as claimed in claim 1, wherein the projected image or pattern is a steady image or pattern.

11. An LED outdoor projection light as claimed in claim 1, wherein the projected image or pattern is a moving or rotating image or pattern.

* * * * *